(12) United States Patent
Katz

(10) Patent No.: US 8,842,151 B2
(45) Date of Patent: Sep. 23, 2014

(54) SECURITY MONITORING SYSTEM WITH FLEXIBLE MONITORING SEQUENCE

(75) Inventor: Ronald A. Katz, Los Angeles, CA (US)

(73) Assignee: Telebuyer, LLC, Los Angeles, CA (US)

( * ) Notice: Subject to any disclaimer, the term of this patent is extended or adjusted under 35 U.S.C. 154(b) by 1172 days.

(21) Appl. No.: 11/675,080

(22) Filed: Feb. 14, 2007

(65) Prior Publication Data

US 2009/0322853 A1 Dec. 31, 2009

Related U.S. Application Data

(63) Continuation of application No. 09/371,212, filed on Aug. 10, 1999, now Pat. No. 7,848,496, which is a continuation of application No. 08/189,405, filed on Jan. 27, 1997, now Pat. No. 6,323,894, which is a continuation-in-part of application No. 08/154,313, filed on Nov. 17, 1993, now Pat. No. 5,495,284, which is a continuation-in-part of application No. 08/067,783, filed on May 25, 1993, now abandoned, which is a continuation-in-part of application No. 08/031,235, filed on Mar. 12, 1993, now Pat. No. 5,412,708, application No. 11/675,080, which is a continuation-in-part of application No. 11/205,250, filed on Aug. 16, 2005, now Pat. No. 7,425,978, which is a continuation of application No. 08/407,064, filed on Mar. 20, 1995, now Pat. No. 7,019,770, which is a continuation of application No. 08/067,783, filed on May 25, 1993, now abandoned, which is a continuation-in-part of application No. 08/031,235, filed on Mar. 12, 1993, now Pat. No. 5,412,708.

(51) Int. Cl.
*H04M 11/00* (2006.01)
*H04N 7/14* (2006.01)

(52) U.S. Cl.
USPC .............................. 348/14.01; 379/37; 379/45

(58) Field of Classification Search
USPC ..................... 348/14.01, 14.05, 14.07, 14.03; 379/37–45, 106.01, 106.02
See application file for complete search history.

(56) References Cited

U.S. PATENT DOCUMENTS

| | | |
|---|---|---|
| 1,162,336 A | 11/1915 | Campbell |
| 2,575,606 A | 11/1951 | Wales et al. |
| 2,950,048 A | 8/1960 | Luhn |
| 2,957,567 A | 10/1960 | Doud |
| 3,144,518 A | 8/1964 | Lummis |
| 3,183,482 A | 5/1965 | Aberth et al. |
| 3,211,470 A | 10/1965 | Wilson |
| 3,246,082 A | 4/1966 | Levy |
| 3,253,689 A | 5/1966 | Thompson |
| 3,290,812 A | 12/1966 | Hunkins |
| 3,445,633 A | 5/1969 | Ratner |
| 3,504,130 A | 3/1970 | Gorgas et al. |
| 3,515,807 A | 6/1970 | Clark |
| 3,544,727 A | 12/1970 | Sloan et al. |
| 3,609,250 A | 9/1971 | Morris |
| 3,614,328 A | 10/1971 | McNaughton et al. |
| 3,622,995 A | 11/1971 | Dilks et al. |
| 3,691,308 A | 9/1972 | Angner et al. |
| 3,705,384 A | 12/1972 | Wahlberg |
| 3,725,587 A | 4/1973 | Klein ............................. 179/2 |
| 3,775,563 A | 11/1973 | Klein ............................. 179/2 |
| 3,792,202 A | 2/1974 | Adams, Jr. et al. |
| 3,792,446 A | 2/1974 | McFiggins et al. |
| 3,794,774 A | 2/1974 | Kemmerly et al. |
| 3,881,060 A | 4/1975 | Connell et al. |
| 3,903,373 A | 9/1975 | Guekdenpfennig et al. |
| 3,909,553 A | 9/1975 | Marshall |
| 3,912,874 A | 10/1975 | Botterell et al. |
| 3,991,282 A | 11/1976 | Feil |
| 4,004,084 A | 1/1977 | Brown et al. ................. 358/133 |
| 4,027,098 A | 5/1977 | Reisch et al. |
| 4,037,250 A | 7/1977 | McGahan et al. |
| 4,054,908 A | 10/1977 | Poirier et al. ................... 358/85 |
| 4,070,698 A | 1/1978 | Curtis et al. |
| 4,090,038 A | 5/1978 | Biggs |
| 4,137,429 A | 1/1979 | Stockdale |
| 4,139,731 A | 2/1979 | Hashemi et al. |
| 4,141,006 A | 2/1979 | Braxton |
| 4,150,254 A | 4/1979 | Schussler et al. |
| 4,150,259 A | 4/1979 | Fenton et al. |
| 4,173,024 A | 10/1979 | Miller |
| 4,186,438 A | 1/1980 | Benson et al. |
| 4,190,819 A | 2/1980 | Burgyan |

| | | |
|---|---|---|
| 4,193,114 A | 3/1980 | Benini |
| 4,194,242 A | 3/1980 | Robbins |
| 4,195,864 A | 4/1980 | Morton et al. |
| 4,232,198 A | 11/1980 | Warman |
| 4,247,759 A | 1/1981 | Yuris et al. |
| 4,259,549 A | 3/1981 | Stehman |
| 4,262,333 A | 4/1981 | Horigome et al. |
| 4,270,042 A | 5/1981 | Case |
| 4,277,649 A | 7/1981 | Sheinbein |
| 4,289,930 A | 9/1981 | Connolly et al. |
| 4,295,008 A | 10/1981 | Johnson et al. |
| 4,332,980 A | 6/1982 | Reynolds et al. ............... 179/2 |
| 4,346,442 A | 8/1982 | Musmanno |
| 4,359,631 A | 11/1982 | Lockwood et al. |
| 4,360,345 A | 11/1982 | Hon |
| 4,360,827 A | 11/1982 | Braun |
| RE31,144 E | 2/1983 | Feil |
| 4,376,875 A | 3/1983 | Beirne |
| 4,393,277 A | 7/1983 | Besen et al. |
| 4,400,724 A | 8/1983 | Fields ........................... 358/85 |
| 4,412,287 A | 10/1983 | Braddock, III |
| 4,424,418 A | 1/1984 | Moore et al. |
| 4,424,572 A | 1/1984 | Lorig et al. |
| 4,449,186 A | 5/1984 | Kelly et al. |
| 4,450,477 A | 5/1984 | Lovett |
| 4,451,701 A | 5/1984 | Bendig |
| 4,455,455 A | 6/1984 | Little |
| 4,456,789 A | 6/1984 | Groves et al. |
| 4,460,807 A | 7/1984 | Kerr et al. ..................... 179/18 |
| 4,475,189 A | 10/1984 | Herr et al. ..................... 370/62 |
| 4,475,190 A | 10/1984 | Marouf et al. |
| 4,479,185 A | 10/1984 | Cook |
| 4,479,195 A | 10/1984 | Herr et al. .................. 364/900 |
| 4,490,810 A | 12/1984 | Hon |
| 4,493,948 A | 1/1985 | Sues et al. |
| 4,496,943 A | 1/1985 | Greenblatt |
| 4,528,643 A | 7/1985 | Freeny, Jr. |
| 4,529,839 A | 7/1985 | Colton et al. ..................... 179/2 |
| 4,529,840 A | 7/1985 | Colton et al. ..................... 179/2 |
| 4,531,024 A | 7/1985 | Colton et al. ..................... 179/2 |
| 4,540,850 A | 9/1985 | Herr et al. |
| 4,541,087 A | 9/1985 | Comstock |
| 4,544,804 A | 10/1985 | Herr et al. |
| 4,550,224 A | 10/1985 | Winchell |
| 4,553,222 A | 11/1985 | Kurland et al. |
| 4,559,415 A | 12/1985 | Bernard et al. |
| 4,566,030 A | 1/1986 | Nickerson et al. |
| 4,567,359 A | 1/1986 | Lockwood |
| 4,574,374 A | 3/1986 | Scordo ........................... 370/62 |
| 4,577,065 A | 3/1986 | Frey et al. |
| 4,577,067 A | 3/1986 | Levy et al. |
| RE32,115 E | 4/1986 | Lockwood et al. |
| 4,580,012 A | 4/1986 | Matthews et al. |
| 4,591,906 A | 5/1986 | Morales-Garza et al. |
| 4,611,095 A | 9/1986 | LeBlanc et al. |
| 4,623,920 A | 11/1986 | Dufresne et al. |
| 4,625,081 A | 11/1986 | Lotito et al. |
| 4,626,836 A | 12/1986 | Curtis et al. |
| 4,635,251 A | 1/1987 | Stanley et al. |
| 4,641,127 A | 2/1987 | Hogan et al. |
| 4,645,872 A | 2/1987 | Pressman et al. ............... 379/54 |
| 4,645,873 A | 2/1987 | Chomet |
| 4,648,108 A | 3/1987 | Ellis et al. |
| 4,649,563 A | 3/1987 | Riskin |
| 4,652,998 A | 3/1987 | Koza et al. |
| 4,653,045 A | 3/1987 | Stanley et al. |
| 4,654,482 A | 3/1987 | DeAngelis |
| 4,656,654 A | 4/1987 | Dumas |
| 4,674,044 A | 6/1987 | Kalmus et al. |
| 4,691,347 A | 9/1987 | Stanley et al. |
| 4,694,490 A | 9/1987 | Harvey et al. |
| 4,704,725 A | 11/1987 | Harvey et al. |
| 4,706,121 A | 11/1987 | Young |
| 4,710,917 A | 12/1987 | Tompkins et al. ............. 370/62 |
| 4,712,191 A | 12/1987 | Penna |
| 4,715,059 A | 12/1987 | Cooper-Hart et al. .......... 379/53 |
| 4,720,849 A | 1/1988 | Tayama |
| 4,723,212 A | 2/1988 | Mindrum et al. |
| 4,727,243 A | 2/1988 | Savar |
| 4,734,858 A | 3/1988 | Schlafly |
| 4,736,407 A | 4/1988 | Dumas |
| 4,739,478 A | 4/1988 | Roberts et al. |
| 4,739,510 A | 4/1988 | Jeffers et al. |
| 4,742,457 A | 5/1988 | Leon et al. |
| 4,744,103 A | 5/1988 | Dahlquist et al. |
| 4,745,468 A | 5/1988 | Von Kohorn |
| 4,751,640 A | 6/1988 | Lucas et al. |
| 4,755,871 A | 7/1988 | Morales-Garza et al. |
| 4,757,267 A | 7/1988 | Riskin |
| 4,758,872 A | 7/1988 | Hada |
| 4,761,684 A | 8/1988 | Clark et al. |
| 4,763,191 A | 8/1988 | Gordon et al. |
| 4,766,592 A | 8/1988 | Baral et al. |
| 4,775,935 A | 10/1988 | Yourick |
| 4,780,758 A | 10/1988 | Lin et al. |
| 4,788,682 A | 11/1988 | Vij et al. |
| 4,789,863 A | 12/1988 | Bush |
| 4,789,928 A | 12/1988 | Fujisaki |
| 4,791,666 A | 12/1988 | Cobb et al. |
| 4,792,849 A | 12/1988 | McCalley et al. |
| 4,792,968 A | 12/1988 | Katz |
| 4,794,530 A | 12/1988 | Yukiura et al. |
| 4,796,293 A | 1/1989 | Blinken et al. |
| 4,797,911 A | 1/1989 | Szlam et al. |
| 4,797,913 A | 1/1989 | Kaplan et al. |
| 4,799,156 A | 1/1989 | Shavit et al. |
| 4,803,348 A | 2/1989 | Lohrey et al. |
| 4,805,134 A | 2/1989 | Calo et al. |
| 4,807,023 A | 2/1989 | Bestler et al. |
| 4,812,628 A | 3/1989 | Boston |
| 4,816,905 A | 3/1989 | Tweedy et al. |
| 4,823,265 A | 4/1989 | Nelson |
| 4,825,045 A | 4/1989 | Humble |
| 4,825,457 A | 4/1989 | Lebowitz |
| 4,827,500 A | 5/1989 | Binkerd et al. |
| 4,829,372 A | 5/1989 | McCalley et al. |
| 4,833,308 A | 5/1989 | Humble |
| 4,833,710 A | 5/1989 | Hirashima |
| 4,843,377 A | 6/1989 | Fuller et al. |
| 4,845,636 A | 7/1989 | Walker |
| 4,845,658 A | 7/1989 | Gifford |
| 4,845,739 A | 7/1989 | Katz |
| 4,847,677 A | 7/1989 | Music et al. ..................... 358/13 |
| 4,847,829 A | 7/1989 | Tompkins et al. ............. 370/62 |
| 4,852,154 A | 7/1989 | Lewis et al. |
| 4,860,123 A | 8/1989 | McCalley et al. |
| 4,870,579 A | 9/1989 | Hey |
| 4,873,662 A | 10/1989 | Sargent |
| 4,876,597 A | 10/1989 | Roy et al. |
| 4,876,648 A | 10/1989 | Lloyd |
| 4,878,240 A | 10/1989 | Lin et al. |
| 4,878,242 A | 10/1989 | Springer et al. |
| 4,885,685 A | 12/1989 | Wolfberg et al. |
| 4,887,208 A | 12/1989 | Schneider et al. |
| 4,888,795 A | 12/1989 | Ando et al. |
| 4,893,248 A | 1/1990 | Pitts et al. |
| 4,893,325 A | 1/1990 | Pankonen et al. |
| 4,893,326 A | 1/1990 | Duran et al. |
| 4,897,867 A | 1/1990 | Foster et al. ..................... 379/94 |
| 4,903,201 A | 2/1990 | Wagner |
| 4,905,094 A | 2/1990 | Pocock et al. |
| 4,907,160 A | 3/1990 | Duncan et al. |
| 4,908,761 A | 3/1990 | Tai |
| 4,910,672 A | 3/1990 | Off et al. |
| 4,910,676 A | 3/1990 | Alldredge |
| 4,916,435 A | 4/1990 | Fuller |
| 4,920,533 A | 4/1990 | Dufresne et al. |
| 4,922,520 A | 5/1990 | Bernard et al. |
| 4,926,325 A | 5/1990 | Benton et al. |
| 4,928,177 A | 5/1990 | Martinez |
| 4,937,856 A | 6/1990 | Natarajan |
| 4,939,773 A | 7/1990 | Katz |
| 4,943,995 A | 7/1990 | Daudelin et al. |
| 4,945,410 A | 7/1990 | Walling ....................... 358/141 |
| 4,947,028 A | 8/1990 | Gorog |
| 4,951,147 A | 8/1990 | Aknar et al. |
| 4,951,196 A | 8/1990 | Jackson |
| 4,952,928 A * | 8/1990 | Carroll et al. ............. 379/106.01 |

| Patent | Date | Name | Ref |
|---|---|---|---|
| 4,954,886 A | 9/1990 | Elberbaum | |
| 4,955,052 A | 9/1990 | Hussain | |
| 4,962,473 A * | 10/1990 | Crain | 379/42 |
| 4,965,819 A | 10/1990 | Kannes | 379/53 |
| 4,965,825 A | 10/1990 | Harvey et al. | |
| 4,967,366 A | 10/1990 | Kaehler | |
| 4,969,042 A | 11/1990 | Houtman et al. | |
| 4,972,318 A | 11/1990 | Brown et al. | |
| 4,980,826 A | 12/1990 | Wagner | |
| 4,982,440 A | 1/1991 | Dufresne et al. | |
| 4,987,590 A | 1/1991 | Katz | |
| 4,989,233 A | 1/1991 | Schakowsky et al. | |
| 4,992,866 A | 2/1991 | Morgan | |
| 4,992,940 A | 2/1991 | Dworkin | |
| 4,996,642 A | 2/1991 | Hey | |
| 5,010,485 A | 4/1991 | Bigari | |
| 5,014,267 A | 5/1991 | Tompkins et al. | 370/62 |
| 5,020,129 A | 5/1991 | Martin et al. | |
| 5,021,953 A | 6/1991 | Webber et al. | |
| 5,027,400 A | 6/1991 | Baji et al. | |
| 5,032,989 A | 7/1991 | Tornetta | |
| 5,036,389 A | 7/1991 | Morales | |
| 5,042,062 A | 8/1991 | Lee et al. | |
| 5,043,889 A | 8/1991 | Lucey | |
| 5,053,956 A | 10/1991 | Donald et al. | |
| 5,053,957 A | 10/1991 | Suzuki | |
| 5,056,019 A | 10/1991 | Schultz et al. | |
| 5,056,136 A | 10/1991 | Smith | 380/10 |
| 5,060,068 A | 10/1991 | Lindstrom | |
| 5,061,916 A | 10/1991 | French et al. | |
| 5,063,507 A | 11/1991 | Lindsey et al. | |
| 5,065,393 A | 11/1991 | Sibbitt et al. | |
| 5,072,103 A | 12/1991 | Nara | |
| 5,077,665 A | 12/1991 | Silverman et al. | |
| 5,077,788 A | 12/1991 | Cook et al. | |
| 5,091,933 A | 2/1992 | Katz | |
| 5,093,718 A | 3/1992 | Hoarty et al. | |
| 5,097,328 A | 3/1992 | Boyette et al. | |
| 5,101,267 A | 3/1992 | Morales-Garza | |
| 5,101,353 A | 3/1992 | Lupien et al. | |
| 5,109,399 A | 4/1992 | Thompson | |
| 5,109,414 A | 4/1992 | Harvey et al. | |
| 5,113,496 A | 5/1992 | McCalley et al. | |
| 5,117,354 A | 5/1992 | Long et al. | |
| 5,119,188 A | 6/1992 | McCalley et al. | |
| 5,126,840 A | 6/1992 | Dufresne et al. | |
| 5,127,049 A | 6/1992 | Sabo | |
| 5,136,501 A | 8/1992 | Silverman et al. | |
| 5,136,581 A | 8/1992 | Muehrcke | |
| 5,146,404 A | 9/1992 | Calloway et al. | |
| 5,151,782 A | 9/1992 | Ferraro | |
| 5,164,979 A | 11/1992 | Choi | |
| 5,164,982 A | 11/1992 | Davis | |
| 5,168,445 A | 12/1992 | Kawashima et al. | |
| 5,168,446 A | 12/1992 | Wiseman | |
| 5,170,427 A | 12/1992 | Guichard et al. | |
| 5,173,851 A | 12/1992 | Off et al. | |
| 5,191,410 A | 3/1993 | McCalley et al. | |
| 5,191,613 A | 3/1993 | Graziano et al. | |
| 5,193,056 A | 3/1993 | Boes | |
| 5,195,092 A | 3/1993 | Wilson et al. | 370/94.2 |
| 5,199,062 A | 3/1993 | Von Meister et al. | |
| 5,201,010 A | 4/1993 | Deaton et al. | |
| 5,202,759 A | 4/1993 | Laycock | |
| 5,204,670 A | 4/1993 | Stinton | |
| 5,206,803 A | 4/1993 | Vitagliano et al. | |
| 5,208,665 A | 5/1993 | McCalley et al. | |
| 5,209,665 A | 5/1993 | Billings et al. | |
| 5,220,420 A | 6/1993 | Hoarty et al. | |
| 5,220,501 A | 6/1993 | Lawlor et al. | |
| 5,222,018 A | 6/1993 | Sharpe et al. | |
| 5,223,923 A | 6/1993 | Morales-Garza | |
| 5,224,157 A | 6/1993 | Yamada et al. | |
| 5,229,850 A | 7/1993 | Toyoshima | |
| 5,231,571 A | 7/1993 | D'Agostino | |
| 5,233,654 A | 8/1993 | Harvey et al. | |
| 5,235,509 A | 8/1993 | Mueller et al. | |
| 5,235,680 A | 8/1993 | Bijnagte | |
| 5,237,499 A | 8/1993 | Garback | |
| 5,237,500 A | 8/1993 | Perg et al. | |
| 5,237,620 A | 8/1993 | Deaton et al. | |
| 5,239,462 A | 8/1993 | Jones et al. | |
| 5,239,577 A | 8/1993 | Bates et al. | |
| 5,241,464 A | 8/1993 | Greulich et al. | |
| 5,241,587 A | 8/1993 | Horton et al. | |
| 5,241,671 A | 8/1993 | Reed et al. | |
| 5,247,347 A | 9/1993 | Litteral et al. | 358/85 |
| 5,249,223 A | 9/1993 | Vanacore | |
| 5,257,099 A | 10/1993 | Morales-Garza | |
| 5,262,942 A | 11/1993 | Earle | |
| 5,264,929 A | 11/1993 | Yamaguchi | |
| 5,270,920 A | 12/1993 | Pearse et al. | |
| 5,283,637 A | 2/1994 | Goolcharan | 348/17 |
| 5,283,638 A | 2/1994 | Engberg et al. | 348/14 |
| 5,283,639 A | 2/1994 | Esch et al. | 348/6 |
| 5,283,731 A | 2/1994 | Lalonde et al. | |
| 5,283,819 A | 2/1994 | Glick et al. | 379/90 |
| 5,285,383 A | 2/1994 | Lindsey et al. | |
| 5,289,275 A | 2/1994 | Ishii et al. | |
| 5,291,554 A | 3/1994 | Morales | |
| 5,293,615 A | 3/1994 | Amada | |
| 5,295,064 A | 3/1994 | Malec et al. | |
| 5,297,197 A | 3/1994 | Katz | |
| 5,305,196 A | 4/1994 | Deaton et al. | |
| 5,305,200 A | 4/1994 | Hartheimer et al. | |
| 5,309,355 A | 5/1994 | Lockwood | |
| 5,319,455 A | 6/1994 | Hoarty et al. | |
| 5,319,542 A | 6/1994 | King, Jr. et al. | |
| 5,321,514 A | 6/1994 | Martinez | 725/62 |
| 5,323,315 A | 6/1994 | Highbloom | |
| 5,323,445 A | 6/1994 | Nakatsuka | |
| 5,325,194 A | 6/1994 | Natori et al. | 348/15 |
| 5,327,508 A | 7/1994 | Deaton et al. | |
| 5,329,578 A | 7/1994 | Brennan et al. | |
| 5,335,277 A | 8/1994 | Harvey et al. | |
| 5,341,374 A | 8/1994 | Lewen et al. | 370/85.4 |
| 5,347,632 A | 9/1994 | Filepp et al. | |
| 5,351,133 A | 9/1994 | Blonstein | |
| 5,351,186 A | 9/1994 | Bullock et al. | |
| 5,353,218 A | 10/1994 | De Lapa et al. | |
| 5,353,219 A | 10/1994 | Mueller et al. | |
| 5,361,091 A | 11/1994 | Hoarty et al. | |
| 5,361,199 A | 11/1994 | Shoquist et al. | |
| 5,365,577 A | 11/1994 | Davis et al. | |
| 5,367,273 A | 11/1994 | Georger et al. | 333/1 |
| 5,369,571 A | 11/1994 | Metts | |
| 5,371,534 A | 12/1994 | Dagdeviren et al. | |
| 5,373,315 A | 12/1994 | Dufresne et al. | |
| 5,375,055 A | 12/1994 | Togher et al. | |
| 5,381,412 A | 1/1995 | Otani | 370/84 |
| 5,382,972 A | 1/1995 | Kannes | 348/15 |
| 5,384,841 A | 1/1995 | Adams et al. | |
| 5,388,101 A | 2/1995 | Dinkins | |
| 5,388,147 A | 2/1995 | Grimes | |
| 5,388,165 A | 2/1995 | Deaton et al. | |
| 5,392,223 A | 2/1995 | Caci | 364/514 |
| 5,392,353 A | 2/1995 | Morales | |
| 5,396,546 A | 3/1995 | Remillard | |
| 5,400,246 A | 3/1995 | Wilson et al. | |
| 5,402,336 A | 3/1995 | Spiegelhoff et al. | |
| 5,404,393 A | 4/1995 | Remillard | |
| 5,406,324 A | 4/1995 | Roth | 348/22 |
| 5,410,343 A | 4/1995 | Coddington et al. | |
| 5,412,416 A | 5/1995 | Nemirofsky | 348/10 |
| 5,412,708 A | 5/1995 | Katz | |
| 5,412,720 A | 5/1995 | Hoarty | |
| 5,414,754 A | 5/1995 | Pugh et al. | |
| 5,426,281 A | 6/1995 | Abecassis | |
| 5,440,336 A | 8/1995 | Buhro et al. | |
| 5,440,624 A | 8/1995 | Schoof, II | |
| 5,442,688 A | 8/1995 | Katz | |
| 5,442,700 A | 8/1995 | Snell et al. | |
| 5,442,771 A | 8/1995 | Filepp et al. | |
| 5,446,919 A | 8/1995 | Wilkins | |
| 5,450,123 A | 9/1995 | Smith | |
| 5,451,998 A | 9/1995 | Hamrick | |
| 5,452,289 A | 9/1995 | Sharma et al. | 370/32 |
| 5,455,903 A | 10/1995 | Jolissaint et al. | |

| | | |
|---|---|---|
| 5,465,291 A | 11/1995 | Barrus et al. |
| 5,475,585 A | 12/1995 | Bush |
| 5,481,294 A | 1/1996 | Thomas et al. |
| 5,481,546 A | 1/1996 | Dinkins |
| 5,481,605 A | 1/1996 | Sakurai et al. |
| 5,485,197 A | 1/1996 | Hoarty |
| 5,485,370 A | 1/1996 | Moss et al. |
| 5,490,060 A | 2/1996 | Malec et al. |
| 5,491,797 A | 2/1996 | Thompson et al. ............ 395/200 |
| 5,495,284 A | 2/1996 | Katz |
| 5,497,185 A | 3/1996 | Dufresne et al. |
| 5,500,793 A | 3/1996 | Deming, Jr. et al. |
| 5,502,636 A | 3/1996 | Clarke |
| 5,504,519 A | 4/1996 | Remillard |
| 5,509,009 A | 4/1996 | Laycock et al. |
| 5,515,424 A | 5/1996 | Kenney |
| 5,526,034 A | 6/1996 | Hoarty et al. |
| 5,528,281 A | 6/1996 | Grady et al. |
| 5,528,513 A | 6/1996 | Vaitzblit et al. |
| 5,534,912 A | 7/1996 | Kostreski |
| 5,537,590 A | 7/1996 | Amado |
| 5,539,448 A | 7/1996 | Verhille et al. |
| 5,550,578 A | 8/1996 | Hoarty et al. |
| 5,557,316 A | 9/1996 | Hoarty et al. |
| 5,557,518 A | 9/1996 | Rosen |
| 5,568,181 A | 10/1996 | Greenwood et al. |
| 5,576,951 A | 11/1996 | Lockwood |
| 5,581,479 A | 12/1996 | McLaughlin et al. |
| 5,583,763 A | 12/1996 | Atcheson et al. |
| 5,583,928 A | 12/1996 | Tester et al. |
| 5,584,025 A | 12/1996 | Keithley et al. |
| 5,587,734 A | 12/1996 | Lauder et al. |
| 5,592,375 A | 1/1997 | Salmon et al. |
| 5,592,491 A | 1/1997 | Dinkins |
| 5,594,507 A | 1/1997 | Hoarty |
| 5,602,905 A | 2/1997 | Mettke |
| 5,602,908 A | 2/1997 | Fan |
| 5,604,487 A | 2/1997 | Frymier |
| 5,606,359 A | 2/1997 | Youden et al. |
| 5,606,496 A | 2/1997 | D'Agostino |
| 5,621,812 A | 4/1997 | Deaton et al. |
| 5,630,068 A | 5/1997 | Vela et al. |
| 5,638,457 A | 6/1997 | Deaton et al. |
| 5,642,485 A | 6/1997 | Deaton et al. |
| 5,644,723 A | 7/1997 | Deaton et al. |
| 5,646,987 A * | 7/1997 | Gerber et al. ................... 379/45 |
| 5,649,114 A | 7/1997 | Deaton et al. |
| 5,659,469 A | 8/1997 | Deaton et al. |
| 5,663,757 A | 9/1997 | Morales |
| 5,675,662 A | 10/1997 | Deaton et al. |
| 5,682,195 A | 10/1997 | Hendricks et al. |
| 5,684,870 A | 11/1997 | Maloney et al. |
| 5,687,322 A | 11/1997 | Deaton et al. |
| 5,689,553 A | 11/1997 | Ahuja et al. |
| 5,694,452 A * | 12/1997 | Bertolet ........................ 379/38 |
| 5,710,887 A | 1/1998 | Chelliah et al. |
| 5,712,906 A | 1/1998 | Grady et al. |
| 5,721,832 A | 2/1998 | Westrope et al. |
| 5,724,646 A | 3/1998 | Ganek et al. |
| 5,727,164 A | 3/1998 | Kaye et al. |
| 5,729,594 A | 3/1998 | Klingman .................. 379/93.12 |
| 5,740,035 A | 4/1998 | Cohen et al. |
| 5,742,931 A | 4/1998 | Spiegelhoff et al. |
| 5,758,328 A | 5/1998 | Giovannoli |
| 5,793,413 A | 8/1998 | Hylton et al. |
| 5,794,207 A | 8/1998 | Walker et al. |
| 5,796,967 A | 8/1998 | Filepp et al. |
| 5,815,146 A | 9/1998 | Youden et al. |
| 5,822,735 A | 10/1998 | De Lapa et al. |
| 5,845,265 A | 12/1998 | Woolston |
| 5,848,399 A | 12/1998 | Burke |
| 5,870,724 A | 2/1999 | Lawlor et al. |
| 5,883,661 A | 3/1999 | Hoarty |
| 5,884,272 A | 3/1999 | Walker et al. ..................... 705/1 |
| 5,905,973 A | 5/1999 | Yonezawa et al. |
| 5,937,086 A | 8/1999 | Taguchi ........................ 382/165 |
| 5,973,722 A | 10/1999 | Wakai et al. |
| 6,034,678 A | 3/2000 | Hoarty et al. |
| 6,038,289 A * | 3/2000 | Sands .............................. 379/45 |
| 6,064,377 A | 5/2000 | Hoarty et al. |
| 6,072,402 A | 6/2000 | Kniffin et al. ............ 340/825.31 |
| 6,100,883 A | 8/2000 | Hoarty |
| 6,157,711 A | 12/2000 | Katz |
| 6,418,211 B1 | 7/2002 | Irvin |
| 6,567,502 B2 * | 5/2003 | Zellner et al. .................... 379/45 |
| 6,608,636 B1 | 8/2003 | Roseman ...................... 345/753 |
| 6,658,091 B1 * | 12/2003 | Naidoo et al. .................. 379/45 |
| 6,661,884 B2 * | 12/2003 | Shaffer et al. ............ 379/201.02 |
| 6,782,370 B1 | 8/2004 | Stack |
| 6,802,062 B1 | 10/2004 | Oyamada et al. ................ 718/1 |
| 7,047,209 B2 | 5/2006 | Filepp et al. |
| 7,072,849 B1 | 7/2006 | Filepp et al. |
| 7,920,759 B2 | 4/2011 | Hull et al. |
| 2002/0120554 A1 | 8/2002 | Vega .............................. 705/37 |
| 2003/0012344 A1 * | 1/2003 | Agarwal et al. ................. 379/37 |

FOREIGN PATENT DOCUMENTS

| | | |
|---|---|---|
| CA | 1162336 | 2/1984 |
| EP | 0 010 399 A1 | 4/1980 |
| EP | 0 188 286 | 7/1986 |
| EP | 0265083 A1 | 9/1987 |
| EP | 0410036 A1 | 1/1991 |
| FR | 2 658 635 A1 | 8/1991 |
| GB | 1 504 112 | 3/1978 |
| GB | 1 504 113 | 3/1978 |
| GB | 2 105 075 A | 3/1983 |
| GB | 1 437 883 | 6/1986 |
| JP | Sho 50-98626 | 1/1974 |
| JP | Sho 49-73198 | 7/1974 |
| JP | Sho 50-133892 | 10/1975 |
| JP | Sho 52-72800 | 11/1975 |
| JP | Sho 54-60000 | 5/1979 |
| JP | Sho 57-92254 | 6/1982 |
| JP | 62-190552 | 8/1987 |
| JP | 0 029 456 | 2/1991 |
| JP | 0 109 198 | 4/1991 |
| WO | WO 89/02139 | 3/1989 |
| WO | WO 92/15174 A1 | 9/1992 |
| WO | 0031607 | 6/2000 |

OTHER PUBLICATIONS

Hayes, Mary, "Videophone suits seek $110 million," *The Business Journal*—San Jose, Mar. 8, 1993, 2 pages.

Lam, Jenny, "Cosy offices," *The Straits Times Press Limited*, Mar. 4, 1993, 2 pages.

"Telecoms future: personal communication networks," *South China Morning Post* (Hong Kong), Feb. 24, 1993, 2 pages.

Troxler, Howard, "Cousin of cable—or just Big Brother?," *St. Petersburg Times* (Florida), Feb. 3, 1993, 2 pages.

Strattner, Anthony, "Video pictures: coming from a telephone near you; AT&T teams with CLI for chip sets that deliver video over phone; Compression Labs Inc.; Product Announcement," *Computer Shopper*, Feb. 1, 1993, 2 pages.

Baron, David, et al., "CLI demos video phone over ISDN; Compression Labs; Integrated systems digital network; News from CES and MacWorld; Brief Article," *Digital Media*, Jan. 18, 1993, 1 page.

"ShareVision Announces Share View TM Plus," *News Release*, Jan. 6, 1993, 1 page.

Behlim, Saara, "Patent of the month: They're all connected," *Crain's Chicago Business*, Dec. 14, 1992, 1 page.

P. Young, "But Will it Respect You Later?," *Sunday Mail (QLD)*, Dec. 13, 1992, 1 page.

Forster, Barbara, "'Videoconferencing' Evolving Into Valuable Business Tool," *Central New York Business Journal*, Nov. 16, 1992, 2 pages.

Maloney, Janice, et al., "Better than being there? Share Vision provides document sharing, livevideo and audio over standard phone lines.; ShareVision Technology Inc.'s technology for producing desktop visual communications systems," *Internet Media Strategies, Inc. Digital Media*, Aug. 17, 1992, 2 pages.

M. Ketchell, "Building Towards 2000," *Courier-Mail*, Mar. 10, 1992, 1 page.

"Visual communications systems offer high definition, cost," *The Nikkei Weekly* (Japan), Nihon Keizai Shimbun, Inc., Sep. 28, 1991, 1 page.

Alliance Teleconferencing Services Boost Business Efficiency, Jan. 1988, Hazto, et al., AT&T Technology, vol. 3 No. 1, pp. 22-31.

Tempo MBX Feature Guide, Jan. 1989, ConferTech International, Inc.

General Description, Installation & Maintenance Practice, C1200 Computerized Teleconference Terminal, Jan. 1990, Westell, Inc.

Interactive Graphics Teleconferencing, Jan. 1979, Pferd et al., Computer, vol. 12, No. 11, pp. 62-72.

Behavioral and User Needs for Teleconferencing, Jan. 1985, Kenyon et al., Proceedings of the IEEE, vol. 73, No. 4; pp. 689-699.

Audio and Visually Augmented Teleconferencing, Jan. 1985, Watanabe et al., 73 Proceedings of the IEEE 4; pp. 656-670.

C1200 Computerized Teleconference Bridge, Jan. 1983, Westell, Inc.

General Transmission Considerations in Telephone Conference Systems, Jan. 1968, Mitchell, Doren, IEEE Transactions on Communication Technology, vol. COM-16, No. 1; Feb. 1968; pp. 163-167.

Packet Switched Voice Conferencing Across Interconnected Networks, Jan. 1988, Weiss et al., Proceedings of the 13th Conference on Local Computer Networks; 1 pp. 114-124.

Bridge on The River Telecom, May 1989, Teleconnect, v7, n5, 1 p. 110(4).

Implementation Mechanisms for Packet Switched Voice Conferencing, Jan. 1989, Ziegler et al., IEEE Journal on Selected Areas in Communications, vol. 7, No. 5, pp. 698-706.

LAN Based Real Time Audio-Graphics Conferencing System, Apr. 1989, Soares et al., INFOCOM '89. IEEE Proceedings of the Eighth Annual Joint Conference of the IEEE Computer and Communications, Societies, Technology: Emerging or Converging, vol. 2; Apr. 23-27, 1989; pp. 617-623.

Videomatic Switching: Systems and Services, Mar. 1988, Crawford et al., International Zurich Seminar on Digital Communications, 1988. 'Mapping New Applications onto New Technologies'; Mar. 8-10, 1988; pp. 37-43.

Real-Time Desktop Conference System Based on Integrated Group Communication Protocols, Mar. 1988, Sakata et al., Conference Proceedings, Seventh Annual International Phoenix Conference on Computers and Communications; Mar. 16-18, 1988; pp. 379-384.

Today's Teleconferencing and Its Applications, May 1983, Ryva, 33rd IEEE Vehicular Technology Conference; May 25-27, 1983; pp. 99-103.

A Secure Audio Teleconference System, Oct. 1988, Steer et al., IEEE Military Communications Conference, 1988. MILCOM SS. ' Conference record. '21st Century Military Communications—What's Possible?', vol. 1; Oct. 23-26, 1988; pp. 63-67.

Networking Requirements of the Rapport Multimedia Conferencing System, Jan. 1988, Ahuja et al., INFOCOM '88. Networks: Evolution or Revolution? IEEE Proceedings. Seventh Annual Joint Conference of the IEEE Computer and Communications Societies; 1988; pp. 746-751.

Technical Implications of Teleconference Service, Jan. 1975, McManamon, IEEE Transactions on Communications, vol. COM-23, No. 1; Jan. 1975; pp. 30-38.

Personal Multi-Media Multi- Point Communication Services for Broadband Networks, Dec. 1988, Addeo et al., IEEE Global Telecommunications Conference, 1988, and Exhibition. 'Communications for the Information Age.' Conference Record, GLOBECOM '88, vol. 1; Nov. 28-Dec. 1, 1988; pp. 53-57.

Multidisciplinary Applications of Communication Systems in Teleconferencing and Education, Oct. 1975, Coll et al., IEEE Transactions on Communications, vol. COM-23, No. 10; Oct. 1975; pp. 1104-1118.

ANI is the key to unlock advanced network services, Nov. 1988, Hegebarth Telephony, v215.n20; Nov. 14, 1988; pp. 64-66.

AT&T plans 2 nationwide ISDN features, Apr. 1988, Electronic News, 1,v34.n1701; Apr. 11, 1988; pp. 21.

Cable operators fight back (pay-per-view TV), Feb. 1987, Stern, Dun's Business Month, v129; Feb. 1987; pp. 54-55.

Unscrambling PPV options (pay-per-view TV), Aug. 1988, Sukow, Broadcasting, v115.n8; Aug. 22, 1988; pp. 39-40.

Data peps up the old voice lines (voice data technology), Sep. 1988, Kulkosky, Wall Street Computer Review, v5.n12; Sep. 1988; pp. 53-59.

Calling Card Service—Overall Description and Operational Characteristics, Sep. 1982, Basinger et al., The Bell System Technical Journal, vol. 61, No. 7; Sep. 1982; pp. 1655-1673.

Calling Card Service—TSPS Hardware, Software, and Signaling Implementation, Sep. 1982, Confalone et al., The Bell System Technical Journal, vol. 61, No. 7; Sep. 1982; pp. 1675-1714.

Calling Card Service—Human Factors Studies, Sep. 1982, Eigen et al., The Bell System Technical Journal, vol. 61, No. 7; Sep. 1982; pp. 1715-1735.

Mass Announcement Capability, Jul. 1981, Frank et al., The Bell System Technical Journal, vol. 60, No. 6; Jul.-Aug. 1981; pp. 1049-1081.

Mass Announcement Subsystem, Jul. 1981, Anderson et al., The Bell System Technical Journal, vol. 60, No. 6; Jul.-Aug. 1981; pp. 1083-1108.

Hello, central; phone conferencing tips, Jan. 1989, Jaffe, Whole Earth Review, No. 65; ISSN: 07495056; Jan. 1989; p. 110.

Why not try "audio teleconferencing"?, Oct. 1987, Menkus, Modern office Technology, vol. 32; Oct. 1987; pp. 124-126.

Dial-It 900 Service Users Guide, AT&T.

AT&T teleconference offerings, Jan. 1987, Douglas, IDATE.

Tempo Audio Teleconferencing System Operating Manual, Jan. 1990, ConferTech International.

A History of Alliance Teleconferencing Service, Feb. 1990, Elfrank, AT&T.

A packet-switched multimedia conferencing system, Jan. 1989, Schooler et al., SIGOIS (ACM Special Interest Group on Office Information Systems) Bulletin, vol. 1 No. 1 10, pp. 12-22, Jan. 1989.

CDR 1024, "The ConferCall Service", Jan. 1984-1986, ConferTech International, Inc.

The New Tempo—MB, The Best Just Keeps Getting Better, Jan. 1986, ConferTech International, Inc.

Tempo MBX Product Information Sheet, Jan. 1989, ConferTech International, Inc.

Tempo MBX Feature Guide, "Conferee Features", Jan. 1989, ConferTech International, Inc.

Tempo MBX Summary of System Features, Jan. 1989, ConferTech International, Inc.

Darome's Model 3015/3030 Bridge System, Feature Description and offer for sale, Apr. 1986, Darome.

A Multiport Telephone Conference Bridge, Feb. 1968, Kuebler, IEEE Transactions on Communication Technology, vol. COM-16, No. 1 (Feb. 1968) pp. 168-172.

VCT Quarterly Newsletter, Jan. 1987.

Alliance Teleconferencing Services, AT&T, Jan. 1985.

Alliance Teleconferencing Services, AT&T Alliance Teleconferencing Services: A Guidebook to Effective Teleconferncing, Jan. 1984.

European Patent Office Search Report, from EP Application No. 05015139.8, dated Nov. 13, 2009.

Ackerman, Lorrie F., et al., "The Video Phone: New Life for an Old Idea?" Apr. 1992, pp. 1-47 (paper).

"American, IBM, American Express to Test Automatic Ticket Vendor," *Aviation Daily*, Oct. 30, 1969.

"An ISDN Primer: Technology and Network Implications," *Business Communications Review*, Jan. 1986.

Andrade, Juan M., et al. "Open On-line Transaction Processing With the TUXEDO System," UNIX System Laboratories, *Digest of Papers Compcon Spring 1992*, IEEE Computer Society Press, Feb. 24-28, 1992, pp. 366-371.

Andrews, E.L., "FCC Plan to Set Up 2-Way TV," *The New York Times*, Business Day, Jan. 11, 1991, p. C1.

Angiolillo, J., et al., "Personal Visual Communications Enters the Market Place," *Visual Communications, AT&T Technology Products, Systems and Services*, vol. 7, No. 3, Fall 1992, pp. 18-28.

Applebaum, Simon, "Two-Way Television," *CableVision*, Aug. 8, 1983, p. 66.

Arnbak, J., "ISDN: Innovative Services or Innovative Technology?" *Proceedings of the IFIP TC 6/ICCC Joint Conference on ISDN in Europe*, Apr. 25-27, 1989, pp. 45-51 and pp. 405-411.

"AT&T Picasso Phone Still-Image Phone Gets New Secure Capability," *AT&T News Release*, Jun. 7, 1994.
"Picasso Phone Sends High-Quality Images Over Ordinary Lines," *AT&T News Release*, May 11, 1993.
*Auerbach on Data Collection Systems*, Auerbach Publishers, Inc., Jan. 1972, Chapters 3, 4, 5 and 13.
Bocker, P. *ISDN The Integrated Services Digital Network*, Springer-Verlag Berlin Heidelberg, Jan. 1988, pp. 1-52.
Bowen, Charles, et ano., *How to Get the Most Out of CompuServe*, $5^{th}$ Ed., Bantam Books, 1993, Table of Contents pp. v-xxi; "CompuServe Mail" pp. 50-55; Chapter 12 "Shopping," pp. 283-299; and Appendix pp. 453-455, Jan. 1993.
Brand, Stewart "Founding Father," *Wired*, Mar. 9, 2001.
Brittan, David, "Being There the Promise of Multimedia Communications," *Technology Review*, May/Jun. 1992, pp. 44-50.
Broom, Michael, "AT&T Launches Online Buying for Wireless Products and Services; Largest Wireless Carrier to Offer Automated Online Store," Business Wire, Oct. 29, 1998.
Cerbone, R., "The Coming HDTV Wave," Visual Communications, *AT&T Technology Products, Systems and Services*, vol. 7, No. 3, Fall 1992, pp. 14-17, Sep. 1992.
Cheung, J.B., et al. "ISDN: Evolutionary Step to Integrated Access and Transport Services," *AT&T Bell Laboratories Record*, Nov. 1985.
Del Rosso, Laura, "Marketel Says It Plans to Launch Air Fare 'Auction' in June," *Travel Weekly*, Apr. 29, 1991.
Del Rosso, Laura, "Ticket-Bidding Firm Closes Its Doors," *Travel Weekly*, Mar. 12, 1992.
Delatore, J.P., et al., "ISDN Data Networking Applications in the Corporate Environment," *AT&T Technical Journal*, vol. 67, No. 6, Nov./Dec. 1988, pp. 107-120.
"Electronic In-Home Shopping: Our Stores Are Always Open," *Chain Store Age Executive*, Mar. 1985, pp. 111, 116.
Ellis, M.L., et al., "INDAX: An Operational Interactive Cabletext System," *IEEE Journal on Selected Areas in Communications*, vol. SAC-1, No. 2, Feb. 1983, pp. 285-293.
Englander, A.C., et al. "Creating Tomorrow's Multimedia Systems Today," Visual Communications, *AT&T Technology Products, Systems and Services*, vol. 7, No. 3, Fall 1992, pp. 24-30, Sep. 1992.
Ensor, J. Robert, et al., "The Rapport Multimedia Conferencing System—A Software Overview," *AT&T Bell Laboratories*, IEEE, 1988, pp. 52-58, Jan. 1988.
Ericson, D., et al., "New Concepts of Addressability," *Pay Per Views*, Dec. 1989, vol. 3, No. 1, pp. 8, 10, 12-14, Jan. 1989.
Francas, M., et al., "Input Devices for Public Videotex Services," *Human-Computer Interaction—INTERACT '84*, Proceedings of the IFIP Conference Sep. 4-7, 1984, pp. 171-175, Jan. 1984.
Fry, Jason, "Buying the Goods, Person to Person," *The Wall Street Journal*, Dec. 7, 1998.
Gawrys, G.W., "Ushering in the Era of ISDN," *AT&T Technology*, vol. 1, No. 1, 1986, pp. 2-9.
Godfrey, D., et al., *The Telidon Book—Designing and Using Videotex Systems*, Reston Publishing Company, Inc., 1981, pp. 1-103, Jan. 1981.
Golden, Fran, "AAL's Riga Doubts Marketel's Appeal to Retailers," *Travel Weekly*, Nov. 13, 1999.
Gould, D., "Audio Response Units," *Pay Per Views*, Sep. 1989, pp. 19-20, 22.
Harvey, D.E., et al., "Videoconferencing Systems: Seeing is Believing," Visual Communications, *AT&T Technology Products, Systems and Services*, vol. 7, No. 3, Fall 1992, pp. 7-13, Sep. 1992.
Heidkamp, Martha M., "Reaping the Benefits of Financial EDI," *Management Accounting*, May 1991, pp. 2-3, 39-43.
Herr, T.J., "ISDN Applications in Public Switched Networks," *AT&T Technology*, vol. 2, No. 3, 1987, pp. 56-65, Jan. 1987.
"ICS Launches New In-Home Interactive Video Service Package," *CableVision*, Sep. 3, 1984, pp. 71, 73.
Imai, R., "Multimedia Communication Technology," *Fujitsu Scientific & Technical Journal*, No. 2, Summer 1992, Jun. 1992.
*Introduction to ISDN*, Online Publications, pp. 1-79, Jan. 1987.
*ISDN Reference Manual (Integrated Services Digital Network)*, AT&T, Jul. 1987 (Manual).
*ISDN Strategies*, Sample Issue, Jan. 1986.
*ISDN Strategies*, vol. 1, No. 1, Jul. 1986.
*ISDN Strategies*, vol. 2, No. 3, Mar. 1987.
*ISDN Strategies*, vol. 3, No. 12, Dec. 1988.
*ISDN Strategies*, vol. 4, No. 1, Jan. 1989 through vol. 4, No. 7, Jul. 1989.
Kamin, I., *Questions and Answers About TV*, Howard W. Sams & Co., Inc., 1973.
Kauza, J.J., "ISDN: A Customer's Service," *AT&T Technology*, vol. 4, No. 3, 1989, pp. 4-11.
Kim, B.G., "Current Advances in LANs, MANs & ISDN," Artech House, Inc., 1989, Chapter 4, Jan. 1989.
Kuhl, C., "Operators' Handbook the PPV Billing Challenge is Keeping it Simple While Obtaining Valuable Marketing Information," *CableVision*, Jan. 15, 1990, pp. 49, 52.
Kuttner, Robert, "Computers May Turn the World Into One Big Commodities Pit," *Business Week*, Sep. 11, 1989.
Lachenbruch, D., "Video News," *Radio Electronics*, Dec. 1989.
Long, J., et al., "Transaction Processing Using Videotex or Shopping on Prestel," Human-Computer Interaction—INERACT '84, Proceedings of the IFIP Conference, Sep. 4-7, 1984, pp. 251-255.
"AT&T Receives FDA Approval to Market Picasso as Diagnostic Tool," *Lucent Technologies Press Release*, Mar. 9, 1995.
"MCA Discovision," (Manual/Brochure), Jan. 1979.
Miller, Michael, "Using CompuServe," $2^{nd}$ Ed., Que Corporation, 1994: Contents at a Glance / Introduction; Chapters 12, 13, 14, 15, 16, 17, 18, 36, 38 and 39 (face page only), Jan. 1994.
Neville, T., et al., "The Application of National Ani to Pay-Per-View Ordering," *1988 NCTA Technical Papers*, Jan. 1988.
*Online Review*, vol. 3, No. 2, 1979, pp. 140-141 (Article), Jan. 1979.
Pelline, Jeff, "Travelers Bidding on Airline Tickets: Sf Firm Offers Chance for Cut-Rate Fares," *San Francisco Chronicle*, Section A4, Aug. 19, 1991.
Perry, Y., "Data Communications in the ISDN Era," *Proceedings of the IFIP TC6 First International Conference on Data Communications in the ISDN Era*, Mar. 4-5, 1985.
Posko, A.L., "Versatile Services Streamline Global Videoconferencing," Visual Communications, *AT&T technology products, Systems and Services*, vol. 3, No. 3, Fall 1992, pp. 2-8, Sep. 1992.
*Prodigy Made Easy*, $2^{nd}$ Ed., Osborne McGraw Hill, Jan. 1993, Table of Contents; Foreword, Chapters 6 and 10.
"Profit From Impulse Pay-Per-View," *Telephony*, Jul. 14, 1986 (Advertisement).
"Ref. FCC Tariff Nos. 2, 4, 9," Apr. 1988 (Article).
Ritter, Jeffrey B., "Scope of the Uniform Commercial Code: Computer Contracting Cases and Electronic Commercial Practice," 45 Bus. Law.2533,2535 (Aug. 1990).
Schrage, Michael, "An Experiment in Economic Theory; Labs Testing Real Markets," *The Record*, Section B1, Nov. 26, 1989.
"Shopping Via a Network is No Longer Just Talk," *Data Communications*, Aug. 1981, p. 43.
Spiedel, Richard E., "Impact of Electronic Contracting on Contract Formation Under Revised UCC Article 2, Sales", C878 ALI-ABA 335 (Dec. 9, 1993).
"System Will Enable Customer to Establish Prebilled 'Credit Bank'," *Communications Daily*, Aug. 15, 1990.
Takei, Daisuke, "Videotex Information System and Credit System Connecting With MARS-301 of JNR," *Japanese Railway Engineering*, No. 95, Sep. 1985, pp. 9-11.
Teweles, Richard J., et al., *The Stock Market*, $5^{th}$ Ed., John Wiley & Sons Inc., Series Preface and Chapt. 9, Jan. 1987.
Wright, Peter, "Vision by Telephone," *Computer Systems*, No. 1, Jan. 6, 1986.
"Wurlitzer Card Control: Unveiled at the Recent National Automatic Merchandising Association Convention was This Magnetic Card Vending System From Deutsche Wurlitzer GmbH," *Vending Times*, Nov. 1979 (Article).
Yager, T., "Better Than Being There," *Byte*, No. 3, Mar. 18, 1993.
Zilles, S.N., "Catalog-Based Order Entry System," *IBM technical Disclosure Bulletin*, vol. 25, No. 11B, Apr. 1983, pp. 5892-5893.
"Digital Image Communications at the Practical Stage," *Nikkei Communications*, Nikkei BP, May 4, 1992, No. 125, pp. 31-37.

Ishii, "Multimedia System Which Will Exercise the Greatest Power in Business Use," *Nikkei Computer*, Aug. 12, 1991, No. 260, pp. 93-102.

Takahashi, Unipher, "Placing the Order After Checking Pictures of Goods With a Terminal at a Jewelry Store," *Nikkei Computer*, May 4, 1992, No. 280, pp. 80-90.

Anonymous; "New replacement Service Saves Insurers Money, Satisfies Insured"; Canadian Insurance; Toronto; Aug. 1982; extracted on Internet from Proquest database.

Baran, Paul, Some Changes in Information Technology Affecting Marketing in the Year 2000, Changing Marketing Systems, 1967 Winter Conference, Dec. 27-29, 1967, pp. 76-87, No. 26. (or pp. 76-77).

Britton, David, "Being There—The Promise of Multimedia Communications", Technology Review, (May 16, 1992,) pp. 43-50, May/Jun. 1992.

Levine, Kay, Anchorage Daily News, Troubleshooter; [Final Edition 30]. Anchorage, Alaska. Jul. 16, 1991. p. B.2.

Nash, Edward L., "Direct Marketing, Strategy, Planning, Execution", $3^{rd}$ Edition, McGraw-Hill, Inc., 1994, pp. 164-165, 364-367.

Peppers et al., "The One to One Future Building Relationships One Customer at a Time", © 1993, 1996, pp. 3-17; 40-43.

Resnick, Paul, GroupLens: An Open Architecture for Collaborative Filtering of Netnews, Proceedings of the ACM 1994 Conference on Computer Supported Cooperative Work, Abstract, pp. 175-186.

Robinson, Phillip; "Laptop and palmtop computers have disadvantages but also some nice pluses"; Austin American Statesman; Austin, Tex; Mar. 9, 1992 extracted on Internet from Proquest Database.

Gelman, A.D., et al., "A Store-and-Forward Architecture for Video-on-Demand Service," 1991 IEEE, pp. 842-846.

Gardner, W. David, "Computer Users Have Hundreds of Data Bases to Choose From," *Dun's Business Month*, Apr. 1983, pp. 99-100.

Veit, Stan, "The Computer Network Maze, Part 2: Concluding a description of how the various computer communications networks can be utilized to your best advantage," *Computers & Electronics*, vol. 21, No. 4, Apr. 1983, pp. 84-90.

Globecom '82, IEEE Global Telecommunications Conference, Conference Record vol. 3 of 3, Miami, Nov. 29 to Dec. 2, 1982.

Comp-U-Store System Could Change Retail Economics, Direct Marketing, vol. 46, No. 3, Jul. 1983, pp. 101-107.

Nelson, Stephen, "Using Prodigy," Complete Introduction to Online Services, QUE Corporation, 1990, 337 pgs. (Book).

"IBM System/360 Disk Operating System—Basic Telecommunications Access Method," Apr. 1986, IBM Systems Reference Library, 6th Edition, File No. S-360-30, Form No. C-30-5001-5, 186 pgs.

Emerson, Jim, "Prodigy Working on Full-Color Art; Prelude to Cable Shopping Service," DM News, Aug. 23, 1993, p. 10.

Bjorner, Susan N., "Shop Online for Holiday Food," LexisNexis Journal, vol. 9, No. 6, Nov./Dec. 1992, pp. 1-2.

Peapod User Manual, Peapod, Inc., Version 3.10, Aug. 7, 1992, 83 pgs.

Transcript of Video File: Peapod 1993, Transcribed by Allison Ash-Hoyman, Mar. 11, 2014, 19 pgs.

Superconductivity Goes to Sea, Popular Science, a Times Mirror Magazine, Nov. 1992, pp. 92-103.

Munoz, Jose A., JCPenny Internal Correspondence re: TV Answer Interactive Video Data Service, Apr. 12, 1993, 11 pgs.

Last. Richard E., JCPenny Internal Correspondence re: TV Answer Press Release, Mar. 31, 1992, 6 pgs.

Transactions, the Source of Information in and Around the Nation's Leader in Interactive Television, Dec. 1993, vol. 2, 8 pgs.

EON Story Board Screens, Aug. 19, 1993, 10 pgs.

Material from TV Cataloger Application, sent by TV Answer on Apr. 21, 1993, 15 pgs.

Personal Shopper Description, sent by TV Answer to JCPenny on Mar. 2, 1993, 6 pgs.

Transcript of video file: Inteletext Systems Inc., 1992, Transcribed by: Melissa Snyder, 6 pgs.

Transcript of video file: ICTV Inc., 1993, Transcribed by: Melissa Snyder, 2 pgs.

W. L. Hoarty, Raleigh, Mar. 23, 1995, 93 pgs.

Little, T. D. C., et al., "A Digital On-Demand Video Service Supporting Content-Based Queries," MCL Technical Report Aug. 1, 1993, pp. 1-25.

Little, T. D. C., et al., "Probabilistic Assignment of Movies to Storage Devices in a Video-on-Demand System," MCL Technical Report Nov. 1, 1993, pp. 1-15.

Maddox, Kate, "New Shopping Service Lets TV Users Browse," Electronic Media, Technology Section, Jan. 17, 1994, 1 pg.

Aho, Debra, "What Cart? Turn on the TV to Buy Food," Advertising Age, Crain's International Newspaper of Marketing, Section 1, Jan. 10, 1994, pp. 1, 39.

"ShopperVision and Shoppers Express Form New Company to Provide the First Multiple-Platform, Interactive Home Shopping Service," ShopperVision, May 19, 1994, 9 pgs.

"Time Warner Cable and ShopperVision to Offer Home Shopping," Jan. 10, 1994, pp. 1-2.

"Time Warner Inc.," The Wall Street Journal, Market Place, Business Brief section, Jan. 11, 1994, 1 pg.

AT&T's Sceptre Videotex Terminal, AT&T Consumer Products, Dec. 1983, 8 pgs.

"Times-Mirror Videotex Test Shows 53% Made Purchases," DM News, Dec. 15, 1983, 1 pg.

The Gateway Videotex Directory Guide, 1985, 53 pgs.

GEnie Live Wire, vol. 1, Issue 5, Dec. 1988, 24 pgs.

Arlen, Gary, "The Giants of Teleshopping," Jun./Jul. 1992, ResponseTV, pp. 14, 16-18, 20, 22 and 24.

TUG Access Guide, Bellsouth Advanced Networks, Transtext Universal Gateway, 1989, Bellsouth Corporation, 105 pgs.

Knight, Jerry, "A Medium in Search of a Message?; Home Shopping Network, Despite Roller-Coaster Past, Still a Made for TV Drama," Jun. 5, 1988, Lexis Nexis Journal, The Washington Post, 5 pgs.

Samuels, Robert C., "When the TV Says Buy, Buy," Oct. 23, 1988, Newsday, Inc., 2 pgs.

Blattberg, Robert C., et al., "Interactive Marketing: Exploiting the Age of Addressability," Sloan Management Review, Fall 1991, vol. 33, No. 1, 12 pgs.

Aldrich, Michael, "Online Shopping in the 1980s," US IEEE 'Annals of the History of Computing.', Oct.-Dec. 2011, vol. 33, No. 4, pp. 57-61, ISSN: 1058-6180.

Winterman, Denise, et al., Online Shopping: The Pensioner Who Pioneered a Home Shopping Revolution Sep. 16, 2013, BBC News, 3 pgs.

Boardwatch Magazine, Electronic BBS and Online Information Services, Feb. 1991, 5 pgs.

Boardwatch Magazine, Dec. 1992, pp. 5, 67-68.

Boardwatch Magazine, Nov. 1993, Table of Contents and pp. 38-40.

Wetzel, Karen Anne, "'Columbus Alive' Breaking all the Rules," Dec. 1, 1977, Citizen-Journal, p. 20.

Wilkinson, Bud, "QUBE System Starts Today: Dream Becomes a Reality," Dec. 1, 1977, Columbus Dispatch, 1 pg.

Sears, Roebuck and Co. Catalogue 1940, 144 pgs.

Sears Catalogue, 1987, 467 pgs.

Online Catalog Order Entry Customer Service Representative Procedures, Sep. 1987, 652 pgs.

Howe, Judith J., "Training for Retail Sales and Profit," 1981, pp. 1-2, 12-13 [Book].

"Consumers Plugging into New Electronic Mall," Advertising Age, Mar. 4, 1985, Crain's International Newspaper of Marketing, 1 pg.

The Electronic Mall Merchant Manual, 40 pgs.

The Electronic Mall, 137 pgs.

"Compuserve—Graphics in the Shopping Area," Boardwatch Magazine, ISSN: 1054-2760, vol. VIII, Issue 1, Jan. 1994, 3 pgs.

CompuServe Magazine, May 1991, 16 pgs.

CompuServe Brochure, CS-956-DG (Mar. 1993), DOS-25, 16 pgs., Mar. 1993.

CompuServe Brochure, CS-221-DG (Mar. 1993), 101 pgs., Mar. 1993.

Travel Services, 1986, CS-597 CompuServe Information Service, pp. 131, 135, 147 and 150.

"Official Airline Guides, Electronic Editions," CS-597 CompuServe Information Service, 1986, Travel section, pp. 143-145.

CS-597 CompuServe Information Service—User Guide (Sep. 1986), Getting Started, 1986, pp. 1-2, 37-39.

CS-597 CompuServe Information Service, Executive Option, 1986, pp. 41-42.
CS-597 CompuServe Information Service, Shopping, 1986, pp. 109-114.
The Reference Library, CompuServe Information Service, CS-702 (Oct. 1991), Information Services for DOS Computers, Version 2, 1991, pp. 1-2, 262-265.
"Installing the CompuServe Information Manager," CS-640 CompuServe Information Service (Nov. 1989), 1989, 7 pgs.
CompuServe Information Manager—Users Guide CS-640 (Nov. 1989), 2 pgs., Nov. 1989.
CompuServe Information Manager—Users Guide CS-640 (Nov. 1989), Shopping, 1989, 6 pgs., Nov. 1989.
Bowen, Charles, et al., How to Get the Most Out of CompuServe, 5th Ed., Bantam Books, 1993, 491 pgs.
Bradd Schepp and Debra Schepp, The Complete Guide to CompuServe, Osborne McGraw Hill, 1990, 623 pgs.
Alber, Antone F., "Videotex/Teletext: Principles and Practices," McGraw-Hill Book Company, 1985, 45 pgs.
Transcript of video file—Videotron, Ltd., Transcribed by: Melissa Snyder, Jun. 6, 2014, 4 pgs.
Ethridge, Don E., "A Computerized Remote-Access Commodity Market: Telcot," Dec. 1978, Southern Journal of Agriculture Economics, pp. 177-182.
Videoway Presentation, Jan. 1990, 20 pgs.
"Cablecaster", Canada's Cable Magazine, Feb. 1991, 24 pgs.
New York Times News Service, Chicago Tribune, "Wall St. Buys Cable Shopping," Jun. 15, 1986, LexisNexis Journal, 2 pgs.
Gale Group, Inc., "Silicon Graphics Delivers Real-Time Collaborative Computing with Inperson Desktop Conferencing," Aug. 3, 1993, LexisNexis Journal, PR Newswire Association LLC, 2 pgs.
Staino, Patricia A., "SunSolutions' ShowMe 2.0: Really Cool Desktop Conferencing; Testdrive; Evaluation," Jan. 1, 1994, LexisNexis Journal, Gale Group, Inc., 2 pgs.
Kennedy, Pagan, "Who Made That? (Universal Product Code)," Jan. 6, 2013, LexisNexis Journal, The New York Times, 2 pgs.
Cespedes, Frank V., et al., "Database Marketing: New Rules for Policy and Practice," Summer 1993, Sloan Management Review, MT, vol. 40, No. 1, 20 pgs.
Final Rejection issued on Jun. 16, 2014, for U.S. Appl. No. 11/675,078, 122 pgs.
Dufresne, Michel, "An Integrated Concept In Home Information Systems," FAM 18.2, 1991 IEEE, pp. 258-259.
Dufresne, Michel, "Videoway System Description," Dec. 1985, pp. 1-26.
Services, Mar. 1988, 7 pgs.
National Case Study Competition/Customer is Key Award Winner, CTAM 1992 Digest, 8 pgs.
Case Study Project: Videoway, http://cordis.europa.eu/infowin/acts/analysys/products/thematic/multi med/document/ccase4.htm, extracted from Internet on Jan. 27, 2014, 3 pgs.
Transcript of Video File—Videoway, Transcribed by Allison Ash-Hoyman, Mar. 10, 2014, 6 pgs.
2 Montreal Cable TV Companies Will Be First to Offer Tele-Shopping; Channels Cleared for New Ads, The Gazette [Montreal, Que], Aug. 20, 1986, 2 pgs.
Videotron Eyes Home Banking, Tele-Shopping, The Gazette [Montreal, Que], Jan. 23, 1986, 1 pg.
Cable Firm Wants Control of Lucrative Montreal TV Company, The Ottawa Citizen [Ottawa, Ont.], Jul. 31, 1986, 2 pgs.
Consumer-Union Group Tele-Metropole Takeover Scuttled, The Gazette [Montreal, Que], Nov. 27 1986, 1 pg.
Viescas, John L., "The Official Guide to PRODIGY Service," Microsoft Press, 1991, 401 pgs (Book).
Eaasy Sabre—A SABRE Travel Information Network Product, American Airlines, Oct. 24, 1988, pp. 1-6.
Eaasy Sabre—Fact Sheet, American Airlines, Mar. 3, 1987, 4 pgs.
Stasi, Dom, "Interactive Electronic Home Shopping an Update on the Telaction Approach," Telaction Corp., 1985-1986, pp. 1-7.
"JCPenny Introduces TV Shopping Service That Gives Consumers Choice of Stores, Products," JCPenny News Release, Feb. 18, 1987, 21 pgs.
Telaction Fact Sheet, Telaction Corporation, Apr. 27, 1988, 6 pgs.

Fischer, J., et al., "Telaction—Company Secret," Apr. 29, 1987, 47 pgs.
Confidential Evaluation Material on Telaction, Kidder, Peabody & Co., Jan. 1989, 84 pgs.
Telaction Guide, Guide No. 1, "Shopping at the Speed of Life," Aug. 15-Sep. 10, 1988, 16 pgs.
Transcript of Video File: "Telaction Precursor," Transcribed by Allison Ash-Hoyman, Feb. 17, 2014, 11 pgs.
Kane, Pamela, "Prodigy Made Easy", 2nd Ed., Osborne McGraw Hill, 1993, 341 pgs (Book).
Transcript of Video File, "Prodigy Commercial Version 2 (1990)," Transcribed by Allison Ash-Hoyman, Feb. 17, 2014, 4 pgs.
Transcript of Video File: "Telaction Extended," Transcribed by Allison Ash-Hoyman, Mar. 9, 2014, 15 pgs.
Neches, Robert, "FAST Workstation Project Overview," Information Science Institute Research Report, ISI/RR-88-203, Jul. 1988, 27 pgs.
Microelectronic System News, "FAST—A Computer Network Broker for Off-the-Shelf Items," Oct. 1993, http://web.eecs.utk.edu/~bouldin/MUGSTUFF/NEWSLETTERS/DATA/4014.html, pp. 1-4.
FAST Acquisition Research, Sep. 20, 1985, 42 pgs.
Proposal to the Defense Advanced Research Project Agency Government Application of FAST Technology, Information Sciences Institute, University of Southern California, Jan. 20, 1989, 87 pgs.
Dr. Gagnon, Diana, "Interactive Television: The State of the Industry," Published by Arlen Communications Inc., May 1990, 83 pgs.
Hamilton, Tony, et al., "Summary: GTE and Daniels Cablevision to Provide Main Street Interactive-Television Service to Homes in Carlsbad, Calif," Dec. 2, 1992, News, Main Street Booklet, 5 pgs.
"Main Street Consumer Research, Research Deliverables-Standard Package", Letter by Main Street, Nov. 26, 1991, 2 pgs.
Main Street Boston Tests Again; Upscale Service Offers Shopping, Banking, Travel, Electronic Shopping News, Oct. 1987, Arlen Communications Inc., pp. 2-3.
Motavalli, John, "GTE Technology Could Revolutionize Approach to Home Shopping and PPV," Business Development, Cablevision, Sep. 14, 1987, p. 59.
Dawson, Fred, "GTE's Dream Machine: Cerritos Could Launch Vast Array of New Enterprises for Giant Firm," Media Watch, Cablevision, Sep. 14, 1987, pp. 52-56.
"GTE Will Expand Test to 1,000 Homes: Philadelphia Test Next," Main Street, Electronic Shopping News, May 1988, Arlen Communications Inc., 6 pgs.
Jones, Richard A., et al., "GTE and AT&T Trial to Bring Information Superhighway' to Customers in the Manassas, VA., Area," News, GTE Telephone Operations, Jan. 17, 1994, 4 pgs.
Hergert, Douglas, "How to Use Prodigy," (Book), ZD Press, 1994, 155 pgs.
"Prodigy Service Overview", Apr. 1994, Prodigy Service, 11 pgs.
Transcript of Video File, "Prodigy Commercial Version 1 (1990)," Transcribed by Allison Ash-Hoyman, Feb. 17, 2014, 4 pgs.
"Travel Agents Book Holidays Through the Telly," Information Management, Business News, May 1981, 2 pgs.
"Teleputers Enable GM's Dealers to Reach Parts Other Systems Can't," Information Management brochure, Spring/Summer 1986, 2 pgs.

\* cited by examiner

*Primary Examiner* — Stella Woo
(74) *Attorney, Agent, or Firm* — Wolff & Samson, PC.

(57) ABSTRACT

In conjunction with the dial-up public telephone system, voice quality lines carry videophone signals for monitoring a multitude of locations from at least one central station for use in a variety of applications, such as for security, surveillance, quality control and inspection, regulation of food and/or other standards in food-related and other facilities, market research, remote monitoring of deposit and withdrawal of funds at bank vaults, grocery chains, convenience stores, and the like. At the central station, telephonic interface apparatus is actuated by a control unit to selectively accomplish a telephonic connection with a remote location. Displays include the scene at the remote location and related graphic data. During routine operation, remote locations are displayed in sequence to at least one operator. Such operation may be interrupted either from a remote location or central station in the event of an urgency. In such an event, the concerned scrutiny location is displayed for further communication involving status, camera selection, camera configuration, audio, video and so on. Incoming calls from scrutiny stations imply an urgent situation for immediate display. The called number, by dialed number identification system (DNIS) may indicate the status while the calling number identifies the location by automatic number identification (ANI) signals. Alternative signaling and code techniques afford flexible operation as with respect to various graphic and status indications available for displays.

A traffic control system selectively interfaces members of plural groups, as buyer groups and vendor groups, for video communication through a dial-up telephone system, for analyzing and compiling data, scheduling appointments, implementing conferences, consummating sales and the like. The traffic-control system comprises a telephonic interface apparatus for interfacing remote telephonic terminals of the dial-up telephone system identified with the members of plural groups, a video recording unit for recording and playing video transcriptions, a storage memory for storing data on the members, including telephonic terminal numbers and area-of-interest codes and a control computer to selectively interconnect the video recording unit with the remote telephone terminals through the telephonic interface apparatus to record and receive video communication.

192 Claims, 15 Drawing Sheets

EXEMPLARY BUYER REQUEST FORM

DATE  12-7-93   TIME  8:45 AM PST   BUYER CO. FOOD 4 LESS   SPECIFIC BUYER  LARRY ISHII

VIDEO UNIT  714 668 5335   YOUR REFERENCE #  5127   MERCHANDISE CODE  472361

GENERAL CATEGORY  BASIC HEALTH AND BEAUTY AIDS   SPECIAL CATEGORY  SHAMPOO & CONDITIONERS

SUBMIT PRESENTATION

REQUEST SPECIFICS

CONDITIONING SHAMPOO FOR THE U.S. MARKET
    PAPAYA BASED
    12 OZ. BOTTLE
    UNDER $2.00 NET COST
    MUST BE AVAILABLE DELIVERED TO FULLERTON, CA BY 12-18-93, 8:00 AM PST
    MINIMUM 10,000 UNITS
    DATE/TIME OFFERS REQUIRED BY  12-7-93, 3:00 PM (PST)

*FIG. 20*

EXEMPLARY NOTIFICATION RECEIPT

YOUR #5127 RECEIVED, ASSIGNED TELEBUYER #681296
DISTRIBUTED TO 736 VENDORS

*FIG. 21*

SECURITY MONITORING SYSTEM WITH FLEXIBLE MONITORING SEQUENCE

CROSS-REFERENCE TO RELATED APPLICATIONS

This application is a continuation of co-pending application Ser. No. 09/371,212, entitled "METHOD FOR BUYER-SELLER ON-LINE COMMERCE" and filed on Aug. 10, 1999, now U.S. Pat. No. 7,848,496, which is a continuation of application Ser. No. 08/189,405, entitled "COMMERCIAL PRODUCT ROUTING SYSTEM WITH VIDEO VENDING CAPABILITY" and filed on Jan. 27, 1994, now U.S. Pat. No. 6,323,894, which is a continuation-in-part of application Ser. No. 08/154,313, entitled "SCHEDULING AND PROCESSING SYSTEM FOR TELEPHONE VIDEO COMMUNICATION" and filed on Nov. 17, 1993, now U.S. Pat. No. 5,495,284, which is a continuation-in-part application of application Ser. No. 08/067,783, entitled "VIDEOPHONE SYSTEM FOR SCRUTINY MONITORING WITH COMPUTER CONTROL" and filed on May 25, 1993, now abandoned, which is a continuation-in-part application of application Ser. No. 08/031,235, entitled "VIDEOPHONE SYSTEM FOR SCRUTINY MONITORING WITH COMPUTER CONTROL" and filed on Mar. 12, 1993, now U.S. Pat. No. 5,412,708. The subject matter in all the above-identified co-pending and commonly owned applications is incorporated herein by reference.

This application is also a continuation-in-part of co-pending application Ser. No. 11/205,250, entitled "VIDEOPHONE SYSTEM FOR SCRUTINY MONITORING WITH COMPUTER CONTROL" and filed on Aug. 16, 2005, now U.S. Pat. No. 7,425,978, which is a continuation of application Ser. No. 08/407,064, entitled "VIDEOPHONE SYSTEM FOR SCRUTINY MONITORING WITH COMPUTER CONTROL" and filed on Mar. 20, 1995, now U.S. Pat. No. 7,019,770, which is a continuation of application Ser. No. 08/067,783, entitled "VIDEOPHONE SYSTEM FOR SCRUTINY MONITORING WITH COMPUTER CONTROL" and filed on May 25, 1993, now abandoned, which is a continuation-in-part application of application Ser. No. 08/031,235, entitled "VIDEOPHONE SYSTEM FOR SCRUTINY MONITORING WITH COMPUTER CONTROL" and filed on Mar. 12, 1993, now U.S. Pat. No. 5,412,708. The subject matter in all the above-identified co-pending and commonly owned applications is incorporated herein by reference.

BACKGROUND OF THE INVENTION

The present invention relates generally to security systems and more particularly to a videophone system for monitoring remote locations from a central unit for use in a variety of applications, such as for security, surveillance, quality control and inspection, regulation of food and/or other standards in food-related and other facilities, market research, remote monitoring of deposit and withdrawal of funds at bank vaults, grocery chains, convenience stores, and the like.

Over the years, a multitude of security and surveillance systems have been proposed for monitoring various locations for different reasons. For example, it is particularly desirable to monitor locations involving some exposure to risk or peril. Generally, the objectives have included discouraging an intruder, notifying security personnel, as police, and providing some form of record of any criminal activity. Various forms of photographic devices have been proposed for use in such systems; however, the advent of television substantially enhanced the possibilities for scrutiny or surveillance of a location. In that regard, large modern office buildings are seldom without an internal closed-circuit system with a guard station displaying several significant locations within the building. Accordingly, a single guard can monitor a sizeable building, summoning help to a problem location. Furthermore, it has been proposed to record monitor displays for subsequent study and analysis in the event of a crisis.

While previous monitoring systems have been effective, particularly in conjunction with a single facility, there have been attendant limitations. For example, simple television displays often do not clearly manifest a potential or existing problem. Also, such systems are not susceptible to programmed operation, enabling an expert to flexibly monitor a sizeable number of individual locations. Furthermore, in accordance herewith, the present invention recognizes the need to expand the capability of monitoring to accommodate security locations over a widely distributed area. As a further consideration, needs also are recognized for increased communication capability, enhanced displays and expanded control of the displays.

Surveillance of facilities for reasons other then security traditionally involve substantial human involvement. For example, routine inspection of facilities to control quality, regulate and maintain food and/or other standards at franchise and/or company-owned locations (e.g. fast food facilities) or the like, traditionally have required personal visits to such facilities by inspectors employed for such purposes. Unfortunately, more time and expense is incurred in traveling to and from different facilities than is desirable. Moreover, as a practical matter, specific inspectors and/or branch managers are assigned to specific areas, resulting in a need for more inspectors dedicated to inspecting limited areas. The present invention recognizes the need to perform inspections as for controlling quality, etc. at remote locations over a widely distributed area from a central location.

Likewise, the present invention recognizes the need for remote monitoring of deposit and/or withdrawal of funds or executing other transactions at bank vaults, grocery chains or convenience stores, and the like, to deter foul play and/or prevent burglaries. In addition, the need for conducting discrete or interactive market research is also recognized.

Integration of computer and telephone technologies has brought many advances in the telecommunication industry. Functionally integrating human operators with telephone network capabilities, voice and data switching capabilities, computer applications and databases, and voice processing technology not only provides human operators with immediate access to information from a wide variety of sources, but allows them to intelligently process each call as well. Telephone switches are linked with computers to coordinate computer information and intelligence with call handling capabilities to automatically add relevant data, as well as facsimile, graphics, video or audio communication capabilities. Select services or equipment such as automatic number identification (ANI) or dialed number identification service (DNIS) enhance calls and human capabilities by forwarding identifying information preceding a telephone call, thereby, eliminating steps otherwise performed by people to capture information regarding the caller. For applications involving large scale processing of calls, switch and host databases automatically link calls with a caller's record, eliminating the need for the caller to enter an identification number when using a voice response system.

More revolutionary applications use ANI to simultaneously pass both the call and the caller's current record to an operator's telephone and terminal. This obviates the need for a person to obtain, enter and receive the caller's record from the database. Such advances have immensely enhanced human capabilities for communication, data manipulation and control functions.

Somewhat concurrently, rapid developments in computer, telephone and video technologies have introduced the concept of visual communications or video conferencing. In particular, efforts at integrating these technologies have gained enormous momentum in recent years, resulting, in part, from a general desire in all industries to conserve time and expenses, and thereby, maximize human efficiency and productivity. The advent of videophones has enabled users to visually communicate from remote locations. Many industries are rapidly embracing the idea of video conferencing or visual communication to eliminate escalating travel expenses. Employees or customers in different places can take part in interactive training sessions or seminars with no loss of time for travel.

However, obstacles remain, particularly in traditional areas of cumbersome communication. Still, with developments, virtually every industry segment can profit from interactive data sharing in real time with the added advantage of face-to-face communication. Innovative technical advances are fast satisfying promises of enhanced capabilities, thereby, allowing users to share and manipulate images from remote locations, such as pictures, graphs, maps or the like.

Technical breakthroughs in audio and video compression technology make desktop video conferencing and visual communication both economical and practical for everyday business communications. To fully participate in video conferencing, the user's equipment must communicate with similar units, albeit, from different equipment vendors. The International Telephone and Telegraph Consultative Committee (CCITT) has defined a standard called H.261 (or "Px64") detailing how video and audio signals are compressed and decompressed for transmission across a common link. At present, no one industry standard and format has been adopted for video conferencing systems. Thus, the systems available on the market are not always compatible. As a consequence, many different types of video codecs (coders/decoders) are currently in use. For example, the AT&T AVP CODEC is a three-chip set that digitally processes high quality, full motion video images and sounds that are compatible with the latest videoconferencing standards.

At any rate, ongoing efforts at achieving compatibility and providing compression schemes that can transmit color images over POTS (plain old telephone system) all over the world are in the offing. Approaches for incorporating live-action, color video with standard voice telephone lines via networks and modems are currently being introduced. By using a suitable video capture board and a modem, live video may be received and displayed on any 386 or 486 personal computer running Microsoft Windows™. The frame rate depends upon the type of display and type of communication hardware. For example, over a normal dial-up telephone line, a computer with a VGA (video graphics array) display set at 32,000 colors, a 486 CPU and a 14.4 kbs (thousand bits per second) modem can achieve a frame rate of 5 frames per second. The link between the personal computers can be established in several ways, for example, by a modem, LAN (local area network), serial port and other high speed digital links.

To consider an example of cumbersome communication in the merchandising industry, wholesale vendors or sellers of goods typically spend many hours attempting to schedule appointments with various buyers for different organizations, travelling to and from the buyers' facilities, and waiting for meetings, which may sometimes last only a short duration. Unfortunately, considerably more time and expense is incurred, in travelling to and from different facilities, than is desirable. Moreover, as a practical matter, specific vendor sales people are typically assigned to merchandise specific goods and interact with specific buyers, resulting in a need for more vendor personnel dedicated to particular buyers.

Moreover, in the event a specific seller wishes to broadcast a special offering of a particular item to plural buyers, for example, to dispose of an inventory of distressed items, the seller must undertake considerable effort, such as place an advertisement or otherwise initiate contact with buyers. An advertisement is likely to be viewed only by random buyers, thus, not always proving to be a reliable method of soliciting offers from all possible buyers. Moreover, initiating individual contact with a series of buyers, until eventually securing a final sale, constitutes an arduous task. Similarly, in situations where a buyer wishes to solicit proposals from vendors for a particular item, the same practice prevails.

Accordingly, the present invention recognizes the need for a system to communicate with remote locations over a widely distributed area, from other places, such as a central location, for the applications discussed above as well as many other diverse applications with similar requirements.

SUMMARY OF THE INVENTION

Generally, the system of the present invention involves monitoring and communicating with a plurality of remote, widely distributed locations, from a central unit utilizing dial-up telephone facilities in today's computer environment with voice quality lines under computer control. Specifically, the dynamic graphics of telephonic video along with audio capabilities are combined with the interactive capability of computers to attain an effective scrutiny or surveillance system. The system of the present invention contemplates use for applications ranging from, prevention of armed robberies and burglaries to quality control and regulation, as of food and sanitation standards, as in food related facilities and the like, discrete or interactive monitoring for market research, monitoring of deposit and withdrawal of funds, as at bank vaults, grocery chains and convenience stores, and so on.

In the disclosed embodiment of the present invention, videophone cameras and speakerphones or regular telephone instruments (for one-way or two-way communication) are placed at remote locations to communicate with a central system that may include several communication and control stations. A video scene display (depicting motion and color) may be provided with graphics, audio and data signals at each communication and control station. The control station may utilize well known image enhancement techniques to allow high resolution images for closer observation.

In one exemplary operating format, identification designations for scrutiny locations are provided in sequence to address a memory for fetching telephone numbers and/or graphic display data. Accordingly, in sequence, scrutiny locations are dialed up via the public telephone system to obtain audio-video communication providing an image of the location scene. Additionally, data associated with the location is graphically displayed for convenient reference. For example, it should be noted that for security applications, response time (e.g., to call the police) is often critical, thus having and displaying the data in conjunction with the video allows for action to be taken immediately if required, either automatically or manually. Note also that the display also may include, the location and graphical data indicative of the floor plan of the premise scrutinized, for example the physical location of entry/exit points and the corresponding streets provided simultaneously with the video scene images.

The sequence of displays may be random or predetermined, as programmed along with intervals of display. For example, a remote location under scrutiny might be observed for thirty seconds once every ten minutes. Alternatively, at a single remote location, varying in observation times for different cameras installed may be programmed. For example, when viewing a bank having a plurality of cameras, the view from a first camera might be taken for twenty seconds, followed by a view from a second camera for ten seconds, then zooming onto a vault that would appear in the view from a third camera for ten seconds.

For each scene display, a graphic display of pertinent data is provided, for example, indicating the telephone number, the location name, e.g. a bank, market or inspection site, the address of the location, the telephone number of the police station serving the location for security applications, key personnel at the location and so on. When monitoring banks and other types of locations susceptible to robbery, the status or nature of the situation, e.g., an "emergency" or "alert", also may be displayed. A detector for detecting situations when a camera is inoperative, as where the lens is covered to prevent observation, may be used to convey another "alert" situation.

On command, either from a scrutiny location or the central station, a communication may be commanded to indicate a situation. Special controls may be instituted enabling manifestations at the scrutiny location to initiate action or alter the display. Special operations also may be commanded through a videophone, either on manual initiative or automatically by sensor apparatus.

A video recorder and/or printer may be located at a remote location or central unit for selectively or continuously obtaining a video recording or computer printout of displays.

Multiple control units may be employed to monitor widely distributed locations with capabilities to route calls to each other in the event all the communication lines are occupied and there is a considerable backlog of calls may also be prioritized.

At each control unit, multiple operators at single monitors may be utilized, with calls sequenced to each operator depending upon the cumulative handling capability of each operator. For example, if a particular operator is handling calls at the average rate of six seconds each, calls to that operator will be sequenced at that rate. Alternatively, a single operator viewing a single monitor or multiple monitors is also contemplated. Furthermore, selective distribution of calls may be appropriate, for example calls reporting on "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature.

Generally, the system of the present invention involves traffic regulation and control for video communication between a plurality of remote, widely distributed locations, from a central unit, utilizing dial-up telephone facilities in today's computer environment, and with voice quality lines. Specifically, for example the dynamic graphics of telephonic video (on standard analog lines and digital lines over Integrated Services Digital Network (ISDN)) facilitate videophone, while video still displays and digital lines facilitate high fidelity (hi-fi) video displays along with audio capabilities, all combined with the interactive capability of computers to attain an effective commercial product routing system with video vending capability.

The system of the present invention contemplates applications ranging from merchandising (including purchasing, selling, marketing or the like) to educational conventions for medical doctors and other professionals, game shows, dating services and so on. The present system is configured to direct and exchange communication traffic, for example, in the form of offers and responses, between selective members of plural groups or sub-groups, such as vendors and buyers, for analyzing and compiling data, scheduling appointments and implementing visual conferences, consummating transactions and the like. Selective routing of communication traffic from a central unit or controlled by the central unit effectively prevents information overload.

In one disclosed embodiment of the present invention, personal computers equipped with capabilities for providing either analog video (analog motion and analog high resolution freeze frame) or digital video or both, and speakerphones (or regular telephone instruments), for one-way or two-way communication are placed at each of a plurality of remote locations to communicate with a central unit that may include several communication and control stations also equipped with some or all of the same capabilities. As a part of traffic control operations, a video display (depicting motion and color) may be provided with graphics, audio and data signals, at each communication and control station, as well as, the remote locations. The personal computers may utilize well known image enhancement techniques to facilitate high resolution images for closer observation.

In accordance with one exemplary embodiment related to wholesale merchandising, a telephonic interface appointment scheduling and routing system includes a central traffic control system, independently managed by a third party and located remote from all vendors' and buyers' facilities. The central traffic control system schedules appointments and routes offers and responses to and from select members of plural groups, such as buyers and vendors, to expedite traditionally complex purchasing operations. Routing of offers and responses may also take place between members of subgroups of plural groups. Calls may be classified into types, for example, a vendor with a special offering, a buyer responding to a special offering, a buyer soliciting proposals, a vendor responding with a proposal and a vendor or a buyer seeking an appointment. Calls of the various types may involve some form of qualification or approval. For example, access to the system may be limited to qualified or registered entities. Also, certain limitations may be imposed, such as calls revealing one vendor's proposal to a competitor are inhibited.

In accordance with an example, a vendor may wish to broadcast a special offering of a particular item to interested buyers. The routing system analyzes buyer data, typically acquired during registration, and compiles a list of buyers to whom the broadcast is transmitted. Special buyers may be specified by the vendors making the special offering. For example, a vendor may designate special buyers from a list of all participating buyers and vendors provided to each registered member. From time to time, periodic updates on new members may be circulated.

To facilitate equitable routing of special offerings to all interested buyers, in situations, where there are only a limited number of communication lines, the routing system may include a random number generator to randomly select subsets of buyers and may transmit the broadcast in sequence to each subset. In some situations, the routing system may have the capability to request and add additional communication lines in the event a caller (vendor or buyer) desires concurrent broadcast to all potential receiving parties. Of course, in such cases the caller would incur the additional charges. A numbering system may also be adopted, whereby broadcasts are transmitted to subsets of a designated number of buyers (for example, equal to the number of communication lines) in rotating sequence. For example, a particular special offering may be broadcast first to subset number one, then subset number two and so on, while the next special offering may be broadcast first to subset number two, then subset number three and so on.

A video recording of the offered item may be stored in a video file server at the central location, thus, allowing interested buyers to view the item prior to making a purchase. Likewise, buyers may wish to solicit proposals for a particular item from vendors qualified for designated merchandise. Communication between the routing system and the different buyers and vendors may be accomplished in a variety of ways, as for example, by electronic-mail (transmission of messages across a network between two desktop PCs), electronic bulletin boards, on-line computer services (such as Prodigy® or CompuServe®), facsimile, voice-mail or the like.

Vendors and buyers may directly communicate with the central traffic control system to seek or change appointments and update information with respect to appointments with specific buyers. In accordance with one scenario, vendors may call the central traffic control system and, upon qualification, schedule appointments with specific buyers.

Appointments may be executed, on command, from a buyer location or the central traffic control system. Communication may be initiated conforming to the display capabilities at the vendor site. That is, as disclosed, the central traffic control system or alternatively, plural coordinated such systems (located at one site or plural sites), as well as, the buyer locations, incorporate multiple video format capabilities along with a bridge or switch unit to drive a display unit or monitor in a selected format in accordance with the capabilities of the current vendor. As disclosed, a single monitor may accommodate several formats or plural monitors can operate selectively for concurrent multiple displays.

A sequence of scheduled appointments may be developed, as programmed along with intervals of video communication. A record of the scheduled appointments is maintained by the central traffic control system.

At the appropriate times, identification designations for remote locations are provided in sequence, to address a memory for fetching telephone numbers and/or graphic display data also recorded when the appointments are scheduled. Accordingly, in sequence, vendor locations are dialed up via the public telephone system, either manually or automatically, to obtain audio-video communication providing an image of the vendor and the surrounding area at a specific vendor location.

Additionally, data associated with a vendor (or a buyer) may be graphically displayed for convenient reference. For each scene display with respect to a specific vendor, the graphic display of pertinent data provided may, for example, indicate the telephone number, the PIN number, the video format, vendor rating, current vendor delivery status and so on.

Special controls such as a mouse may be instituted enabling manifestations at the vendor location to initiate action or alter the display. Special operations also may be commanded through the videophone, video still (high quality) or high fidelity (hi-fi) video means either on manual initiative or automatically by automatic apparatus.

A video recorder and/or video printer may be located at a remote vendor location, central traffic control station or buyer location for selectively or continuously obtaining a video recording or video printout of displays.

Multiple coordinated central traffic control stations may be employed to communicate with widely distributed vendor or buyer locations with capabilities to route calls to each other, in the event that all of the communication lines are occupied and there is a considerable backlog of calls. Calls may be routed to the next available operator (buyer), for example, in the event appointments scheduled for a particular buyer last longer than contemplated, or another buyer familiar with that line of products may step in and handle the appointment.

Under some circumstances it may be desirable to prioritize calls. For example, appointments may be queued in sequence, specific appointments may precede other routed appointments in accordance with an override feature.

A record of the number of calls and related charges incurred by the buyers for appointments is maintained, which may be analyzed and ultimately rebilled to the vendors. Of course, charges for scheduling are incurred directly by the vendors. Also, a record of charges incurred for each caller (buyer or vendor), depending upon the transaction initiated, may be maintained and billed to each caller.

It is not intended that the invention be summarized here in its entirety. Rather, further features, aspects and advantages of the invention are set forth in or are apparent from the following description and drawings.

BRIEF DESCRIPTION OF THE DRAWINGS

A complete understanding of the invention and its advantages may be gained from consideration of the following description of some disclosed embodiments taken in conjunction with the accompanying drawings, in which:

FIG. 20 is an exemplary form indicating a buyer's request; and

FIG. 21 is an exemplary message transmitted from the central traffic station to a buyer or a vendor.

DETAILED DESCRIPTION

Figure 1:
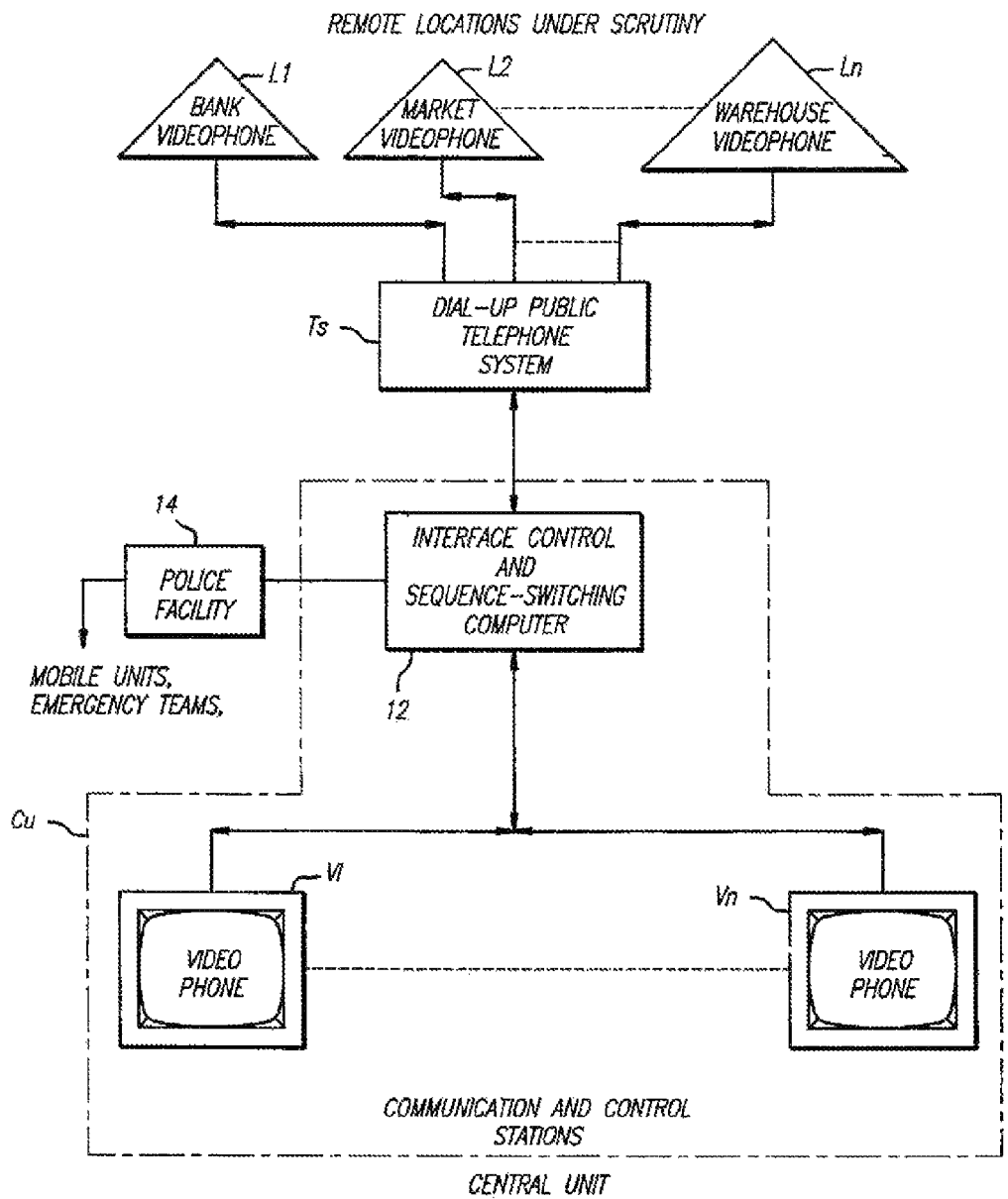
FIG. 1 is a high-level block diagram of a system in accordance with one embodiment of the present invention.

Generally, the system of the present invention involves monitoring and communicating with a plurality of remote widely distributed locations from a central unit utilizing dial-up telephone facilities, in today's computer environment with voice quality lines under computer control. Specifically, the dynamic graphics of telephonic video along with audio capabilities are combined with the interactive capability of computers to attain an effective security system.

Communication between the central system and the remote locations may be accomplished in a variety of ways, as for example, by electronic-mail (transmission of messages across a network between two desktop PCs), electronic bulletin boards, on-line computer services (such as Prodigy™ or CompuServe™), facsimile, voice-mail or the like.

The system of the present invention contemplates use for applications ranging from, prevention of armed robberies and burglaries to quality control and regulation, as of food and sanitation standards, as in food related facilities and the like, discrete or interactive monitoring for market research, monitoring of deposit and withdrawal of funds, as at bank vaults, grocery chains and convenience stores, and so on.

In one embodiment of the present invention, videophone cameras and speakerphones or regular telephone instruments (for one-way or two-way communication) are placed at remote locations to provide signals to a central station that may include several communication and control stations. A video scene display (depicting motion and color) may be provided with graphics and audio and data signals at each communication and control station. The control station may utilize well-known image enhancement techniques to allow high resolution images for closer observation.

In one exemplary operating format, identification designations for scrutiny locations are provided in sequence to address a memory for fetching telephone numbers and graphic display data. Accordingly, in sequence, scrutiny locations are dialed up via the public telephone system to obtain audio-video communication providing an image of the location scene. Additionally, data associated with the location is graphically displayed for convenient reference. For example, it should be noted that for security applications, response time (e.g., to call the police) is often critical, thus having and displaying the data in conjunction with the video allows for action to be taken immediately if required, either automatically or manually. Note also that the display also may include, the location and graphical data indicative of the floor plan of the premise scrutinized, for example the physical location of entry/exit points and the corresponding streets provided simultaneously with the video scene images.

The sequence of displays may be random or predetermined, as programmed along with intervals of display. For example, a remote location under scrutiny might be observed for thirty seconds once every ten minutes. Alternatively, at a single remote location, varying in observation times for different cameras installed may be programmed. For example, when viewing a bank having a plurality of cameras, the view from a first camera might be taken for twenty seconds, followed by a view from a second camera for ten seconds, then zooming onto a vault that would appear in the view from a third camera for ten seconds.

For each scene display, a graphic may display pertinent data, for example by a graphic, for example, indicating the telephone number, the location name, e.g. a bank market or inspection site, the address of the location, the telephone number of the police station serving the location for security applications, key personnel at the location and so on. When monitoring banks and other types of locations susceptible to robbery, the status or nature of the situation, e.g., an emergency or alert, also may be displayed. A detector for detecting situations when a camera is inoperative, as where the lens is covered to prevent observation, may be used to convey another "alert" situation.

On command, either from a scrutiny location or the central station, a communication may be commanded to indicate a situation. Special controls may be instituted enabling manifestations at the security location to initiate action or alter the display. Special operations also may be commanded through a videophone, either on manual initiative or automatically by sensor apparatus.

A video recorder and/or printer may be located at a remote location or central unit for selectively or continuously obtaining a video recording or computer printout of displays.

Multiple control units may be employed to monitor widely distributed locations with capabilities to route calls to each other in the event all the communication lines are occupied and there is a considerable backlog of calls may also be prioritized.

At each control unit, multiple operators at single monitors may be utilized, with calls sequenced to each operator depending upon the cumulative handling capability of each operator. For example, if a particular operator is handling calls at the average rate of six seconds each, calls to that operator will be sequenced at that rate. Alternatively, a single operator viewing a single monitor or multiple monitors is also contemplated. Furthermore, selective distribution of calls may be appropriate, for example calls reporting on "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature.

In another embodiment, the system of the present invention involves traffic regulation and control for video communication between a plurality of remote, widely distributed locations, from a central unit, utilizing dial-up telephone facilities in today's computer environment, and with voice quality lines. Specifically, for example, the dynamic graphics of telephonic video (on standard analog lines and digital lines over Integrated Services Digital Network (ISDN)) facilitate videophone, while video still displays and digital lines facilitate high fidelity (hi-fi) video displays along with audio capabilities, all combined with the interactive capability of computers to attain an effective commercial product routing system with video vending capability.

This embodiment of the present invention contemplates applications ranging from merchandising (including purchasing, selling, marketing or the like) to educational conventions for medical doctors and other professionals, game shows, dating services and so on. The present system is configured to direct and exchange communication traffic, for example, in the form of offers and responses, between selective members of plural groups or sub-groups, such as vendors and buyers, for analyzing and compiling data, scheduling appointments and implementing visual conferences, consummating transactions and the like. Selective routing of communication traffic from a central unit or controlled by the central unit effectively prevents information overload.

As disclosed, personal computers equipped with capabilities for providing either analog video (analog motion and analog high resolution freeze frame) or digital video or both, and speakerphones (or regular telephone instruments), for one-way or two-way communication are placed at each of a plurality of remote locations to communicate with a central unit that may include several communication and control stations also equipped with some or all of the same capabilities. As a part of traffic control operations, a video display (depicting motion and color) may be provided with graphics, audio and data signals, at each communication and control station, as well as, the remote locations. The personal computers may utilize well-known image enhancement techniques to facilitate high-resolution images for closer observation.

In accordance with one exemplary embodiment related to wholesale merchandising, a telephonic interface appointment scheduling and routing system includes a central traffic control system, independently managed by a third party and located remote from all vendors' and buyers' facilities. The central traffic control system schedules appointments and routes offers and responses to and from select members of plural groups, such as buyers and vendors, to expedite traditionally complex purchasing operations. Routing of offers and responses may also take place between members of subgroups of plural groups. Calls may be classified into types, for example, a vendor with a special offering, a buyer responding to a special offering, a buyer soliciting proposals, a vendor responding with a proposal and a vendor or a buyer seeking an appointment. Calls of the various types may involve some form of qualification or approval. For example, access to the system may be limited to qualified or registered entities. Also, certain limitations may be imposed, such as calls revealing one vendor's proposal to a competitor are inhibited.

In an example, a vendor may wish to broadcast a special offering of a particular item to interested buyers. The routing system analyzes buyer data, typically acquired during registration, and compiles a list of buyers to whom the broadcast is transmitted. Special buyers may be specified by the vendors making the special offering. For example, a vendor may designate special buyers from a list of all participating buyers and vendors provided to each registered member. From time to time, periodic updates on new members may be circulated.

To facilitate equitable routing of special offerings to all interested buyers, in situations, where there are only a limited number of communication lines, the routing system may include a random number generator to randomly select subsets of buyers and may transmit the broadcast in sequence to each subset. In some situations, the routing system may have the capability to request and add additional communication lines in the event a caller (vendor or buyer) desires concurrent broadcast to all potential receiving parties. Of course, in such cases the caller would incur the additional charges. A numbering system may also be adopted, whereby broadcasts are transmitted to subsets of a designated number of buyers (for example, equal to the number of communication lines) in rotating sequence. For example, a particular special offering may be broadcast first to subset number one, then subset number two and so on, while the next special offering may be broadcast first to subset number two, then subset number three and so on. A video recording of the offered item may be stored in a video file server at the central location, thus, allowing interested buyers to view the item prior to making a purchase. Likewise, buyers may wish to solicit proposals for a particular item from vendors qualified for designated merchandise.

Communication between the routing system and the different buyers and vendors may be accomplished in a variety of ways, as for example, by electronic-mail (transmission of messages across a network between two desktop PCs), electronic bulletin boards, on-line computer services (such as Prodigy™ or CompuServe™), facsimile, voice-mail or the like.

In a merchandising embodiment, vendors and buyers may directly communicate with the central traffic control system to seek or change appointments and update information with respect to appointments with specific buyers. In accordance with one scenario, vendors may call the central traffic control system and, upon qualification, schedule appointments with specific buyers.

Appointments may be executed, on command, from a buyer location or the central traffic control system. Communication may be initiated conforming to the display capabilities at the vendor site. That is, as disclosed, the central traffic control system or alternatively, plural coordinated such systems (located at one site or plural sites), as well as, the buyer locations, incorporate multiple video format capabilities along with a bridge or switch unit to drive a display unit or monitor in a selected format in accordance with the capabilities of the current vendor. As disclosed, a single monitor may accommodate several formats or plural monitors can operate selectively for concurrent multiple displays.

A sequence of scheduled appointments may be developed, as programmed along with intervals of video communication. A record of the scheduled appointments is maintained by the central traffic control system.

At the appropriate times, identification designations for remote locations are provided in sequence, to address a memory for fetching telephone numbers and/or graphic display data also recorded when the appointments are scheduled. Accordingly, in sequence, vendor locations are dialed up via the public telephone system, either manually or automatically, to obtain audio-video communication providing an image of the vendor and the surrounding area at a specific vendor location.

Additionally, data associated with a vendor (or a buyer) may be graphically displayed for convenient reference. For each scene display with respect to a specific vendor, the graphic display of pertinent data provided may, for example, indicate the telephone number, the PIN number, the video format, vendor rating, current vendor delivery status and so on.

Special controls such as a mouse may be instituted enabling manifestations at the vendor location to initiate action or alter the display. Special operations also may be commanded through the videophone, video still (high quality) or high fidelity (hi-fi) video means either on manual initiative or automatically by automatic apparatus.

A video recorder and/or video printer may be located at a remote vendor location, central traffic control station or buyer location for selectively or continuously obtaining a video recording or video printout of displays.

Multiple coordinated central traffic control stations may be employed to communicate with widely distributed vendor or buyer locations with capabilities to route calls to each other, in the event that all of the communication lines are occupied and there is a considerable backlog of calls. Calls may be routed to the next available operator (buyer), for example, in the event appointments scheduled for a particular buyer last longer than contemplated, or another buyer familiar with that line of products may step in and handle the appointment.

Under some circumstances it may be desirable to prioritize calls. For example, appointments may be queued in sequence, specific appointments may precede other routed appointments in accordance with an override feature.

A record of the number of calls and related charges incurred by the buyers for appointments is maintained, which may be analyzed and ultimately re-billed to the vendors. Of course, charges for scheduling are incurred directly by the vendors. Also, a record of charges incurred for each caller (buyer or vendor), depending upon the transaction initiated, may be maintained and billed to each caller.

As indicated above, an aspect of the system of the present invention is based on recognizing that a dial-up public telephone system may be effectively utilized for scrutiny communication between a plurality of remote scrutiny or surveillance locations and a central station. More specifically, it has been recognized that for an effective security or surveillance system, dial-up voice quality lines, such as standard analog lines, may be employed in conjunction with videophone equipment, computer facilities, sensing apparatus and various forms of telephonic equipment as voice generators, auto dialers and D-channel or in-band signaling apparatus for example. In that regard, a dial-up public telephone system TS is illustrated in FIG. 1 (upper central) affording effective communication between a plurality of remote locations L1-Ln and at least one central unit CU.

The remote locations L1-Ln may involve a wide variety of scrutiny or surveillance locations, for example, markets such as grocery chains and convenience stores, banks, warehouses, residences, automatic tellers, restaurants, factories, plants, businesses, parking structures and so on. Essentially, each location L1-Ln is equipped with videophone capability (described below) to provide telephonic signals through the telephone system TS to accomplish a display at the central unit CU. Along with video signal display, under manual or computer control, audio and data signals are employed to supplement and enhance monitoring operations. In that regard, each of the locations L1-Ln may incorporate several video speakerphones (with one-way and two-way communication and echo cancelling), cameras, sensors, switches, automatic dialing devices and computer memory capability for initiating and responding to commands from the central unit CU, as well as initiating various actions to accomplish change or accommodate special circumstances.

The central unit CU incorporates a telephonic interface, control and sequence-switching computer 12 coupled to a plurality of videophone monitor stations V1-Vn. Accordingly, in one format, during routine operation, the videophone stations V1-Vn simply provide a sequence of combined audio, scene and graphic displays revealing situations at identified remote locations L1-Ln. In the event of special circumstances manifesting an "alert" or "emergency" situation, for example, one or more of the videophone stations V1-Vn then is initially dedicated to monitoring and communicating with one or more of the locations L1-Ln experiencing a special situation.

The videophone terminals may be supplemented, as for an emergency. Specifically, cellular telephone capability may be provided for independent communication. As indicated below, such capability also may be important at locations L1-Ln.

As suggested above, a special situation, (e.g., "emergency" or "alert") is initiated either from the central unit CU or any one of the remote locations L1-Ln. Essentially, in response to a location-sensed special situation, dial-up operations are initiated to accomplish a "special situation" connection from one or more of the videophone stations V1-Vn so as to monitor and potentially affect the situation at one of the scrutiny locations L1-Ln.

As another consideration, police involvement may be commanded by communication from the computer 12 to a police facility 14 which may in turn afford communication with various police capabilities including mobile units and emergency teams. Alternatively or additionally, under certain conditions, a call is automatically placed to the police facility 14 giving a message in the form of an alarm with data. Specifically for example, under predefined conditions, the control computer 12 actuates an autodialer to dial up the police facility on a specific line. For example, an operator at a terminal might wear an earphone that is coupled to the police call line. Accordingly, on viewing the display, the operator would immediately be in contact with the police and could describe the situation. Note that the involvement of the central unit CU with police alarms can be very effective in relation to both false and true alarms. For example, the police facility 14 might be notified: "no perpetrator is visible but the 'emergency' door is open, we are monitoring."

Furthermore, the central unit CU may automatically place an emergency call (for example, to indicate armed robbery in progress) to the appropriate police department, determined by a database associated with the particular one of the locations L1-Ln at which the incident is occurring, for example by using ANI as described below. In the interim, the operator may describe the situation to the dispatcher at the police department or may be connected directly to the responding patrol car. Alternatively, the operator may actuate an autodialer, such that the autodialer code number (obtained from the central unit database) displayed on the operator's video terminal connects him or her to the appropriate police department. In the event there are complications, the operator may use a regular telephone or a cellular telephone and manually dial the telephone number displayed on the video terminal.

Preliminarily, considering an exemplary sequence of operations, assume that the location L1, a bank, is entered by a person carrying a gun with an intent to commit robbery. At some point, as described in detail below, the intention of the person may become known and manifest by a command signal, variously generated at the location L1. As a result, telephone equipment at the location L1 is actuated, prompting dial-up operations to accomplish a connection from the bank location L1 through the telephone system TS and the computer 12 to one of the videophone stations V1-Vn. Assume for example that the videophone station V1 is involved. As described in detail below, in such a situation, the called number to the computer 12 (originated by the location L1) indicates the nature of the special situation, e.g., "emergency" or "alert". That is, the nature of the situation is indicated by dialed number identification signals (DNIS) using a capability readily available from the telephone system TS, as for example on the so-called D-channel. The dialed number identification signals (DNIS) may likewise indicate the type of location where the special situation is occurring, for example, where certain monitors at the central unit CU are dedicated only to supermarkets and others only to banks or the like.

While the D-channel provides one operational configuration, some DNIS and/or ANI data signals can be received in-band without D-channel apparatus. In any event, DNIS signals indicate the called number from the bank location L1. With the provided data (DNIS for situation, ANI for identification) the computer 12 fetches identification data for a graphic display at the videophone station V1. Thus, the videophone station V1 displays a video scene within the bank location L1 along with graphic data, for example, to indicate: the nature of the special situation, e.g. "alert" or "emergency", the location, key personnel and so on. Of course, image enhancing techniques, as associated with current videophone technology for enlarging the signals received at the central unit CU or to provide higher resolution pictures may be utilized. Accordingly, large monitors may be utilized at the central station for viewing such enhanced images.

Alternately, personnel at the remote location under scrutiny may call a predetermined telephone number for the central unit CU, whereby as disclosed below, the use of ARU (FIG. 9) interactive technology including voice generators can prompt entry by touch tone of remote location code number or predetermined situation codes (with DNIS). For example, personnel from the remote location may be given by voice prompts, either live or prerecorded, for example, "Please enter your remote location code followed by the situation code, 1 for emergency or 2 for alert."

By using dedicated communication lines to remote locations L1-Ln, telephones at the remote locations may be configured to answer after a predetermined number of rings, e.g., three rings. Thus, regular polling of the remote locations L1-Ln at selected or random times during the day determines if the line is operational. In the event the line is busy or out of order, an "alert" situation may be communicated to the central unit CU whereby the police may be summoned to investigate the situation at that particular location Ln. Alternately, to save telephone expenses and avoid billing, the central unit CU may initiate a call to determine if a line is operative, but, terminate the call upon making the determination during the initial stage that the situation is normal. For example, the system may terminate a call after two rings rather than wait from an answer at three rings. Also, detectors located at the remote locations L1-Ln could indicate an "alert" situation to the central unit CU, for example, in the event a lens has been deliberately covered to prevent scrutiny. Alternatively, remote locations may provide distinctive or unique audio tones recognized by the central units CU in the event fraudulent replacement of telephones or the like to simulate a normal situation is contemplated by offenders.

As another feature, an incoming line can be designated at the central unit CU, as an 800 line to receive calls from any telephone to prompt scrutiny. For example, a call on the line may be answered by an interface or an operator to be notified to establish scrutiny at a specified location. In that regard, the location might be specified by ANI signals. Accordingly, a person at a security location who becomes aware of a potential danger can simply call the designated number from any telephone to instigate scrutiny.

At the central unit CU, the emergency display continues with the system implementing manual controls as disclosed in detail below. For example, the status of the situation can be altered, various cameras at the location L1 may be selected, scenes may be modified and audio or video may be controlled. Note that the cameras may be of various kinds, for example, wireless, panning, zoom and so on. Also, the cameras may be operated to modify scenes by panning, zooming, tilting or providing freeze frames, as desired. Furthermore, a record (VCR) may be made of all received signals as for subsequent study. Note also that by assigning each of the locations L1-Ln, a distinct DNIS (called number) identification data in the memory can be accessed accurately by the DNIS number if desired.

Recapitulating to some extent, at the central unit CU, multiple operators at single monitors may be utilized, with calls sequenced to each operator depending upon the cumulative handling capability of each operator. For example, if a particular operator is handling calls at the average rate of six seconds each, calls to that operator will be sequenced at that rate. Furthermore, selective distribution of calls may be appropriate, for example calls reporting "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature.

To consider the operation of the embodiment in somewhat greater detail, reference will now be made to FIG. 2 generally showing a plan view of a portion of the bank location. It should be recognized that various other arrangements of cameras may be installed at supermarkets, parking structures, quality control facilities and the like.

Figure 2:
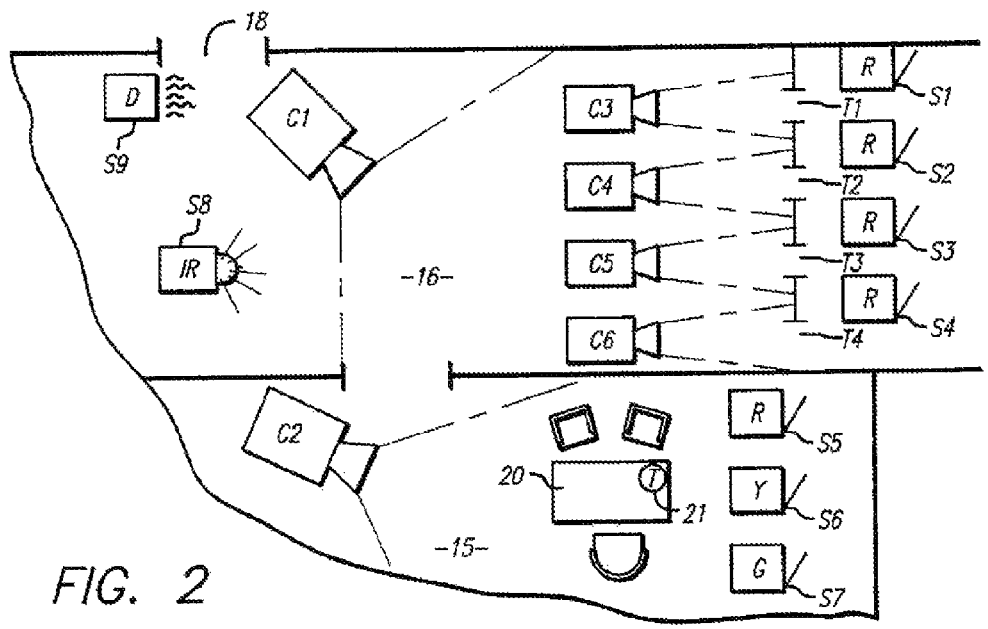
FIG. 2 is a fragmentary diagrammatic plan view of a scrutiny location illustrating sensor and camera locations for an exemplary installation.

FIG. 2 illustrates a layout of video cameras along with sensors and switches that may be employed to indicate situations in the bank. The individual cameras and sensors (including manual switches) may take a multitude of forms. For example, the cameras could be wireless, panning, zoom and so on, while the sensors might be sonic, infrared, visible light, metal detectors, and so on.

As another consideration with respect to an individual location or facility, as described in detail below, the active sensors and cameras may be modified in accordance with an operating schedule for the location. For example, when a bank is closed, it may be prudent to eliminate cashier window monitoring and concentrate on access points. In a related context, a location might be selectively monitored, e.g., access points only when the installation is "armed", as when alarms are set. When the installation is "armed", a message is conveyed to the central unit CU to commence specific monitoring. Alternately, a location may be monitored at specific preprogrammed times, controlled by a clock. For example, a select bank may be monitored between 10:00 am and 4:00 pm. Additionally, at that bank location, varying observation times for different cameras may be programmed. For example, the view from one camera might be taken for twenty seconds, followed by a view from another camera for ten seconds, then zooming onto a vault that would appear for ten seconds.

In the context of an ATM site, motion detectors may be utilized to detect approaching individuals, whereby the motion detector upon detecting an individual initiates contact with the central unit CU for viewing. Alternately, entry of a PIN (personal identification number) by an ATM customer may likewise initiate contact. It is also contemplated that initiating contact with the central unit CU could be controlled by the clock, such that the central unit CU may be configured only to receive calls at select intervals of time, for example between 7 p.m. and 12 a.m. Additionally, the system may be configured such that DNIS and ANI communication features cross reference with the clock prior to answering. For example, if the present time is between 5 p.m. and 10 p.m., select calls are not accepted.

Considering FIG. 2 in greater detail, four teller windows T1-T4 are illustrated (right) in a room 16 adjacent a desk area 15 indicated to be partially enclosed. At the other side of the room 16, an entrance 18 is represented. Thus, in a somewhat traditional arrangement, bank customers enter the room 16 through the entrance 18 to transact business either at one of the teller windows T1-T4 or in the area 15.

Of course, the extent of coverage and the position of cameras is expected to vary widely in different installations. However, in the exemplary arrangement of FIG. 1, a camera C1 provides a wide-angle view of the transaction area. A camera C2 covers the area 15 and cameras C3, C4, C5 and C6 are concentrated respectively on the teller windows T1, T2, T3 and T4. The cameras C1-C6 are adjustable and as a consequence may zoom or pan with reference to a subject. Thus, considerable flexibility is afforded in monitoring the room 16. Note that cellular telephone techniques may be employed in relation to the locations L1-Ln, as for example, the camera C1 might be backed up by a cellular phone arrangement to function in the event of a telephone line severance. Battery backup, of course, is contemplated.

Various forms of actuators or sensors may be provided to indicate a special or urgent situation at the bank. For example, as illustrated in FIG. 2, manual silent alarm switches S1-S4 are provided at a convenient location for each of the teller windows T1-T4 respectively. Typically, the switches S1-S4 would be positioned to enable subtle actuation. In FIG. 2, the switches S1-S4 are labelled "R" (red) to indicate an "emergency" situation on actuation. That is, if a teller actuates one of the manual switches, a realistic possibility exists that the teller is being held up and a "red" or "emergency" situation is indicated.

The area 15 containing a desk 20 is provided with three manual switches, S5, S6 and S7, each of a different type. Specifically, the switch S5 indicates an "emergency" or "red" situation, the switch S6 indicates an "alert" or "yellow" situation and the switch S7 indicates a "routine" or "green" situation.

The desk 20 also is equipped with a telephone instrument represented by an encircled letter "T" and designated "21". The telephone 21 is coupled into the system and may be employed to interface the central unit CU (FIG. 1) as described below.

In addition to manual switches, automatic sensors are represented in FIG. 2. Specifically, a switch S8 comprises an infrared sensor for detecting motion. Of course, various forms of sensors and various operating philosophies may be implemented. For example, in the arrangement of FIG. 2, the absence of motion (routine business) within the room 16 actuates the sensor switch 18 to indicate an alert situation. Alternatively, motion in certain areas, at certain times may indicate an emergency.

Switch S9 is embodied as a doorway metal detector. Accordingly, passage through the entrance 18 by a person bearing a weapon actuates the switch S9 to command an "alert" or "yellow" situation. As indicated, commanding any situation actuates the system to establish communication from the bank location L1 to the central unit CU to initiate monitoring, recording and selective involvement.

To consider the system of the disclosed embodiment in somewhat greater detail, reference will now be made to FIG. 3 in which previously identified components bear similar reference numbers. Accordingly, the dial-up telephone system (center) is designated TS, scrutiny locations (right) are designated L1-Ln and a plurality of central units CU1-CUN are connected through a central unit switch CUS. Generally, the switch CUS may implement various control formats to selectively allocate communications between the central units CU1-CUN. In accordance with one exemplary system, the multiple central units CU1-CUN may be employed to monitor widely distributed locations with capabilities of routing calls to each other. Also, each of the central units CU1-CUN, multiple operator may be used such that calls are sequenced to each operator depending upon the cumulative handling capability of each operator.

Recapitulating to some extent, the dial-up telephone system TS accomplishes communication through the switch CUS between the central unit CU and the individual scrutiny locations L1-Ln. The communication may be initiated either by the central unit CU or any one of the scrutiny locations L1-Ln. Assume connection to the central unit CU1. Typically, during intervals of routine operation, the central unit CU1 initiates contact with the scrutiny locations L1-Ln in sequence (either predetermined or random) to afford momentary viewing of scrutiny locations. However, it should be noted that continuing scrutiny, i.e., clocked scrutiny for an entire eight hour shift is also likely for certain various high risk locations.

Upon the occurrence of a condition at one of the scrutiny locations L1-Ln suggesting or indicating a special situation, or merely as a check, a command signal may be initiated either manually or automatically to accomplish the communication. Such a command signal indicates either a "routine" situation (green), an "alert" situation (yellow) or an "emergency" situation (red).

Figure 3:
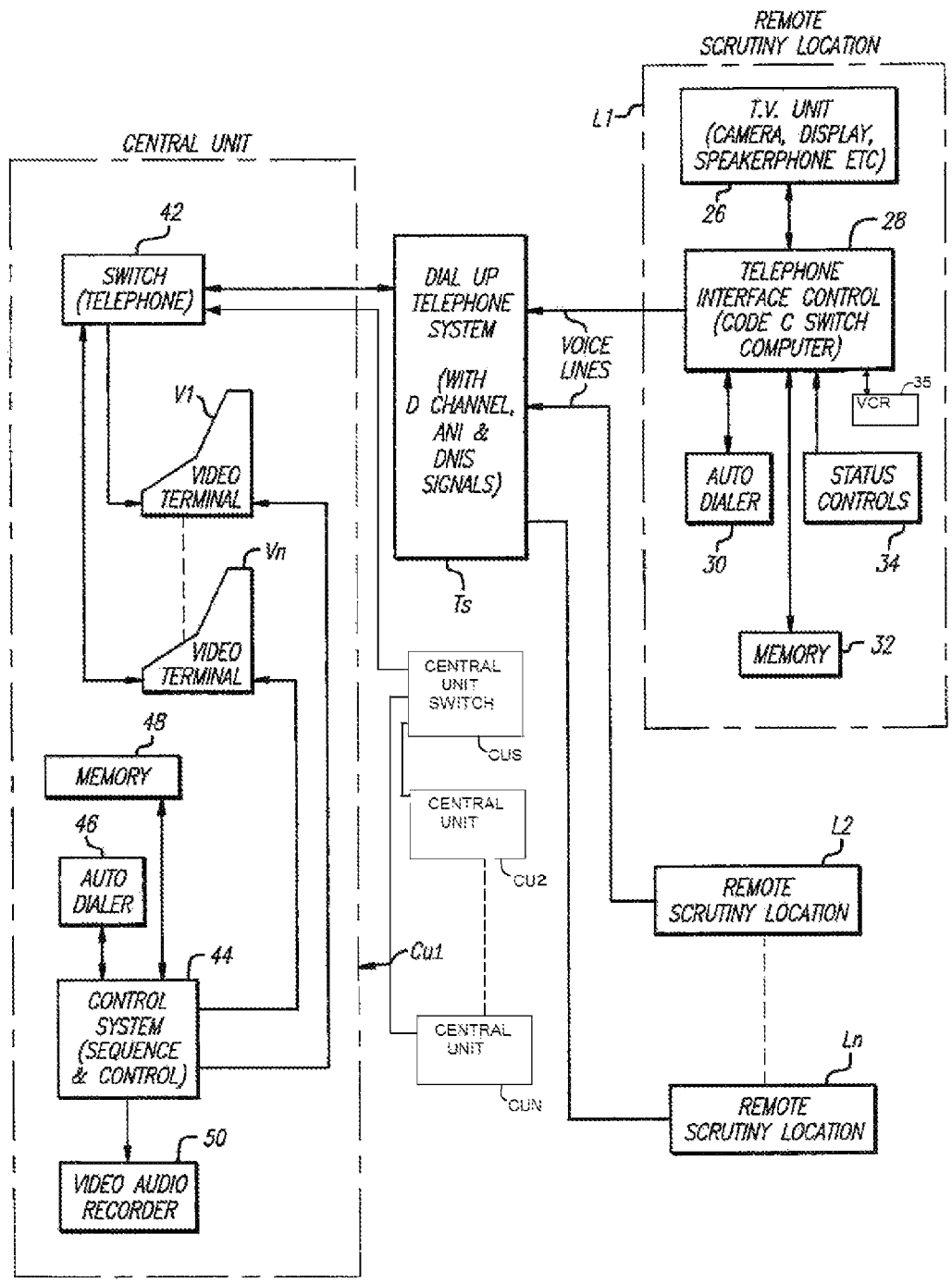
FIG. 3 is a more detailed block diagram of basic components in an exemplary system of the present invention.

Only one of the scrutiny location structures L1-Ln is disclosed in detail in FIG. 3. Specifically, in the scrutiny location L1, at least one television unit 26 is provided for producing a television signal representing both video and audio. That is, as illustrated in FIG. 2, several separate television units may be provided to cover different areas of a scrutiny location or provide different aspects. Each unit 26 includes the elements of a videophone, e.g. camera, display, speakerphone, etc., along with control capability as disclosed below. Audio and video signals from the television unit 26 (along with any duplicate units) are provided to a telephone interface control unit 28 incorporating a videophone encoder-decoder (CODEC) chip set, a telephone switch and a control computer. A form of the interface unit 28 is treated in detail below. However, the unit has the capability to accommodate videophone operation along with telephone switching and a variety of control functions.

The interface unit 28 is also connected to several operating devices including an auto dialer 30, a memory 32 and a status controls 34. These structures also are disclosed in somewhat greater detail below; however, the auto dialer 30 may take any well known form of such units as may the memory 32. The status controls 34 may take a multitude of different forms as considered to some extent with reference to FIG. 2. That is, the status controls 34 may include manual switches, photoelectric sensors, infrared sensors, visible light sensors, metal detectors and even threshold sonic detectors. For example, a sonic detector might signal a gunshot to command an emergency status.

The interface unit 28 is also connected to a video recorder (VCR) 35, which may be set to record continuously or intermittently to provide historical data for fraud prevention or the like. On receiving a request command, for example from the central unit CU1 (shown in detail), the video recorder 35 may transmit compressed video signals of the recording to the central unit CU1. Alternatively, employees at the remote scrutiny location L1 may initiate transmission of compressed video signals when indicating an emergency situation. Of course, continuous recording by the video recorder 35 may be suspended when the central unit CU1 initiates contact with the scrutiny location L1 and during momentary viewing thereof. In the event, the scrutiny location L1 is at an ATM site where each transaction is typically recorded, such video recordings or portions thereof may be transmitted to the central unit CU1 upon receiving a command therefrom.

At locations where multiple cameras are positioned, a single video recorder 35 may be connected to the multiple cameras via a switching device (though shown as part of the video recorder 35, may be separate therefrom) to control and sequence the recordings from the cameras. A switching device such as the intelligent sequential switcher manufactured by SONY, under Model No. YS-S100 may be used to control and sequence multiple recordings.

Alternatively, in some situations where a video recorder 35 is connected at the central unit CU1, select frozen frames of viewings or a specific time period of each momentary viewing can be recorded, for example two seconds (specific time period) of the twenty seconds (momentary viewing) for each remote location.

Likewise, the interface unit may be connected to a printer 37 for providing a printed record of each predetermined or random momentary viewing, indicating the date, time, location, period of monitoring, etc. Thus, a detailed hard-copy record is developed.

To consider an exemplary operation sequence within the location L1, upon the actuation of one of the status controls 34 (special situation signal), the unit 28 fetches two distinct telephone numbers, i.e., a called number and a calling number. The called number comprises one of the numbers for establishing communication with the central unit CU. Of several such numbers, each indicates an individual status. For example, called numbers for the central unit CU might be assigned as indicated by the following chart:

CHART I

| | Remote Location Calls | |
|---|---|---|
| Called No. | Status | Time |
| 555-1111 | Routine (G) | Preset |
| 555-2222 | Alert (Y) | Hold-Manual Control |
| 555-3333 | Emergency (R) | Hold-Manual Control |

Thus, the unit 28, by selecting a called number for the central unit CU, indicates status at the central unit. Accordingly, if a status control 34 at the scrutiny location L1 detects an emergency situation, the unit 28 commands the memory 32 (look-up table) to provide a telephone number "555-3333" for actuating the auto dialer 30 to produce dial signals (through unit 28) to the dial-up telephone system TS. Accordingly, connection is established with the central unit CU indicating an "emergency" status, i.e. "condition red". The "emergency" signal would be indicated at the central unit CU by Direct Number Identification Signals (DNIS) utilizing facilities readily available and provided by the dial-up telephone system TS through the so-called D-channel.

The dial-up telephone system TS also provides Automatic Number Identification (ANI) signals indicating the calling number on the so-called D-channel. In the disclosed embodiment, such signals identify the location of the remote scrutiny station L1 to the central unit CU1. Note, that the memory 32 may provide alternate forms of calling signals commanding a specific outgoing line from the telephone interface and control unit 28 to afford additional communication. For example, ANI signals alternately might command status, other situations or related data.

Upon attaining communication with the central unit CU1, the remote scrutiny location L1 is in videophone communication with the central unit CU1. Specifically, the television unit 26 provides videophone signals through the unit 28 and the dial-up telephone system TS to the central unit CU1 to manifest the current circumstances in the form of a scene and graphics.

Summarizing to some extent, upon the actuation of a command signal at a scrutiny location, e.g., scrutiny location L1, a connection is established from the scrutiny location L1 to the central unit CU1 through the telephone system TS. Additionally, signals are provided (ANI and DNIS) at the central unit CU1 to indicate the specific identification of the scrutiny location L1 and the status affording the basis for the call.

As another aspect hereof, the system may test conditions at a location prior to, or as part of providing a display. Human involvement may accordingly be reduced. For example a video picture can be digitized and recorded to provide a video recording that indicates a scene at a specific instance of time. If that scene does not change, to some extent, the assumption is that it is secure. Accordingly, after the time of recording the scene, another video picture is provided, digitized and compared with the first picture. Unless the change amounts to a predetermined percentage or part of the total picture, the location is assumed to be secure. As an example, a closed vault door may be the subject of the picture. If it is opened on a subsequent check to indicate a substantial change in the picture, an emergency is indicated and the system should be activated to provide a display. Additionally, depending upon monitoring periods, if a video picture is compared with a previous one, for example after ten minutes, and only a change of 5% is perceived, it can be safely concluded that everything is normal. Accordingly, transmission of video pictures to the central unit CU may be suspended. Such comparator circuitry may be provided at the remote locations L1-Ln or at the central unit CU1.

Within the exemplary central unit CU1, a telephone switch 42 accommodates both incoming and outgoing traffic serving a plurality of video display stations or terminals V1-Vn. Each of the terminals V1-Vn incorporates the capability of a videophone (CODEC chip set, display, camera, speakerphone, keypad, control, etc.) along with additional control functions as described below. In that regard, the display terminals V1-Vn may incorporate relatively large monitors and a variety of other enhanced apparatus for more effective prolonged human use.

Each of the video terminals V1-Vn are connected to a control system 44 that is in turn connected to an auto dialer 46, a memory 48 and a video audio recorder 50 (video and audio capability). Essentially, these units are time shared by the video terminals V1-Vn. In that regard, capability may be provided in the control system 44 to transfer connections to locations L1-Ln as between the terminals V1-Vn. For example, in that regard, operators at the terminals V1-Vn may be specialists for various conditions with designated calls routed to specific terminals and transfer capability to accommodate changes in situations.

Figure 4:
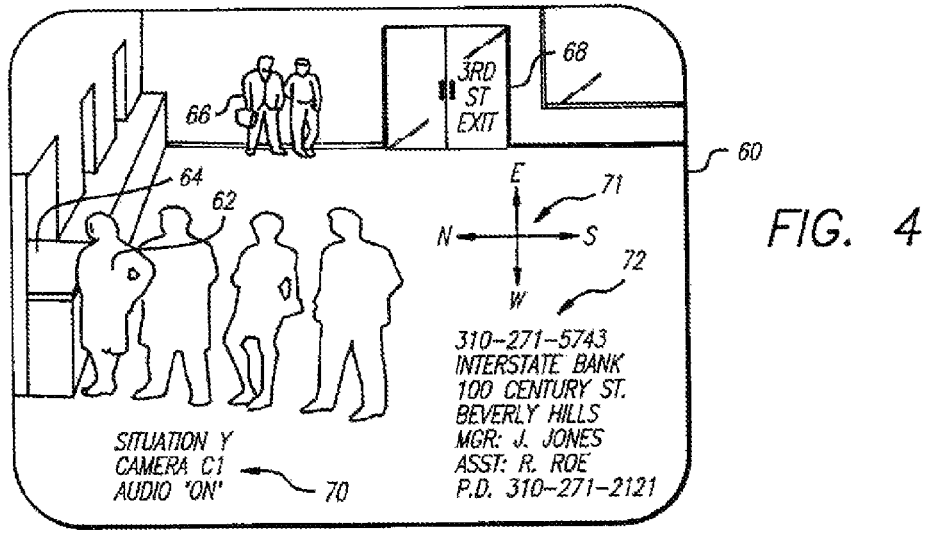
FIG. 4 is a graphic representation of a display of the system of FIG. 3.

Recapitulating, as explained above, the exemplary central unit CU1 functions both to initiate outgoing calls and receive incoming calls for flexibly monitoring the remote scrutiny locations L1-Ln. To continue with the explanation of an incoming call, when the switch 42 in the central unit CU1 receives an incoming call, it will be connected to one of the video terminals V1-Vn. Concurrently, incoming data signals (DNIS and ANI) are passed to the control system 44. From the memory 48, the system 44 fetches the identification of the location L1 and the designated status, e.g., "emergency" "alert" or "routine" With such signal represented data, the control system 44 may select a specific one of the terminals, e.g. terminal V1, to handle the call. The control system 44 then provides computer graphic signals to the video terminal V1 supplementing the coupled television scene display. Specifically, the video terminal V1 presents a viewer with a composite display of a scene at the location L1 along with graphic data. For example, assuming the location L1 is a bank branch office, the display by the terminal V1 could be somewhat as represented in FIG. 4. In that regard, the display has been simplified for purposes of explanation, particularly with regard to the room interior.

FIG. 4 shows the screen 60 of the terminal V1 depicting the scene inside the bank at the location L1. In the foreground, a group of people 62 are indicated to be standing in line at a teller window 64. Other people 66 are indicated to be standing near an entry door 68. As shown, note that in the scene, the graphics also indicate the door is located on 3rd Street. It should be noted a graphical cursor 71 indicating N/S/E/W is displayed. A considerable amount of graphic information supplements the scene display as indicated, specifically in the form of control status data 70 and location identification data 72.

Generally, the elements of the graphic data are self-evident. However, the first line of the identification data 72 indicates a telephone number for the scrutiny location, the next several lines indicate the name of the facility at the location L1, the address, and key personnel. Finally, the last line of the identification data 72 indicates a telephone number for the police station serving the location L1.

Typically, upon the initiation of communication between one of the display terminals V1-Vn and one of the scrutiny locations L1-Ln, the identification data 72 is presented and remains displayed without change. However, the control status data 70 (lower left) may be varied, depending on specific operating conditions as will now be considered.

As illustrated in FIG. 4, the control status data reveals an "alert" status (situation "yellow"), the scene being presented by camera C1 and the outgoing audio (central unit CU to location L1) being "on". Typically, the outgoing audio would not be active on initial contact. However, the initial conditions would be established and programmed depending on location, schedule, etc., the program being provided by the memory 48 (FIG. 3). However, after connection, the conditions may be varied to accommodate different situations as perceived either at the terminal V1 in the central unit CU, or at the location L1. For example, a manager at the desk 20 (FIG. 2) may use the telephone instrument 21 to command a change. In a similar way, changes can be commanded from the terminal V1 as will now be considered in detail.

Figure 5:
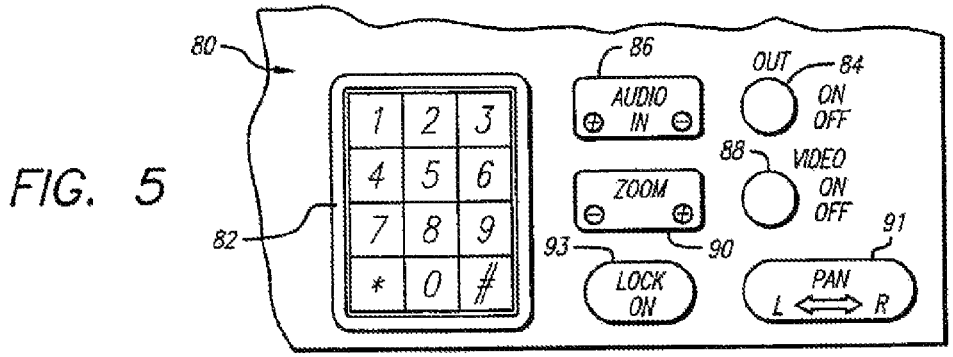
FIG. 5 is a graphic representation of a portion of the control panel of an element in the system of FIG. 3.

Recapitulating, the terminal V1 (FIG. 3) has been described to be in communication with the location L1 to provide a display as illustrated in FIG. 4. In addition to the display, the terminals V1-Vn incorporate a substantial control panel that may be embodied as a personal computer keyboard. Specifically, the control panel for each terminal V1-Vn includes all the current controls for a videophone, plus dedicated controls relating to the disclosed system. In that regard, in the interest of avoiding undue complications, only a fragment of the representative panel for the terminal V1 is shown in FIG. 5. Note that one panel could be used or could share multiple displays.

Specifically, the fragment of the panel 80 of FIG. 5 incorporates a traditional twelve-button telephone pad 82 bearing the numerals "1" through "0" along with the symbols "*" and "#" for generating DTMF signals in accordance with standard convention.

Additionally, various specific controls are provided. An on-off button 84 controls outgoing audio. A toggle 86 controls the volume of incoming audio. An on-off switch 88 controls outgoing video. A pair of toggle switches 90 and 91 respectively control zooming and panning camera operations. A push button switch 93 serves to halt a sequence of displays may be simultaneously displayed from remote locations locking onto the current display (freeze frame) for closer observation to investigate suspicious activity or record data on a suspicious individual for closer observation and in some cases higher resolution at a later time. In addition, another toggle switch 95 controls tilting camera operations and a push button 97 advances the freeze frame for subsequent observation. A pushbutton switch 99 serves to manually advance or request the next display in the sequence of displays. A control switch 101 regulates the speed at which the sequence of displays are viewed. Finally, a signal lamp 103 illuminates to indicate that a video camera has become inoperative. For example, the lens of a camera might be deliberately covered or spray painted at the outset of a robbery. As disclosed below, the system should then advance to another camera within the remote location.

Recognizing that communications to the terminal V1 can be variously initiated, the control panel enable various commands. Again, recognize that communication may be established in a program sequence or originated at either the central unit CU or a remote location L1-Ln. Generally, by using the telephone keypad 82 on the panel 80, various functions can be accomplished as indicated by the following chart.

CHART 2

| Command | Name | Operation |
| --- | --- | --- |
| 30 | Status | Designates a status command is to follow |
| 31 | Routine | Sets "routine" status |
| 32 | Alert | Sets "alert" status |
| 33 | Emergency | Sets "emergency" status |
| 40 | Camera | Designates a camera command is to follow |
| 41 | Camera C1 | Sets camera C1 active |
| 42 | Camera C2 | Sets camera C2 active |
| 43 | Camera C3 | Sets camera C3 active |
| . | | |
| . | | |
| . | | |
| 50 | Synthesized Voice | Designates a synthesized voice command is to follow |
| 51 | Observed | Actuate voice generator to announce: "You are being observed . . ." |
| 52 | Recorded | Actuates voice generator to announce: "You are being recorded . . ." |
| . | | |
| . | | |
| # | Execute | Execute entered command |
| * | Clear | Clear any entered or partially entered command |
| 11* | All Clear | Clear to receive operating commands |

To consider some examples, if the observer of the screen 60 perceives that the situation has become dangerous, touching the keypad buttons for "3" and "0" followed by the buttons designated "3" and "3" will change the represented status to situation "red" (R), i.e., "emergency". Note that as indicated in the display (FIG. 4), the status situations are indicated as a part of the status data. Also, the status data may be presented in three different colors, e.g. red, yellow and green, to indicate the situation somewhat more emphatically.

To consider another circumstance, in viewing a display on the screen 60 (FIG. 4), the observer at the terminal V1 (FIG. 3) may wish to concentrate on a specific one of the teller windows T1-T4 as represented in FIG. 2. For example, it may be desirable to actuate the display of camera C3 (FIG. 2, upper right) directed at the teller window T1. Accordingly, the keypad 82 is actuated first by touching buttons or keys "4" and "0" followed by the numerals "4" and "3" to actuate the camera C3. As a result, the display of the screen 60 is shifted to a view of the teller window T1.

To consider still another control operation, observation of the display on the screen 60 (FIG. 4) may suggest that some audio communication may be desirable from the video terminal V1 to the bank location L1. Initially, the audio "on-off" button 84 (FIG. 5) would be actuated to initiate audio communication. In that regard, note that audio communication from the bank to the video terminal V1, i.e., audio "in" is always active.

After actuating the outgoing audio to the bank location L1 (FIG. 1), the operator at the terminal V1 may elect between speaking an audio message or selecting a prerecorded audio message from memory and utilizing a voice generator as will be explained in greater detail below. In that regard, some situations may be particularly tense and a desirable procedure would involve simply indicating to those present in the bank location L1 that the entire is under surveillance and a video record is being produced. A record carrying the message in a powerful and confident voice may be the prudent course of action. Under such circumstances, as indicated in the above chart of commands, the operator may simply touch the buttons "5", "0" to command a synthesized voice message, then touch a specific command for a particular message. For example, the buttons of "5" and "1" command the vocalization of a message "You are being observed . . . ".

Note that after each command is issued, the operator must touch the numeral or pound symbol ("#") button to execute a command. To clear any entered or partially entered command, without execution, the operator simply touches the asterisk ("*") button. Finally, clearing the operating commands totally involves touching the code: "1, 1, *".

With the system in a cleared state, any of a variety of operational commands may be given, for example, a partial list of such commands is:

CHART 3

| Command | Name | Operation |
| --- | --- | --- |
| 20 | Op. Comm. | Operational commands to follow |
| 21 | Pre. Seq. | Revert to sequencing a predetermined program of locations |
| 22 | Rand. Seq. | Revert to sequencing a random program of locations |
| 23 | Set Call | Dial up a select location as identified by a four-digit number to follow |
| 24 | Police | Actuate police connection |
| . | . | . |
| . | . | . |
| . | . | . |

As one example, touching the keypad 82 (FIG. 5) to enter "2" and "0" indicates an operational command follows. Thereafter, entering "2" and "1" prompts the system to revert to a sequencing operation as described above in accordance with a predetermined program scheduling communication and monitor displays of individual remote locations. Alternatively, entering the numerals "2" and "2" initiates another form of sequencing in which the control computer provides a random program (within limits) to randomly observe or monitor remote locations. Note that dwell time may vary for individual locations L1-Ln.

As other operating examples, entering the numerals "2" and "3" indicates that the operator will next enter a four-digit number designating a particular remote location thereby providing a memory location address from which a telephone number for the location will be fetched and employed to actuate an automatic dialer as described below. Finally, as another example, indicated in the above chart, actuating the keypad 82 (FIG. 5) to enter the numerals "2" and "4" establishes connection with the police facility 14 (FIG. 1) thereby bringing such a facility into communication with the system in various arrangements.

Quality control monitoring involves rather different operations. For example, an inspector observing a plurality of fast food sites, such as "McDonalds", may wish to instruct an employee, "Put on your food handling gloves," by use of the on-off button 84. Alternatively, the inspector may request inspection of the facility for regulation purposes.

Along the same lines, routine supervision of transactions, e.g. deposits and withdrawals of funds, at bank vaults, grocery chains or convenience stores, or the like can be remotely monitored and even recorded to deter foulplay.

Similarly, at banks, supermarkets or the like, market research can be performed by monitoring all the transactions and observing people's reaction to new interest rates, products, etc. The on-off audio button may be used for interactive communication with customers, if desired.

Figure 6:
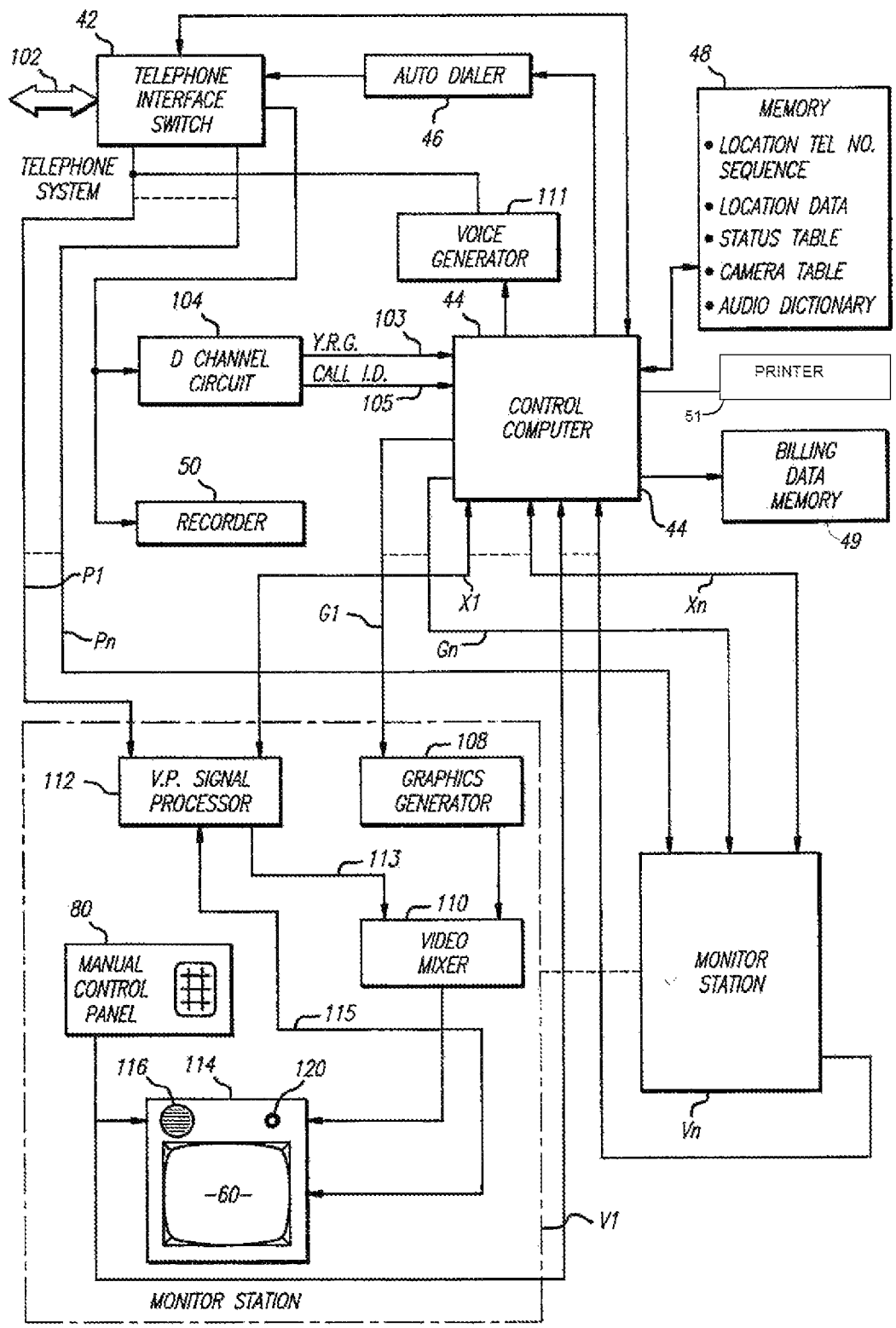
FIG. 6 is a somewhat detailed block diagram of the central station portion of the disclosed system in accordance with the present invention.

From the above descriptions, it is apparent that the disclosed system utilizes videophone technology in combination with other telephone system technology along with computer control and graphics technology to accomplish effective security monitoring and, to some extent, active involvement. To explain the system in greater detail, the structural components now will be considered. First, the central unit CU is treated with reference to FIG. 6. As mentioned above, elements previously described bear similar reference numerals. Accordingly, a plurality of individual monitor work stations V1-Vn for involved security monitoring are represented at the bottom of FIG. 6. Only the terminal V1 is shown in any detail. As indicated above, these terminals V1-Vn are collectively served by the other apparatus of the central unit as illustrated in FIG. 6.

To accomplish a complete understanding, the explanation of the central unit of FIG. 6 now may best be pursued by assuming certain circumstances and proceeding to describe the attendant operation concurrently with the introduction of any fresh components. Accordingly, inbound calling operations initially will be treated followed by a comprehensive treatment of outbound calling procedures.

Initially, as described above, inbound calls are received through the telephonic interconnection 102 (FIG. 6, upper left) accommodated by the interface telephone switch 42 as well known in the art. The information signals accompanying calls (ANI and DNIS) are passed to a D-channel circuit 104 as for decoding. That is, as indicated above, the calling number signals (ANI) identify the calling remote location. The called number signals (DNIS) indicate the state or situation prompting the call, e.g., situation "green", "yellow" or "red" respectively indicating "routine", "alert" and "emergency" situations.

Information carried by the ANI and DNIS signals is supplied from the circuit 104 to the memory 48 through the control computer 44. Specifically, a line 103 carries the situation information (DNIS-YRG) while a line 105 carries the call identification (ANI-Caller I.D.). Consider the ANI processing initially.

From the control computer 44, the representative ANI signals address the memory 48 to fetch detailed graphic information, specifically the identification data 72 as illustrated in FIG. 4. A signal represented form of such data is supplied from the control computer 44 through one of a series of graphic lines G1-Gn to a selected one of the monitor stations V1-Vn. Application to the station V1 will be assumed in pursuing the explanation, however, details of such selection are treated below.

Within the station V1, the graphic identification signal data on a caller is received by a graphics generator 108 for processing into a video signal that is supplied to a video mixer 110. The output from the video mixer 110 drives a monitor 114 to provide a scene-graphics display.

As a concurrent operation with the ANI signal processing, the DNIS signal representation (YRG) also is applied by the control computer 44 to the memory 48 for fetching an indication of the location status. Signal representations of the status also are supplied from the computer 44 to the graphics generator 108 and produce a situation representation (see status data 70, FIG. 4). Thus, the video mixer 110 receives comprehensive graphic signals for display concurrent with the picture scene representation, the signal source of which will now be considered.

With the completed connection from the remote location (FIG. 1), the specific incoming line is coupled to the monitor station V1 as assumed above. Specifically, the videophone signals are received by a videophone signal processor 112 (FIG. 6) for driving the video monitor 114 incorporating the display screen 60. Specifically, the signal processor 112 is coupled to the video mixer 110 to provide the scene content of the display.

The videophone signal processor 112 incorporates a video CODEC along with computing capability and may take the form of an AVP1000 video CODEC chip set as available from AT&T. Essentially, the CODEC chip set accomplishes videophone operation and consists of a video encoder, a video decoder and an internal system controller. As known, the system controller provides and receives: video data, audio data and data signals. In that regard, the videophone processor 112 is illustrated with cable (multiple path) connections. That is, path or line P1 is one of a series of lines P1-Pn carrying an encoded videophone signal between the switch 42 and the processor 112. A line 113 then carries received video data to the video mixer. A line 115 (bus or cable) carries several other signals, specifically, transmitted and received audio, transmitted video and data signals. The videophone processor 112 also is connected to the control computer 44 for data signal flow.

In addition to the display screen 60, the monitor 114 incorporates a speakerphone 116 and a video camera 120. As indicated above, signals from the speakerphone 116 and the video camera 120 are selectively transmitted to the remote location through the line 115 and the processor 112 under manual control.

Recapitulating to some extent, on receipt of an incoming call, ANI and DNIS data is processed along with the subsequent encoded videophone signal for application to a select monitor station to provide the picture display (scene and graphics) as generally represented in FIG. 4. Upon such an occurrence, the manual control panel 80 (FIGS. 5 and 6) adjacent the monitor 114 may be utilized to accomplish a number of operations including: changing the status, selecting a particular camera and controlling the zooming or panning of the camera, actuating either audio or video manifestations at the bank location L1, effecting a police connection, and so on. Accordingly, any of a number of courses may be pursued under the control of a trained operator including supplements to the video record as in the form of comments. As indicated above, the operator can command a synthesized voice message at the location L1. Specifically, voice data is drawn from the memory 48 (audio dictionary), a message is formulated by the central computer using well known techniques of the art and provided to a voice generator 111. The audio output from the voice generator 111 is processed by a videophone processor 112 for transmission to the remote location L1, and may pass through the processor 112 or, as illustrated, by processed at the telephone interface switch 102.

In the operation of the system embracing the exemplary formats as treated above and below, a record is made for billing purposes. That is, a billing data memory 49 (upper left, FIG. 6) and a printer 51 are controlled by the computer 44, recording all transactions in relation to billing charges. Such data can be variously processed at different times.

To this point, consideration has been primarily directed to the treatment of incoming calls. Alternative modes involve the placement of outgoing calls under manual control and the automatic operation to provide a sequential display from remote locations L1-Ln. Such operations next are treated in detail.

Consider first the functions of the system when an operator manually initiates a call from the monitor station V1 to one of the remote scrutiny locations, e.g., location L1. Specifically, assume the need to establish a connection from the monitor station V1 to the remote bank location L1 initiated by an operator at the monitor station V1. Under such circumstances, the operator actuates the manual panel 80 (FIGS. 5 and 6) using selected commands (chart above) as will now be considered.

At the outset, a command "11*" clears the monitor station for manual control. Next, a command "20" indicates that operating commands are to follow. The operator next touches "23" to indicate that a specific remote location number will follow. Continuing, the operator touches the four-digit address signal for the location L1 in the memory 48. As a result, the control computer 44 (FIG. 6) addresses the memory 48 to fetch the telephone number for the bank location L1. The telephone number is supplied from the memory 48 to the control computer 44 which actuates the auto dialer 46 to provide the dial-up signals on an off-hook line provided in the coupling 102 to the dial-up telephone system TS (FIG. 1). Typically, at the location L1 a dedicated line will accept the communication.

As with all dial-up operations, certain conditions are predetermined. That is, a particular camera (and settings) is specified and a tentative status also is specified. Typically, unless the status is specified, the dial-up connection will provide a "routine" or "green" status indication and utilize a camera positioned to provide a wide-angle field of view. Of course, as indicated above, the operator can immediately modify the initial predetermined conditions utilizing the control commands as explained above. Thus, under manual control, the established communication may be preserved for a period or terminated after a quick check of the situation. Manual control continues until the system again is set into an automatic sequence mode.

For most operating systems, it is likely that manual operation will not dominate the system. Rather, during much of the time, the monitor stations will collectively be programmed to automatically provide a sequential display of the remote locations L1-Ln. Thus, at the termination of an interval of one-to-one operation, a command will be given to resume sharing in the sequence monitoring. Specifically, as indicated above, a command of "21" will actuate the system to the predetermined program of locations or alternatively, a command "22" will actuate a random sequence operation.

During the sequential operation, the control computer 44 (FIG. 6) fetches telephone numbers for the remote locations L1-Ln from the memory 48 in a sequence, actuates the auto dialer 46 accordingly, and assigns the resulting connections to one of the monitor stations V1-Vn. After a short interval of operation, e.g. 30 seconds, the control computer 44 terminates the display connection to a station V1-Vn in favor of another waiting connection. The operation results in a sequential display at each of the monitor stations V1-Vn.

Figure 7:
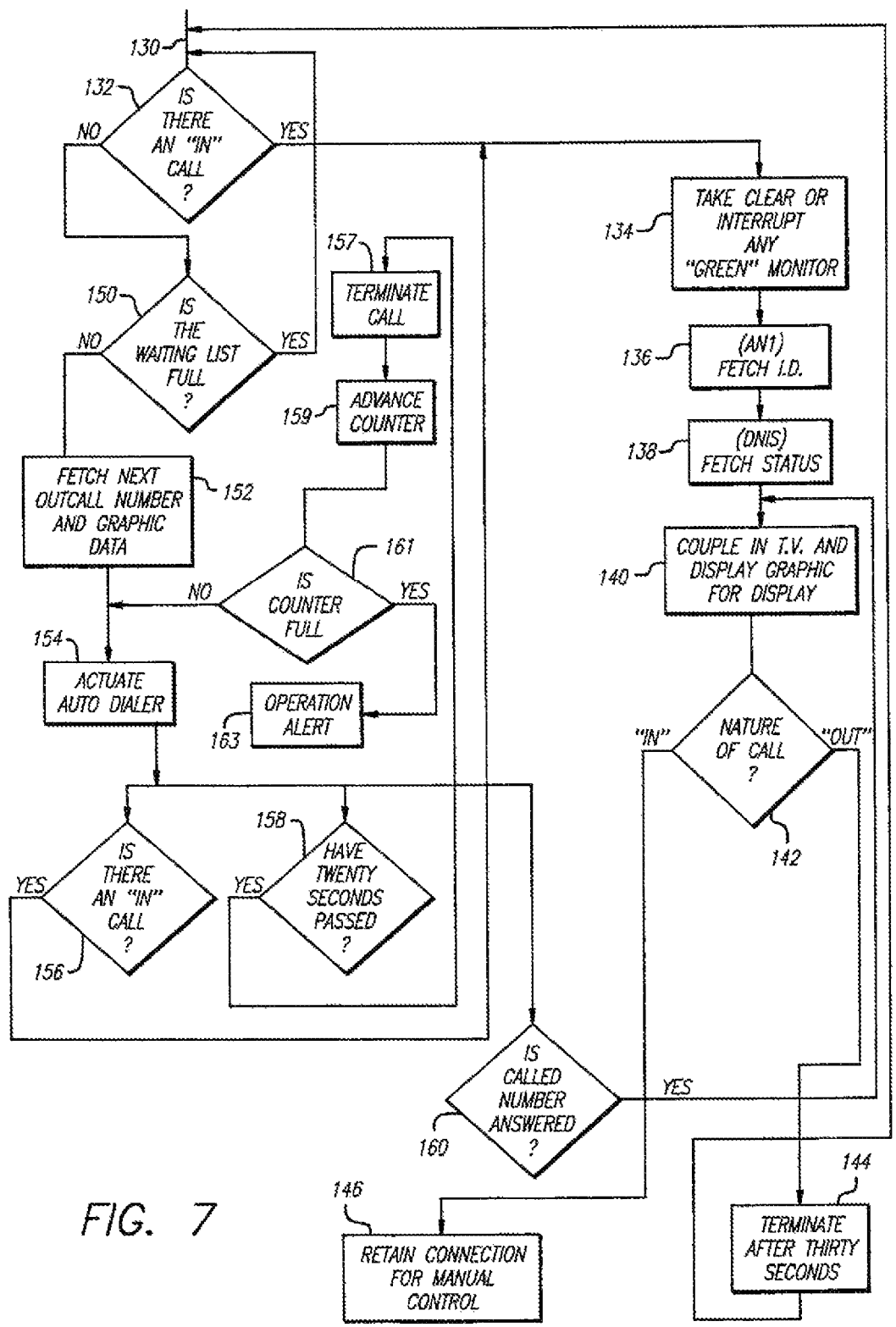
FIG. 7 is a logic diagram illustrating the operation program of the system of FIG. 6.

A logic program indicating the control operations of the control computer 44 will now be treated with reference to FIG. 7. The program is entered at a line 130 (upper left) shown leading to a decision or query block 132. The query posed by the query block 132 relates to whether or not there is an "incoming" call. In that regard, in the sequence dial-up system, the logic preserves a readiness for receiving incoming calls. Should there be such a call, prompting a "yes" path from the block 132, the process will proceed to a block 134 and pursue a path accommodating the incoming call. Specifically, from the block 134, if no monitor is available, a monitor displaying a "green" display would in interrupted. As indicated by a block 136, the "ANI" data from the incoming call would be employed to fetch the calling station identification and as indicated by the block 138, the DNIS data is similarly fetched. With the identification and status data at hand, the operation proceeds as represented by block 140 to display the composite scene and graphic data as depicted in FIG. 4.

The operation of input of the block 140 introduces a query as posed by a block 142 regarding the nature of the call, i.e., "incoming" or "outgoing". If the call was an outgoing, as indicated by the block 142, it is automatically terminated after 30 seconds. Alternatively, if the call is "incoming" the operation is yielded to manual control as indicated by the block 146.

Returning now to the block 132 (FIG. 4, upper left), the circumstance of "no" "incoming" call advances the program to a query block 150 directed to the state of the current waiting list of lines with established contact to a remote location. If the waiting list is full, or has attained a predetermined limit, a "yes" is prompted. The operation then returns to the entry point of the line 130 to cycle the query posed by the block 132.

Following the alternative "no" path from the block 150 indicating the waiting list is not full advances the program to a block 152. The operation is to fetch the next "out" call telephone number and the related data for the graphics display. As indicated above, in one embodiment, the data is simply addressed in the memory 48 (FIG. 6) by a four-digit number uniquely designating each remote location.

With the available telephone number, the auto dialer 46 is actuated as indicated by the block 154 (FIG. 7) during the interval while the graphics data is prepared for display. Exiting from the block 154, three parallel, somewhat simultaneous queries, are presented by blocks 156, 158 and 160. A "yes" response to any of the three queries prompts a fresh course of action as will now be considered.

The query block 156 poses the query of an "incoming" call. If such a call occurs, the operation is terminated in favor of receiving that call. Thus, the system reverts to block 134.

The query block 158 poses the query of time, i.e., have 20 seconds passed on the clock (not shown) in the control computer 44, FIG. 6. If that interval does pass prior to the time when the called telephone is "answered" (goes "off-hook"), some difficulty is presumed. Under the circumstance, the system makes additional attempts to attain a connection. If unsuccessful, other action is signalled, as by manual intervention.

Pursuing the course from the block 158 of FIG. 7, the calling connection is terminated (block 157), a counter is advanced ((block 159) and unless the counter is at capacity (query block 161) with some delay, the call is again placed. After a predetermined number of efforts, e.g., three, the counter is filled to prompt an "operator alert" (block 163). As a result, with manual intervention, other action is taken. For example, alternate telephone numbers may be tried.

Next, assume that the outgoing call is answered. As indicated by the block 160, the operation proceeds to the block 140 to accomplish the operations attendant accomplishing the display.

The operation of the block 140 was considered above in relation to "incoming" calls. However, in the instant situation, involving an "outgoing" call, the operation proceeds to the block 144 to terminate the connection and the attendant display after 30 seconds. As indicated above, the display is given to an available one of the monitor stations V1-Vn from the waiting list somewhat as collectively represented by the block 140.

Thus, the system accomplishes a sequence of displays representative of the remote locations L1-Ln. As indicated above, a single monitor station may be employed; however, in the disclosed embodiment, several monitor stations V1-Vn share the sequence accommodating interruption either for manually controlled "outgoing" calls or "incoming" calls.

Recapitulating, the above description has treated automatically actuated incoming calls, manually-actuated incoming calls, automatically sequenced outgoing calls and manually-actuated outgoing calls, all with respect to the central unit CU. Details of the central unit CU have been treated and now a detailed exemplary structure for a remote location will be considered. Accordingly, reference will now be made to FIG. 8.

Figure 8:
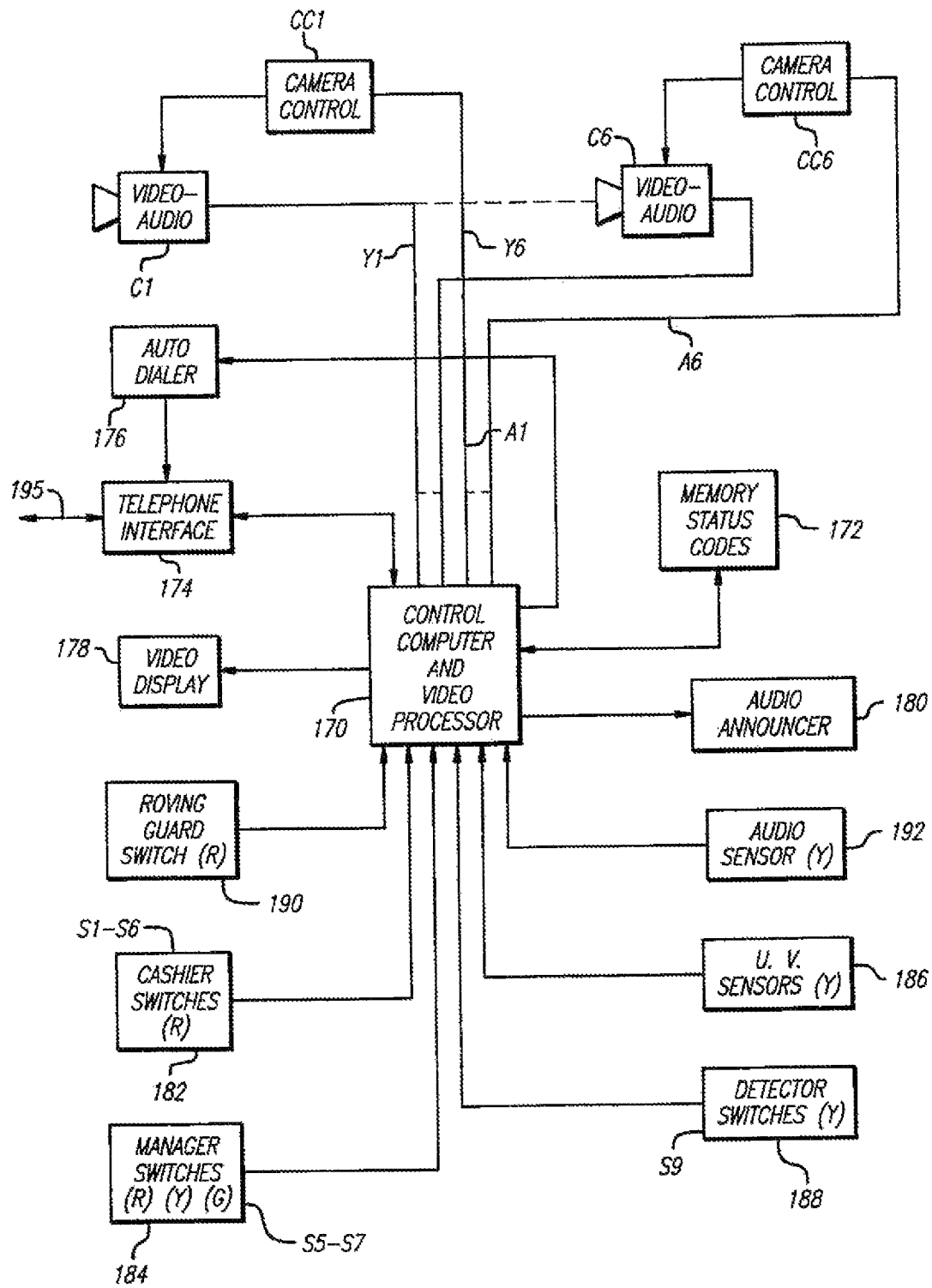
FIG. 8 is a detailed block diagram of a portion of the disclosed system in accordance with the present invention at a remote location.

The videophone cameras C1-C6 are indicated at the top of FIG. 8 connected to a control computer and videophone processor 170 which may involve a relatively simple control to coordinate switches and sensors with respect to a memory 172, a telephone switch or interface 174 and an auto dialer 176. Apart from the control function, the processor 170 incorporates the videophone processing, e.g., a video-CODEC chip set as mentioned above. As indicated, such structures are readily available for videophone operation. In conjunction with such structure, the computer 170 drives a video display 178 and an audio speaker or announcer 180.

The control and processor 170 is additionally connected to a series of sensors and switches as indicated above. Correlating the structure to FIG. 2, the switches S1-S1 are represented by a single block designated 182. The manager switches S5-S7 are represented by a block 184. The infrared sensor or switch S8 is represented by a block 186 and the doorway detector or switch S9 is represented by a block 188. Additionally, a roving guard switch is represented by a block 190 and an audio sensor or threshold microphone is designated by a block 192. The situation status prompted by the switches can be seen in FIG. 8, i.e., RGY ("red", "green" and "yellow" conditions).

Generally, with regard to control, the processor 170 has a dual function of responding to "incoming" calls and responding to switches to place "outgoing" calls. Note that with respect to the processor 170, the designations "incoming" and "outgoing" calls are reversed from the terminology as used above with respect to the central unit CU.

Upon the occurrence of an incoming call from the telephone system TS through a cable 195, the telephone interface unit 174 establishes a connection through the processor 170 to the video display 178 and prompts the processor 170 to respond to processor control signals. More specifically, an incoming call prompts the control processor 170 to fetch a set of standard conditions from a look-up table embodied in the memory 172 to thereby establish settings for the videophone cameras C1-C6 and activate the video display 178 and the audio announcer 180. One of the cameras, typically camera C1, also will be selected. Accordingly, in response to the received call, the processor 170 provides an output from the camera C1 (set with a wide field of vision) through the telephone interface 174 to be carried as a videophone signal embodying both video and audio data. Additionally, the video display 178 and the audio announcer are activated for response to any received audio or video data.

As indicated above, various signals may be communicated from the central unit CU through the telephone interface 174 to the control processor 170 for varying the settings of the cameras C1-C6. Thus, both control and videophone signals are communicated between the cameras C1-C6 and the processor 170. The videophone signals are provided through a series of lines X1-X6. The control signals pass in the other direction through lines A1-A6 and camera control units CC1-CC6, respectively. Essentially, the control units CC1 and CC6 activate the cameras C1-C6 for panning and field-of-vision changes. In that regard, the processor 170 simply decodes data signals originated at the central unit CU to actuate the control units CC1-CC6. Thus, once communication is established, the location apparatus of FIG. 8 simply responds to commands and any audio or video supplied. To initiate a communication the apparatus operates in a manner similar to the central unit CU.

With respect to outgoing calls, the processor 170 responds to various of the sensors or switches as embodied in the blocks 182, 184, 186, 188, 190 and 192. The sensor or switch of each of the blocks is associated with a look-up table embodied in the memory 172 storing a telephone number for designating the status and a calling line for designating the location. That is, as explained in detail above, DNIS signals are interpreted at the central unit to indicate a particular status while ANI signals are employed to indicate the location of the calling facility. An exemplary sequence will illustrate the operation.

Assume for example that a person enters the bank facility at location L1 (FIG. 2) carrying a weapon. Further assume that the door sensor 59 embodied in the detector 188 (FIG. 8) senses the presence of a sizeable metallic object and provides a signal to the control processor 170. Based on the source of the signal, the control computer addresses the memory 172 to fetch the telephone number for the central unit CU established to indicate a "caution" or "yellow" situation. That telephone number is retrieved. Accordingly, the telephone interface 174 goes "off-hook" and the auto dialer 176 is actuated to dial the fetched telephone number. Consequently, the telephone interface 174 is coupled for communication through the cable 195 and the dial-up telephone facility with the central unit CU. The ANI and DNIS signals provided, the camera C1 provides audiovisual data for a videophone signal supplied from the control processor 170 and the telephone interface 174 to the active line. Accordingly, the desired display is accomplished as explained above, also affording various selected control operations as indicated above.

To consider an exemplary control operation, assume for example that the operator at the central unit CU perceived a particular problem at the teller window T1 (FIG. 2). As a consequence, an operation command would be entered as described above switching the source of the videophone signal from the camera C1 to the camera C3. Also, command operating signals could be provided to pan or vary the field of vision provided by the camera.

As will be apparent from the above, systems of the present invention may be variously implemented to accommodate a multitude of different facilities and needs. Also, the system may be configured to accommodate specialists at the videophone terminals V1-Vn (FIG. 1, 3 or 6). For example, certain of the terminals V1-Vn might be attended by specialists in identified emergencies, e.g., situation "red" or "emergency" calls. Other terminals might be attended by specialists in "alert" or "yellow" situations, e.g., a suspicious man standing in a doorway, etc. Pursuing the considerations, still other of the terminals V1-Vn could be monitored by specialists in the standard or routine monitoring, e.g., ten or twenty seconds per location.

To accommodate the dedication of certain terminals V1-Vn to specialists, the switch 102 (FIG. 6) is controlled by the control computer to transfer connected remote locations L1-Ln from one of the terminals V1-Vn to another. In some instances, it also may be desirable to couple a location to several of the terminals.

Figure 9:
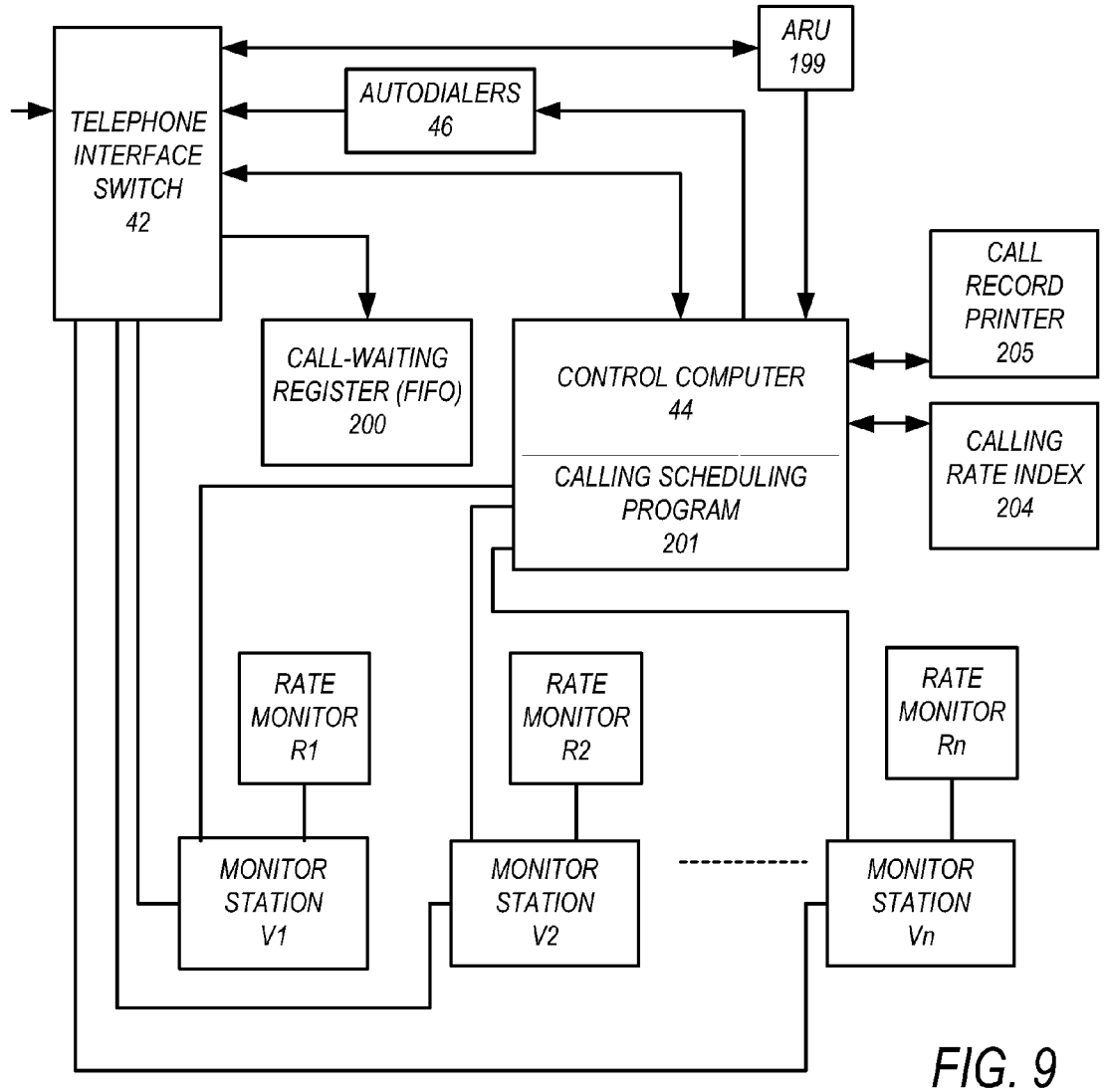
FIG. 9 is a somewhat detailed block diagram of the central station portion of the disclosed system in accordance with an alternative embodiment of the present invention.

Referring now to FIG. 9, in accordance with another exemplary embodiment, multiple operators at multiple monitor stations V1-Vn are illustrated. As explained above, multiple central units CU may be employed to monitor widely distributed locations with capabilities of routing calls to each other. At each of the central units CU, incoming calls are sequenced to each of the operators at the each of the monitor stations depending on the cumulative handling capability of each operator. For example, if a particular operator is handling calls at the average rate of six seconds each, calls to that operator will be sequenced at that rate. As described above, inbound calls are received through the telephonic interconnection 102 (FIG. 6, upper left) accommodated by the interface telephone switch 42 as well known in the art.

Incoming calls are queued by the call-waiting register 200, for example a FIFO, and handed to the next available operator in sequence. Considering the placement of outgoing calls (under manual or automatic control) to provide a sequential display from remote locations L1-Ln, autodialers 46 establish communication with each of the locations L1-Ln in sequence and forward the calls to the next available operator.

For most operating systems, it is likely that during much of the time, the monitor stations will collectively be programmed to automatically provide a sequential display of the remote location L1-Ln. During the sequential operation, the control computer 44 or the calling schedule program of the control computer 201 fetches telephone numbers for remote locations L1-Ln from memory (FIG. 6) in sequence, actuates the auto dialer 46 accordingly, and assigns the resulting connections to one of the monitor stations V1-Vn. Note that an ARU (audio response unit) 199 is coupled between the switch 42 and the control computer 44 as to supplement the operation using the established capabilities of such units.

After short intervals of operation, e.g. 30 seconds or 10 seconds, the control computer 44 terminates the display connection to the station V1-Vn in favor of another waiting connection at the call-waiting register 200. The intervals of operation may vary depending upon the rate at which the operator views the displays. The operator may manually request the next display by operating the control button 99 (FIG. 5, top center).

Alternatively, rate monitors R1-Rn connected to each of the monitor stations V1-Vn respectively monitor the cumulative handling capability of each operator, for example, count the number of calls handled by each operator in a given period of time. Based upon the count provided by the rate monitors R1-Rn, the control computer 44 assigns a calling rate index number for each operator. The number controls the volume of calls queued for each operator. For example, CHART 4, sets forth exemplary calling rate index as for various numbers of calls per minute. In the event an operator is capable of handling 30 calls, his or her calling rate index in accordance with the exemplary chart would be 3 and so on. The calling rate index is indicated by a storage 204 (FIG. 9, right).

CHART 4

| Calls Per Minute | Calling Rate Index |
|---|---|
| 30 | 3 |
| 35 | 4 |
| 40 | 5 |
| 45 | 6 |
| 50 | 7 |
| 55 | 8 |
| and so on | and so on |

As a further consideration, if the cumulative handling capabilities of the operators decrease or increase, the rate monitor R1-Rn would report such a change to the computer control 44 thereby altering the number of calls contemplated for the operators. In that regard, the operators may control the speed control button 101 to vary the number of calls. Records of call schedules and performance are provided by a printer 205.

Furthermore, selective distribution of calls may be appropriate, for example, as explained, calls reporting "emergency" situations may be forwarded to a particular operator trained in emergency procedures. Alternatively, calls may be routed to the next available operator. In addition, as the calls are queued in sequence, calls reporting "emergency" or "alert" situations may precede other routing calls in accordance with an override feature. In keeping with this feature an "emergency" situation may automatically override an "alert" situation.

Figure 10:
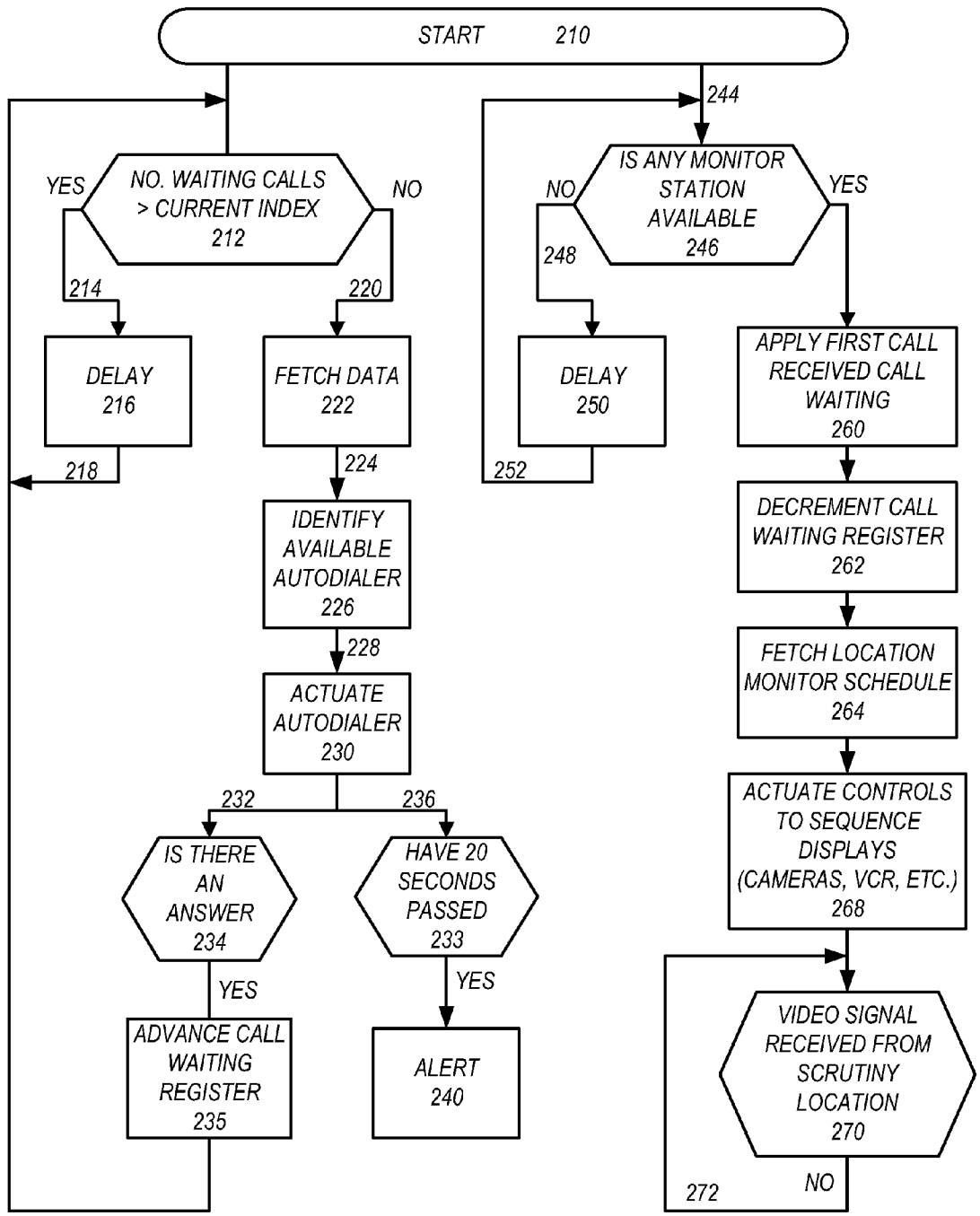
FIG. 10 is a logic diagram illustrating the operation program of the system of FIG. 9.

A logic program further indicating the control operations of the control computer 44 according to an exemplary format will now be treated with reference to FIG. 10. The process is entered at a line 210 (top center) shown leading to a decision or query block 212. The query posed by the query block 212 relates to whether the number of waiting calls exceed the current index. In the sequence dial-up system, the logic preserves a readiness for receiving incoming calls. Should the number of waiting of calls exceed a predetermined current index, prompting a "yes", the path 214 from the block 212 proceeds to a block 216 for a delay. The delay may be predetermined, after which the process returns along path 218 to the query block 212 again posing the same question.

If it is determined that the number of waiting calls does not exceed the current index, the process proceeds along path 220 to a block 222. As indicated by block 222, data on the next location L1-Ln is fetched. At this point the program advances along line 224 to block 226, whereby an available auto dialer 46 is determined. Line 228 leads to block 230 directed to actuating the auto dialer 46 to establish connection with one of the locations L1-Ln. One output path 232 from block 230 leads to a query block 234 and introduces a query as to whether there is an answer from the location L1-Ln. If an answer from the location L1-Ln is received, the call-waiting register 200 is advanced by block 235.

Another output path 236 from block 230 leads to another query block 238 to determine if twenty seconds have passed. Following a predetermined time period, if the autodialer 46 is unable to establish connection an "alert" situation is reported, as indicated by a block 240.

Pursuing an alternative logic process relating to incoming calls, a line 244 (upper right) leads to a query block 246 to determine if a monitor station V1-Vn is available. If all the monitor stations V1-Vn are occupied, a line 248 from the query block delays the process at block 250 and following a return line 252 again poses the query at block 246.

Assuming that a monitor station V1-Vn is available, as indicated by block 260, the foremost (oldest) or first received call waiting is forwarded to the monitor station V1-Vn. The call-waiting register 200 notes a decrement at block 262 and subsequently fetches a location monitor schedule from memory at the central unit CU indicated by block 264.

As explained above, the location monitor schedule may specify a sequence of view displays for each location, as in the event multiple cameras are involved. Using a previous example of FIG. 2, the location monitor schedule may define an initial panoramic view, followed by the view from a first camera for twenty seconds, followed by a view from a second camera for ten seconds, then zooming onto a vault that would appear in the view from a third camera for ten seconds.

In relation to scheduled formats, as explained, the operation of block 264 is to implement monitor schedules if specified. From the block 264, a line 266 advances the process to block 268, at which stage the operator can actuate the status controls to sequence displays, for example, in accordance with the location monitor schedule. At query block 270, a query is posed as to whether a video signal is received from the location L1-Ln. In the event no video is received, for example, if the camera lens has been deliberately covered or broken, operation returns to block 268 along line 272, enabling the operator to actuate controls, for example, to display a view from the next camera to better assess the situation in case of an emergency, etc. Alternatively, such operation may be automatic. After viewing of the location L1-Ln has been performed, the above process is repeated with the next incoming call.

Figure 11:
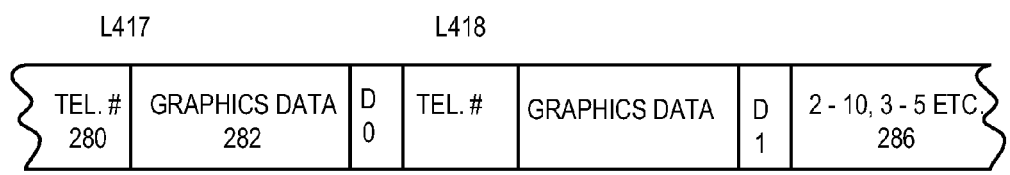
FIG. 11 is a fragmentary diagrammatic representation of a storage cell as may be formatted in the system of the present invention.

FIG. 11 illustrates an exemplary storage cell of the central unit CU wherein the telephone number, graphic data and additionally, location monitor schedules may be stored. For example, the telephone number for location designated L417 is indicated at field 280, and other pertinent graphics data is indicated at a field 282. A binary number field D indicates the display format. A "0" specifies that only a panoramic view is desired, for example as for a convenience store. A binary number "1", on the other hand denotes a more sophisticated location monitor schedule. Additionally, the location monitor schedule is stored, as indicated at field 286, outlining the exact sequence to be followed. It should be recognized that location monitor schedules may be revised and updated on site at central units CU as well as from remote locations. For example, considering a large bank with 1000 branch offices where each branch office is routinely monitored by five installed cameras for a twenty second time interval every hour on a daily basis, changes, cancellations or updates to monitor schedules between branches may be requested remotely.

In accordance with a format for conducting market research, a single monitor V1 may be used to monitor the desired location, for example a bank for determining customers' reaction to new interest rates. As an example, zoom in capabilities of the camera C2 may be utilized to view and listen to a bank teller's interaction with a customer. At the central unit CU, a recording of the interaction or the researcher's observations may be obtained by entering data via the keyboard and storing the data in memory. The researcher may request subsequent locations via the push button 99. By depressing the push button, the auto dialer 46 automatically dials the next location. The auto dialer 46 may have all the respective telephone numbers of all the locations stored in memory. Alternately, calls may be queued for automatic switching of locations after predetermined time periods controlled by a clock, for example five minutes.

In a simple monitoring or "video escort" format to ensure proper execution, deposit, withdrawal and the like, of funds at banks or supermarkets may involve monitoring at select times of the day for predetermined time periods. For example, supermarkets at remote locations may be called up and daily closing procedures involving securing of monetary funds, etc. may be observed (e.g. 9:55-10:00 p.m., every evening). In a related format, inspections of restaurant facilities and like may be conducted from one of the central units CU.

In a related context, a branch manager may contact the central units CU from an external telephone (regular or cellular) and request a video escort prior to entering the branch facility. Accordingly, the branch managers are monitored by the central unit CU1-N as they conduct their business, for example, handle large funds etc. Signals (ANI or DNIS) identifying telephone numbers may be employed to implement a desired display at the central units CU1-N.

As indicated above, a significant aspect of the scheduling and routing system of the present invention is based on recognizing that a dial-up public telephone system may be effectively utilized for visual communication and conferences between a plurality of remote locations regulated and controlled by a central traffic control station. More specifically, it has been recognized that for an effective communication traffic control system, dial-up voice quality lines, such as standard analog or digital lines, may be employed variously in conjunction with videophone equipment, computer facilities (personal computers (PCs) with video capabilities) and various forms of telephonic equipment as voice generators, auto dialers and D-channel or in-band signaling apparatus.

Figure 12:
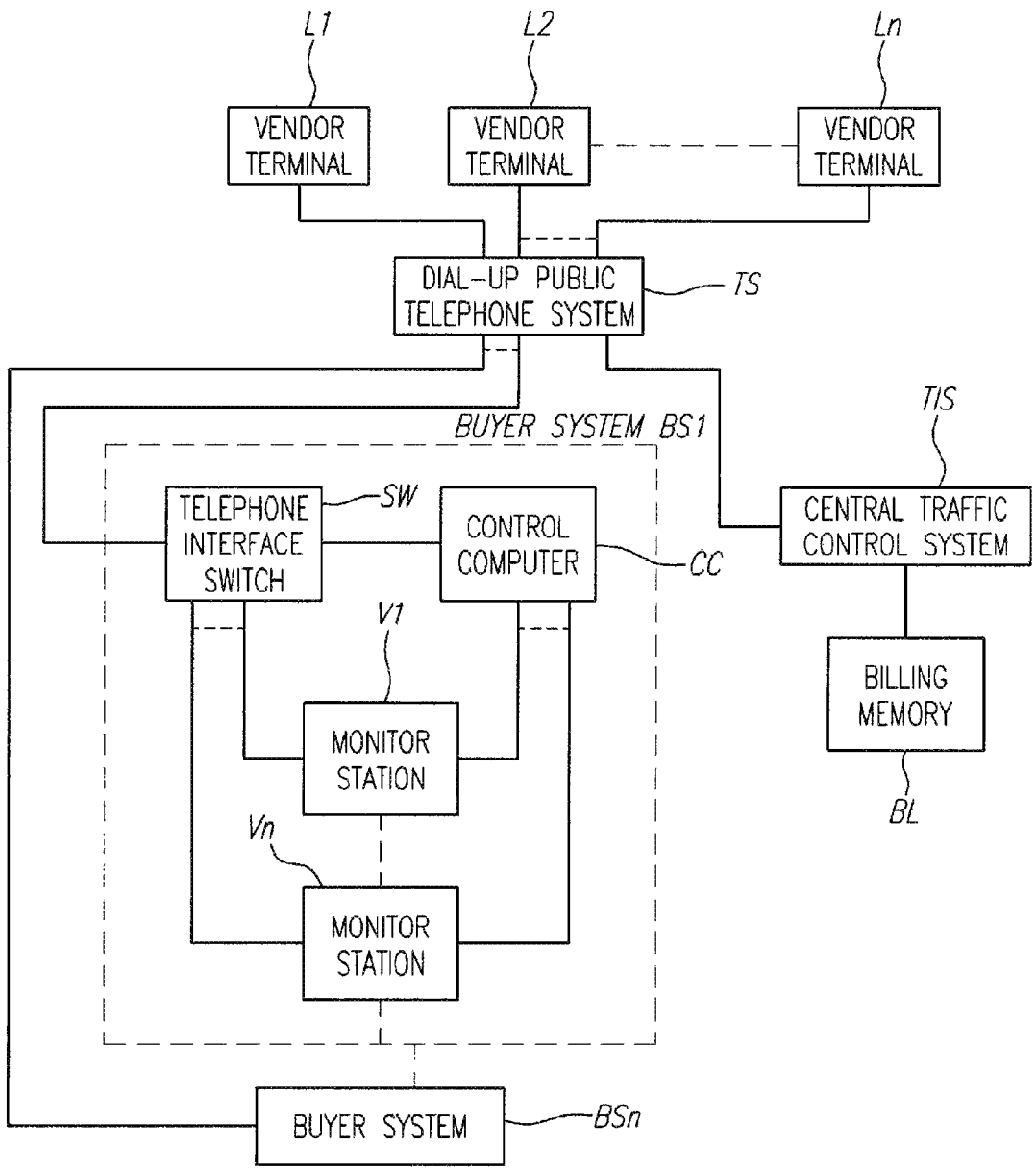
FIG. 12 is a block diagram of the system in accordance with another embodiment, illustrating a telephonic interface appointment scheduling and routing system.

Turning to the next embodiment, a dial-up public telephone system TS is illustrated in FIG. 12 (upper center) affording effective communication between a plurality of remote locations, for example, locations L1-Ln representing vendor sites, and at least one central traffic control station TIS. Selected elements of FIG. 12 are seen to generally correspond to elements of FIG. 1. For merchandising applications, the remote specific vendor locations communicate with the central traffic control station TIS, which is located remote from the buyers' and vendors' facilities.

As a buyer example, XYZ Drug Company (a large chain) may employ individual merchandise buyers responsible for purchasing specific categories or sub-categories of items. For example, one buyer (person) may be responsible for purchasing body treatment products, such as skin and hair products, another buyer may be responsible for purchasing vitamins and over the counter medications, and yet another for purchasing magazines and toys, and so on. The present system facilitates selective transmission of communications between individual buyers of plural buyer groups or sub-groups and qualified members of plural vendor groups or sub-groups. For example, special offerings by vendors for particular merchandise may be transmitted only to buyers designated for purchase of the merchandise. Likewise, buyer requests for proposals on select merchandise are transmitted only to vendors designated to sell the merchandise. Similarly, appointments for conferences may be scheduled by vendors or buyers, although in keeping with present merchandising practices, it is generally contemplated that vendors would pursue scheduled appointments. However, appointments are generally verified by buyers and appointment execution calls are generally initiated by buyers, either directly or automatically using autodialers.

A fully automated interactive voice response system including ARUs (audio response units) may schedule appointments for specific buyers and subsequently, load schedules for all the buyers into a memory at the central traffic control station. Alternatively, each specific buyer's schedule may be transmitted to and loaded into a memory at each buyer terminal. In some instances, vendors may communicate with the traffic control station in any of a variety of ways (touch-tone, electronic-mail, voice-mail, facsimile or the like) to make and/or verify appointments and/or initiate the conferences, if necessary. In addition, buyers may also communicate with the traffic control system to approve appointments, or otherwise update information in any of a variety of ways (touch-tone, electronic-mail, voice-mail, facsimile or the like). During visual conferences (in real-time), vendors may display their goods, packaging or promotional displays and otherwise effectively communicate with the buyers.

Along with a video signal display (real-time, color, motion, freeze frame), under manual or computer control, audio and data signals are employed to supplement and enhance conferencing operations. In an exemplary system, each of the vendor locations may incorporate several video speakerphones (with one-way and two-way communication and echo canceling), a camera (separate cameras also may be used to concurrently provide images for a videophone and high quality still images), switches, automatic dialing devices and computer memory capability for initiating and responding to commands from the central traffic control system, as well as, for initiating various actions to accomplish change or to accommodate special circumstances.

Conventionally, in merchandising applications, it is appropriate for the vendors to incur communication expenses. To facilitate this, a reduced rate service for long distance outbound calling, for example MEGACOM, may be installed at each of the buyers' facilities. Data on calls made by the buyers may be obtained from the telephone company (e.g., AT&T telephone company) and analyzed to isolate calls made to each specific vendor and thus, the cumulative charges incurred may be computed. For example, outgoing call activity may be monitored at each of the buyers' facilities or the independently managed, central traffic control site and rebilled to specific vendors.

Alternatively, toll free or "800" services at each of the vendor locations may be installed, and "800" number calls initiated by the buyers may be billed to each of the vendor locations. Further, the central traffic control system may include a central detail service to contract for and install telephone services at both the buyer and vendor locations, in order to obtain and report on calls to and from the buyers, as well as, centrally bill both buyers and vendors for all video telephone communications.

Considerable other data may be developed and stored. For example, the central traffic control station for each buyer facility may maintain a record of outbound calls made by all the buyers located at that facility including data, such as the date and time of the call, the name of the buyer initiating the call and the duration of the call. Accordingly, information for each buyer may be subsequently compiled. Likewise, the central traffic control station may maintain a record of all the calls made by each vendor. For example, a specific organization may wish to ascertain the number of vendor calls to a particular buyer. Accordingly, the central traffic control station may compile such data by comparing vendor outbound calls with a database of buyers (including information, such as telephone numbers, names etc.).

Furthermore, in some cases, a summary of each buyer's efficiency may be recorded and provided to interested parties. For example, a buyer's efficiency may be ascertained by the number of video calls made by a specific buyer every week, the average length of the video call, and other data displayed from the database, namely, name of the vendor, names of the persons participating in the call, and so on. For example, for a particular buyer a summary could indicate that during the week of Mar. 20, 1993, forty calls were made for an average length of twenty minutes. Detailed information may further indicate that specifically at 10:00 a.m., on Mar. 20, 1993, a first appointment with Mr. John Blow, of ABC Fruit Company was initiated, which lasted for 1 hour and 12 minutes, and at 11:12 a.m., a second appointment with Ms. Mary Smith of XYZ Cutlery Company lasted 11 minutes and so on.

The central traffic control station TIS may automatically place a call (for example, to broadcast a proposal request from a buyer) to the appropriate vendor locations, determined by a database of vendor locations qualified (for example, as by specific category or sub-category) for the particular merchandise for which the buyer requests proposals. Likewise, when executing appointments, the buyer may place a call to the appropriate vendor location, determined also by a database associated with the particular one of the vendor locations L1-Ln, with which the specific buyer has an appointment scheduled. Alternatively, the buyer may actuate an autodialer, such that the autodialer code number (obtained from the central traffic control station database) displayed on the buyer's video terminal connects him or her to the appropriate vendor. In the event there are complications or otherwise, the buyer may use a regular telephone or a cellular telephone and manually dial the telephone number displayed on the video terminal. It is currently recognized that cellular transmission will ultimately provide dynamic motion and high resolutions freeze frame displays.

The illustrated embodiment of FIG. 12 shows the independently managed, central traffic control system TIS (right), located remote from the buyer systems illustrated at BS1-BSn and the vendor terminals L1-Ln. Under control of the central traffic control system TIS, communication is provided through a dial-up public telephone system TS, between the vendor terminals L1-Ln and the buyer systems BS1-BSn. The buyer system BS1 is shown in some detail, specifically, as including a telephone interface switch SW coupled to a control computer CC for regulating a plurality of monitor stations V1-Vn.

Preliminarily, considering an exemplary sequence of operations with reference to FIG. 12, assume that different vendor terminals L1-Ln are equipped with videophone, video still (high quality) or hi-fi video capabilities. Alternatively, the vendors may have desktop personal computers incorporating live-action, color video with standard voice telephone lines via networks and modems.

Each buyer system BS1-BSn may be equipped with a platform to accommodate select communications with various vendors. Assume that a person at vendor location L1 wishes to schedule an appointment with a buyer at buyer terminal V1. As a result, telephone equipment at the location L1 is actuated, either manually or automatically, prompting dial-up operations to accomplish a connection from the vendor location L1 through the telephone system TS to the traffic control system TIS. Standard information, as the specific buyer with which the vendor may be entitled to schedule an appointment may be indicated by dialed number identification signals (DNIS) using a capability readily available from the telephone system TS, as for example on the so-called D-channel. It is to be noted that while the D-channel apparatus provides one operational configuration, some DNIS and/or ANI (Automatic Number Identification) data signals can be received in-band without D-channel apparatus. In any event, such signals may direct or qualify communication under control of the system TIS. It should be noted that DNIS and ANI signals can be used for identification, whereby the control computer CC may fetch identification data for graphic displays.

As another feature, an incoming line can be designated at the central traffic control system, such as an "800" line to receive calls from any telephone (pay-phone, vendor location or the like) to prompt scheduling. For example, a call on the "800" line may be answered by an interface or an operator to schedule an appointment with a specific buyer or vendor. The vendor might be specified by ANI signals when calling from a specific vendor location. Accordingly, a vendor can simply call the designated number from any telephone to enter the scheduling program.

For scheduling purposes, PIN numbers (personal identification numbers) are assigned to vendors. The PIN number may be coded to indicate the specific organization that a vendor is associated with. Alternatively, a database of PIN numbers correlating to specific organizations may provide that information. Entry of a PIN number by a vendor may qualify a vendor for contact with a select buyer. Initiating contact also may be controlled by a clock, for example, some communications might be limited to the hours between 7 a.m. and 12 p.m. Additionally, other specifications may be designated for specific groups of vendors. Thus, the system may be configured such that DNIS and ANI communication features cross reference with the clock, prior to answering. For example, if the present time is between 5 p.m. and 7 p.m., only select vendor calls are accepted. Some vendors may be accorded priority status allowing them to schedule appointments for select priority days, for example, Thursdays. Similarly, priority status may be accorded to vendors offering distressed merchandise at discount rates.

Figure 18:
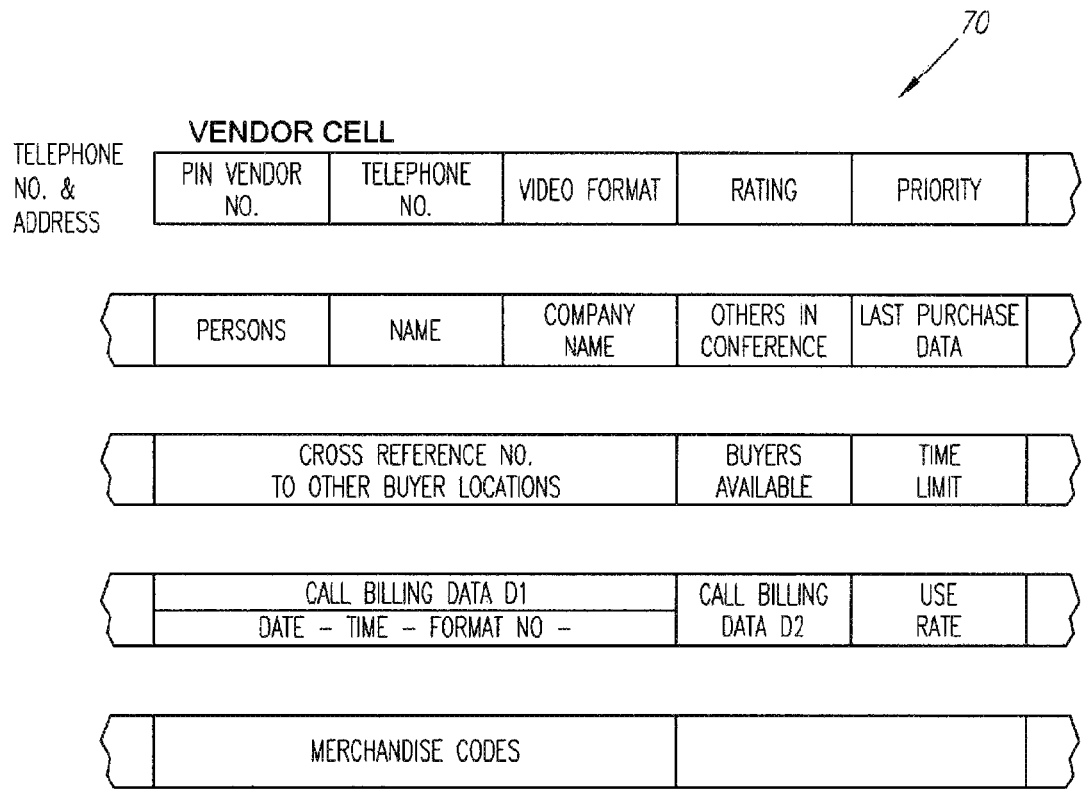
FIG. 18 is a fragmentary diagrammatic representation of an exemplary storage cell for information specific to a vendor, as may be formatted in the system of the present invention.

As described in detail below, a priority field stored in the vendor's cell VC (FIG. 18) may incorporate a use-rate component, whereby extent of use by vendors may be controlled. That is, FIG. 18 illustrates exemplary storage cells of the traffic control system TIS, wherein information specific to each vendor and buyer, such as the telephone number, graphic data, merchandise codes, schedules and the like may be stored. For example, a vendor cell VC may be accessed by the telephone number and address to obtain information such as the vendor PIN number, telephone number, video format and so on. In some formats it may be desirable to designate a rating for each vendor indicating dependability, efficiency at delivering, credit worthiness, specific buyer organizations with which the vendor is registered etc.

Furthermore, to indicate an established relationship, a designation indicating priority may also be stored to isolate a particular vendor from a plurality of vendors selling similar goods. Of course, the vendor cell VC may also indicate the vendor's name, any relevant personal information, the company's name, other persons participating in a conference and so on. Similarly, data relating to the last purchase may also be of importance to some buyers.

With the central traffic control system TIS interacting with a plurality of widely distributed vendors and buyers, a cross reference number identifying transactions with other buyers may be of importance. Moreover, a record of the buyers available and the time limit for each buyer is also recorded. Similarly, the priority designation or status accorded to a vendor for any of a myriad of reasons may indicate, for example, that a particular vendor has distressed merchandise for sale at discount rates. Also, vendors that are not registered may be able to obtain appointments with buyers or buyers' assistants for predefined short periods of time, for example, five minutes.

To ensure effective and proper directing and exchange of traffic, for example, special offers by vendors and responses thereto by buyers, requests for proposals from buyers and responses thereto by vendors, or the like, merchandise codes that apply to each wholesale vendor and wholesale buyer are recorded. The merchandise codes, discussed in more detail below, regulate communication and avoid information overload, as by providing an indication of the type of products that each particular vendor or buyer is authorized to sell or buy.

Figure 19:
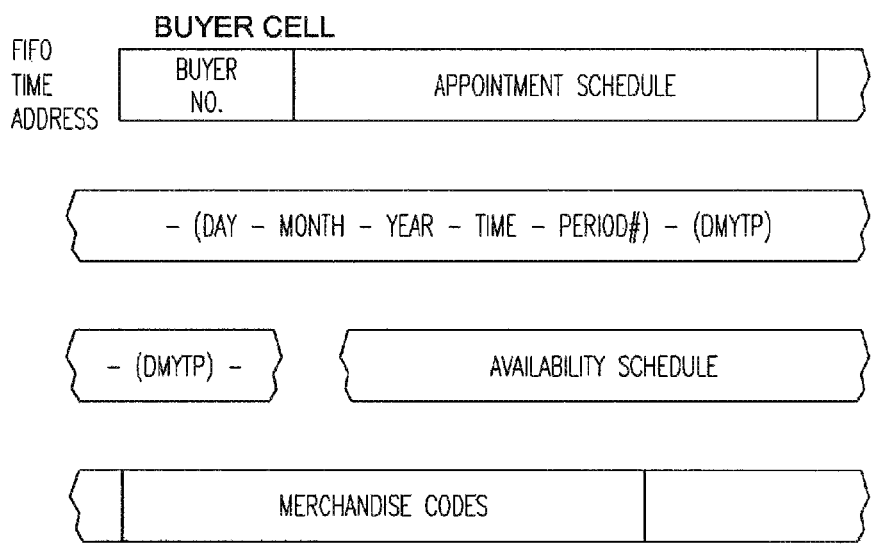
FIG. 19 is a fragmentary diagrammatic representation of an exemplary storage cell for information specific to a buyer, as may be formatted in the system of the present invention.

It should be recognized that appointment schedules also stored in vendor and buyer cells VC and BC (FIGS. 18 and 19), respectively, may be revised and updated on site by the traffic control system. For example, considering a situation where a last minute cancellation or change with respect to a schedule, special offering, request for proposal or proposal is necessary, changes, cancellations or updates to any of these transactions may be requested remotely by vendors and buyers alike. Moreover, vendors or buyers may wish to add pertinent information during visual conferences (real-time) simply for storage in the cells VC and BC or otherwise for subsequent processing.

To recap, under control of the traffic control system TIS, the dial-up public telephone system TS affords effective communication between the remote locations L1-Ln and the buyer systems BS1-BSn. Each buyer system located at a buyer's facility includes a telephone switch SW, through which incoming calls are received and outgoing calls are placed. Incoming data signals (DNIS and ANI) are passed to the internal control computer CC to select an appropriate one of the terminals V1-Vn to handle the call. For example, a station V1 might be assigned to buyer Tom Jones at XYZ Drug company, responsible for purchasing vitamins and over the counter medications. In addition, the computer CC also provides computer graphic signals to monitor station V1 supplementing the coupled television display, for example, to provide a composite display of a scene at location L1 along with appropriate graphic data.

To consider the operation of the total-system embodiment in somewhat greater detail, reference will now be made to FIG. 13 in which previously identified components bear similar reference numbers. Preliminarily, it should also be recognized that certain basic components illustrated only at the central traffic control site TIS, such as memory, data storage, auto dialers, printers, VCRs etc., obviously may also be found at the buyer sites.

In the illustrated embodiment, the central traffic control system TIS directs and exchanges on-line and off-line traffic between the vendor and buyer sites, in the form of special offerings, proposals etc., as well as accepting appointment requests from either the vendor or the buyer sites. Appointment requests are generally initiated from the vendor locations L1-Ln. Subsequently, buyers initiate communication with specific vendors in accordance with scheduled appointments at the appropriate times.

The central traffic control system TIS may initiate contact with the vendor locations L1-Ln or the buyer locations V1-Vn (in predetermined sequence or randomly) to afford communication with the designated vendor or buyer. For visual conferences, buyers may initiate contact with the appropriate vendor locations L1-Ln also in sequence, such as when scheduled, or in some instances randomly.

Figure 13:
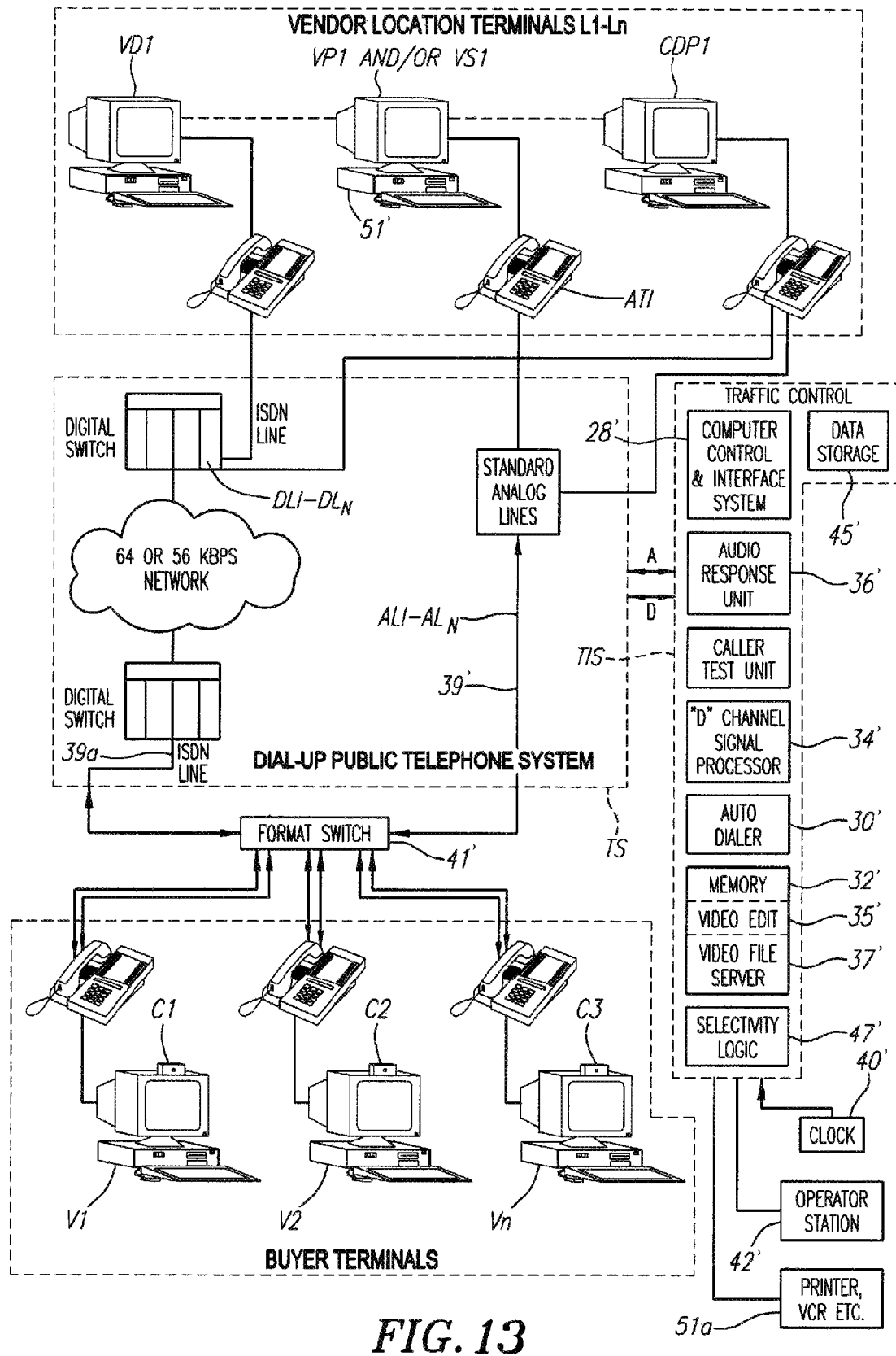
FIG. 13 is a more detailed block and pictorial diagram of the system of FIG. 12, illustrating the basic components of the scheduling and routing system.

As illustrated in FIG. 13, different vendor locations may have different communication capabilities, as represented by terminals VP1, VS1 for analog telephone communication capabilities over standard analog lines (static, videophone or PC), terminal VD1 for digital video capabilities over ISDN lines, and CDP1 for a combined terminal for analog and digital communication capabilities. For illustration purposes, FIG. 13 shows one telephone (see CDP1) as exhibiting both analog and digital communication capabilities.

The videophone terminal VP1 may be a unit available from AT&T, such as the Videophone 2500, or one available from MCI. A form of the digital video system VD1, for example, the NCR PVS-70 system also is available from AT&T/NCR and is recognized to provide high quality images. A static video system VS1 may be AT&T's PICASSO™ still image phone, which transmits "picture perfect" still color images and voice simultaneously in just a matter of seconds. By pushing a button on the PICASSO™ phone, a still image for a camcorder or electronic camera may be captured and, by pushing another button, that picture may be transmitted to another PICASSO™ phone. Such a video static system connects to standard analog telephone lines and is compatible with a wide range of video technology used in daily communication and industry standard camcorders, electronic cameras, mouse devices, document scanners and photo CD players. Accordingly, full-color images, virtually of any type, size or dimension may be transmitted for display on a TV, LCD panel, PC monitor or video monitor. Images may be stored or printed using a PC interface.

FIG. 13 also illustrates representative operator (buyer) terminals V1-Vn, coupled to the traffic control system TIS. Of course, all the operator terminals, as well as, the central traffic control system may be compatibly configured. Note that different videophone systems, rely on their own proprietary codecs, sometimes with more than one as an option. Generally, the operator terminals have the capability to accommodate videophone operation along with telephone switching and a variety of control functions.

The central traffic control system TIS includes a computer control and interface system 28' coupled to several operating devices including an auto dialer 30', a memory 32', a "D" channel signal processor 34', an audio response unit (ARU) 36' and a caller test unit 38'. These structures and their interconnections are disclosed in greater detail below.

The computer control and interface system 28' also is connected to a clock 40' and an operator station 42'. The clock 40' may control scheduling operations as explained above. For example, updates or changes to appointments, such as cancellations, may be remotely implemented (for example, via the central traffic control system) and forwarded to the appropriate buyer in a variety of ways, such as facsimile, electronic-mail, voice-mail or the like. The clock 40' may likewise monitor time limitations, as when special offerings and proposals are only valid for defined intervals of time.

With the live operator station 42', calls from vendors seeking appointments, making special offerings, or alternatively, calls from buyers seeking appointments or proposals, may be transferred to a human operator, in the event there are complications with the automatic response units or message recording equipment or in the event callers are calling from a rotary telephone. Some vendors or buyers may always prefer telephone communication with a human operator at some level.

As indicated above, flexibility to accommodate various vendor equipment configurations is an important aspect of the central traffic control system TIS and the operator terminals V1-Vn. In that regard, it should be recognized that even though only the buyer operator terminals V1-Vn are shown coupled to a format switch 41' (lower center), the central traffic control system TIS also has some form of a format switch, shown as part of the video file server. The format switch 41' selects a compatible one of analog video circuits and static video circuits (on analog communication lines) and digital video circuits (on digital communication lines) for driving one or more monitors incorporating such specific circuits. Each of the video monitors V1-Vn carry a camera C1-Cn which may variously facilitate dynamic motion images and still images. The format switch unit 41' can switch a single analog line 39' (from analog lines AL1-ALn) to couple to either videophone circuits or static video circuits or a digital line (or lines from digital lines DL1-DLn) indicated at 39a to couple to digital video circuits. Note that two lines are typically required for digital video, one for audio and one for digital data. Alternatively, the audio line may also serve as the analog line.

A video recorder (VCR) also may be provided, indicated generally at 51a, which may be set to record continuously or intermittently, to provide historical data for subsequent reference when conferring with a supervisor or refreshing the memory with respect to specific features. Alternatively, a video printer, also indicated at 51a, may be used. On receiving a request command, for example from the traffic control station TIS, the video recorder may record compressed video signals of the display images. Of course, continuous recording by the video recorder may be suspended when desired.

At locations where more than one camera is positioned, a single video recorder may be connected to the multiple cameras via a switching device to control and sequence the recordings from the cameras. A switching device such as the intelligent sequential switcher manufactured by SONY, as Model No. YS-S100, may be used to control and sequence multiple recordings. In addition, plural video recorders, such as separate video recorders for recording images transmitted on digital or analog lines may be connected.

In some situations, select frozen frames of viewings of vendor products or a specific time period of each viewing of a vendor product may be recorded on a VCR or printed using a video printer, for example two seconds (specific time period) of a twenty minute appointment for each vendor location. Such video printing may be obtained both by buyers and vendors.

Likewise, the operator terminal V1 (or the vendor location or the central traffic control system), for example, may incorporate a standard line printer for providing a printed record of predetermined vendor communications, e.g., indicating the date, time, location, period of appointment etc. Thus, a detailed hard-copy record is available when desired.

The traffic control system TIS also includes within a memory 32' or separate therefrom, a video EDI 35' for storing EDI software (Electronic Data Interchange facilitating direct computer-to-computer exchange of forms) or the like. It should be recognized that the buyer terminals V1-Vn may also have EDI software or the like stored in memory, by virtue of which, easy access to and exchange of forms is facilitated. The traffic control system TIS also includes a video file server 37', where vendors and buyers may deposit a video recording of a product being offered by a vendor or alternatively, desired by a buyer. A block indicated at 45' and labeled "data storage" stores standard system and network software. Selectivity logic, indicated at 47', to prevent information overload selectively directs communications between members of plural groups or sub-groups, such as wholesale buyer and vendor groups. Operations relating to the selectivity logic 47' are discussed below.

At this stage, consider an initial phase of a vendor scheduling an appointment. In that regard, select vendors are given advance notice of calling numbers and operating instructions. Accordingly, consider an exemplary operation sequence from the vendor telephone AT1 (FIG. 13). Thus, the vendor initiates dial-up operation with the central system TIS, seeking to schedule an appointment with the specific buyer. With a connection, a called number is indicated by Dialed Number Identification Signals (DNIS) utilizing facilities readily available and provided by the dial-up telephone system TS through the so-called D-channel apparatus 34'. Thus, the central traffic control system has a basis for determining if, by reason of dialing the called number, the vendor is entitled to make an appointment with a specified buyer. A PIN number entered by the vendor may also qualify a caller (vendor).

The dial-up telephone system TS also provides Automatic Number Identification (ANI) signals indicating the calling number on the so-called D-channel apparatus 34'. In various operational phases of the present disclosed embodiment, such signals identify the remote vendor location L1 to the central traffic control system TIS. Using such information, the memory 32' may provide alternate forms of calling signals, commanding a specific outgoing line from the telephone interface and control unit 28' to afford additional communication. Specifically, for example, ANI signals might command various related data from the memory 32'. Thus, an appointment may be scheduled for execution at a later time as explained in detail below. As an alternative to simply scheduling an appointment, assume that the caller is located at the buyer terminal VP1 and wishes to initiate video contact with a specific buyer. Upon attaining communication, the call may be processed, for example, directly to the buyer terminal V1, at which appropriate videophone communication is provided with the vendor. In that regard, video monitors at the terminals V1-Vn may be compatible to receive videophone signals through the dial-up telephone system TS and the interface system 28' of the traffic control system TIS.

Whether a conference is implemented as a result of a direct call from a vendor, or as a result of a scheduled appointment, in accordance with the present development, the selected operator terminal V1-Vn (buyer terminal) is formatted to a configuration compatible with the connected vendor terminal. In that regard, the terminal AT1 (vendor) simply accommodates audio and digital signals and is representative of such terminals for use to schedule appointments, as in an ARU interface. Alternatively, person-to-person communication is available through the operator station 42'.

The videophone terminal VP1 is representative of such units to provide one form of audio/video communication with one of the terminals V1-Vn. During such communication, the switch 41' is actuated to activate the videophone circuits to function in cooperation with one of the monitors V1 or Vn. Thus, compatible communication is implemented for each outgoing call, utilizing data from the memory 32'.

For communication with static video systems (PIC-ASSO™ units) as represented by the terminal VS1, the switch 41' actuates the static video circuits for compatible operation of a monitor V1 or Vn. Note that particularly effective operations may involve combination formats, for example, a videophone and a static video system (likely using a single analog line). Specifically, with both of the appropriate circuits operative, the camera and the monitor V1 may function in a videophone format to accommodate effective personal communication between a buyer and a seller. Concurrently, the camera and the monitor V1 may operate in a static video format to effectively exhibit a vendor's product. Additionally, a mouse 51' at the terminal VS1, controls a cursor in the display of the monitor V1 further enhancing interactive communication. A mouse, such as the one indicated at 51' may also be provided at the buyer terminals V1-Vn. Again, the switch 41' controls the operations to attain the compatible format.

To further illustrate the possibilities, the terminal VD1 is representative of high fidelity (hi-fi) telephonic video systems using digital lines for higher resolution dynamic displays. As with respect to the other formats, the switch 41' selectively actuates the compatible circuits, the digital video circuits, to drive a selected combination of camera and monitor.

It may be seen that the video platforms of terminals V1-Vn offer considerable flexibility in accommodating multiple audio-video formats. Convenience is served by the multiple format capability of the camera along with the video monitor V1-Vn.

Recapitulating, the terminal V1 has been described for communication with the various equipments at locations to include a video location for display. In addition to the display, each of the terminals V1-Vn incorporates a handpiece or equivalent, and a substantial control panel that may be in the form of a telephone pad or embodied as part of a personal computer keyboard.

Figure 14:
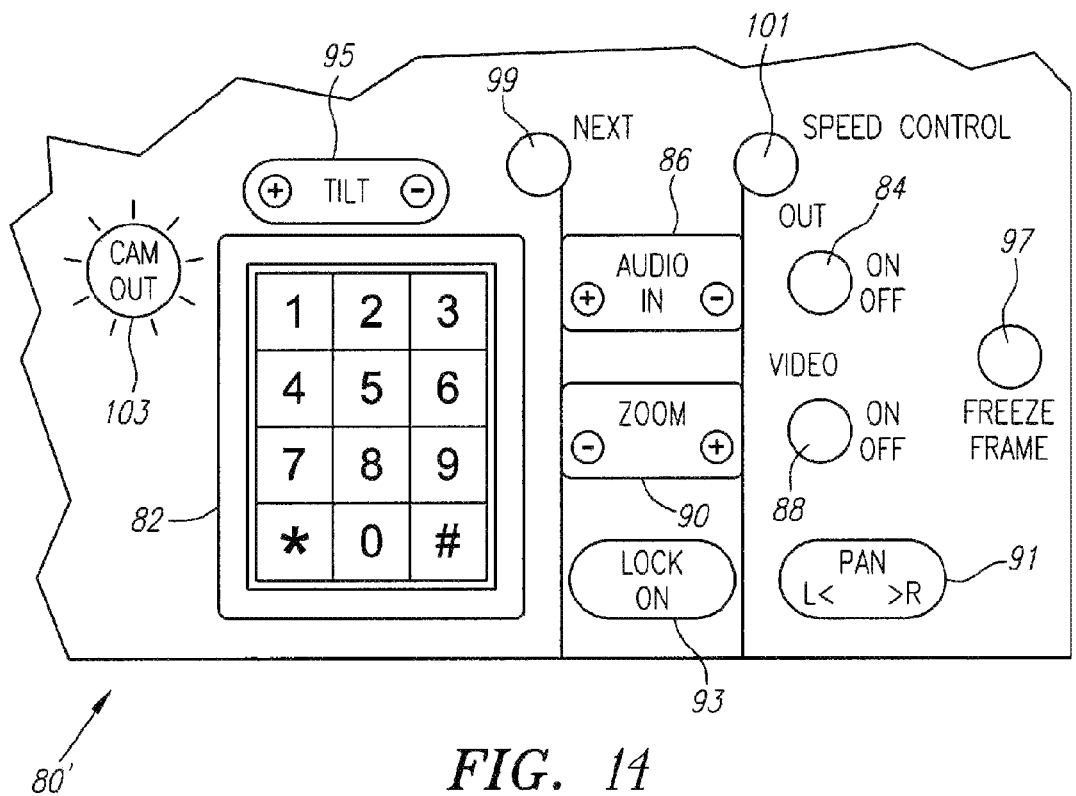
FIG. 14 is a graphic representation of a portion of the control panel of an element in the system of FIG. 13.

In any event, the control panel for each terminal V1-Vn includes the current controls for an operative video format, plus dedicated controls relating to the disclosed system. FIG. 14 shows panel 80' for terminal V1, and is seen to be a superset of panel 80 shown in FIG. 5. In the interest of avoiding undue complications, only a fragment of the representative panel 80' for the terminal V1 is shown in FIG. 14.

Generally the panel 80' affords considerable control, including the use of keypad tone signals (DTMF) to perform control operations at both ends of a communication. Specifically, the fragment of the panel 80' of FIG. 14 incorporates a traditional twelve-button telephone pad 82, bearing the numerals "1" through "0" along with the symbols "*" and "#." The designated buttons each generate a distinct DTMF signal in accordance with extensive practice, which signals are communicated to all connected terminals.

Various other specific controls are provided on the panel 80'. An on-off button 84 controls outgoing audio. A toggle 86 controls the volume of incoming audio. An on-off switch 88 controls video at the terminal. A pair of toggle switches 90 and 91, respectively, control zooming and panning camera operations. A push button switch 93 serves as an interrupt for locking onto the current display (high quality freeze frame) for closer observation or to record data and in some cases higher resolution images for closer observation at a later time, for example, by use of a video printer. In addition, another toggle switch 95 controls tilting camera operations and a push button 97 advances the freeze frame for subsequent observation or reverses it back to a dynamic display. A push button switch 99 serves to manually terminate the call. A control switch 101 regulates resolution of the display. Finally a signal lamp 103 illuminates to indicate the next appointment. Generally, by using the telephone keypad 82 on the panel 80', various control functions can be accomplished as detailed above with reference to FIG. 5.

One form of control involves video coordination. For example, in accordance with a program, a conference might be initiated in a videophone format with the terminal V1 (FIG. 13). Accordingly, the videophone circuits are active to drive the video monitor V1. At some point, assume the conference participants decide to add a static video communication. A command of "52" in touch tones on the pad 82 (see FIG. 14) initiates a series of operations. Specifically, another line connection is established by actuating the autodialer 30' (FIG. 13), then static video circuits are actuated. At the terminal V1, the static video circuits are actuated to drive the monitor V1 that may involve another monitor or split image operation. Separate displays for dynamic and still video may be used, such that a buyer at one monitor can confer with a vendor, speaking face-to-face through the camera and that monitor, while the vendor exhibits fine details of a product on a second monitor in a still image. Of course, in sequences of such still images, views can be changed and areas highlighted with a cursor controlled by the mouse 51'.

As an alternative to actuating the static video format, the conferees may elect to go digital. A command "53" from the panel 46' sets the requisite steps in motion. The autodialer 30' dials up a digital connection, then using that connection, the switch 41' actuates the digital video circuits to drive one of the monitors V1-Vn. Note that with enhanced hi-fi video communication, the assumed videophone communication might best be terminated.

In view of these examples, it will be apparent that the operator at the terminal V1 has substantial control, including the ability to go from one video format to another. Of course, such operations presume that the vendor has the requisite capacity, which may be indicated in the graphic display as treated in greater detail below.

From the above descriptions, it is apparent that the disclosed system utilizes videophone technology in combination with other telephone system technology along with computer control and graphics technology to accomplish effective scheduling and processing of traffic for visual conferences.

As explained above, the exemplary central traffic control system TIS functions to initiate outgoing calls as well as receive and process incoming calls. To resume with the explanation of an incoming call from a vendor to schedule an appointment, when the telephone interface 28' (FIG. 13) receives an incoming call, it may be connected to either the operator station 42' or the audio response unit 36'. Concurrently, incoming data signals (DNIS and ANI) are provided to the "D" channel processor 34' for control and/or information. For example, from the memory 32', the control computer 28' may fetch the identification of the vendor location L1 embracing one or more of the terminals VD1, etc. With such signal represented data, one or more buyers are identified with whom the vendor or vendor organization is entitled to schedule an appointment. However, to schedule an appointment, a vendor may use virtually any form of telephone instrument or terminal including any of the units AT1, VP1, VS1, VD1 or CDP1 as illustrated in FIG. 13. The unit AT1 is sufficient either for a telephonic-computer interactive call or a direct operator call (station 42') to schedule an appointment or the like.

Initially, as described above, inbound calls for a buyer, initiated by vendors, may be received through the interface system 28' (FIG. 13, upper right) for scheduling appointments or directly accommodated at a buyer location by the interface telephone switch SW (FIG. 12, center left) including the format switch 41' for visual conferences. The format switch 41' may incorporate a variable codec for analog lines AL1-ALN and digital lines DL1-DLN. For analog lines, a video CODEC along with computing capability may take the form of an AVP1000 video CODEC chip set as available from AT&T. Essentially, the CODEC chip set accomplishes videophone operation and consists of a video encoder, a video decoder and an internal system controller. The format switch unit 41' is shown as coupled between a standard analog line and a line on ISDN. Upon receiving a call from a videophone unit, the format switch unit 41' selects the appropriate line, that is, the analog line. Alternatively, upon receiving a call from a high fidelity video (digital), the format switch unit 41' selects a digital line. Also, as described above, during visual communication (real-time), a buyer may make switches, e.g., from transmitting dynamic images over a single analog line to high resolution freeze frames. The high resolution freeze frames may be viewed on large 14 inch monitors. Further, the images may be manipulated from either end, to view the freeze frame image concurrently.

In the operation of the system embracing the exemplary formats as treated above and below, a record is made for billing purposes. That is, a billing memory unit BL (FIG. 12) and a standard printer (treated below) are controlled by the computer control 28', recording all transactions in relation to billing charges. Such data can be variously processed at different times. Basically, the concept involves formulating billing data, so that at least a part of the calls made to a vendor, for example, can be rebilled to that vendor.

Considering the dial-up telephone system TS (FIG. 13) in somewhat greater detail, in arrangement, the inter-exchange carrier (e.g., AT&T) provides comprehensive data on calls specifying: phone number calling, phone number called, date, time, length of call (period), billing data and so on. Test or look-up operations are then performed with reference to a vendor database. Accordingly, portions of the charges (with or without mark-ups) are re-billed (with appropriate identification to the vendors). Such operations may be particularly effective in relation to "private" networks, e.g., the so-called SDN (software defined network), SDDN (software defined data network) which are compatible with ISDN operations, or a combination of the two service offerings (SDN with SDDN). Note that AT&T's SDN is a virtual network service which offers an organization the ability to build a private corporate network within the AT&T public network. A customized database contains information on various sites affiliated with the organization (i.e., the service organization installs a "private" network service at many different business entities) as well as features and routing information. Moreover, SDN encompasses voice, analog data, digital data and image transfer. SDDN is a feature of SDN and is most often installed in conjunction with SDN. A combination of the two provides the capability of combining all the different sites for network management and billing. Note that both buyers and vendors may wish to extend the scope of the network of participants by installing at least one similar mode of video in their branches, plants and/or customers.

Essentially, coordinated with the control computer 28' in the system TIS, reapportioning and rebilling options are executed by the billing data unit utilizing storage capacity of the memory 32' or a separate billing data memory.

To this point, detailed consideration has been primarily directed to the treatment of incoming calls to the system TIS. However, as explained, certain modes involve the placement of outgoing calls under either manual control or automatic operation. Such operations next are treated in detail.

As a result of control operations, to implement a sequence of scheduled conferences, the computer control and interface system 28' (FIG. 13) at the central traffic control site or the control computer CC at the buyer site (FIG. 12) may address, for example, the memory 32' to fetch the telephone number for an outgoing call, e.g., a vendor location L1. The telephone number is supplied from the memory 32' (or a memory at the buyer location) to the control computer CC which actuates an auto dialer, similar to auto dialer 30', to provide the dial-up signals on an off-hook line provided to the dial-up telephone system TS. Typically, at the vendor location L1, a dedicated or other line for video operations will accept the communication.

As an alternative to manual calls, the system may operate under computer control to enable a sequence of appointments. During the operation, the control computer CC (FIG. 12) fetches telephone numbers for remote locations from the memory 32' (or a memory on site) in sequence, actuates the auto dialer 34' accordingly, and assigns the resulting connections as scheduled. After a session between a particular buyer and vendor has concluded, the control computer CC terminates the connection in favor of the next waiting connection. A blinking light 103 (FIG. 14) or alternatively, a graphic display of "Five more minutes for the next appointment" may be exhibited to the caller to indicate a next appointment. The operation may result in sequential displays that have been scheduled at the particular one of the terminals V1-Vn.

Figure 15:
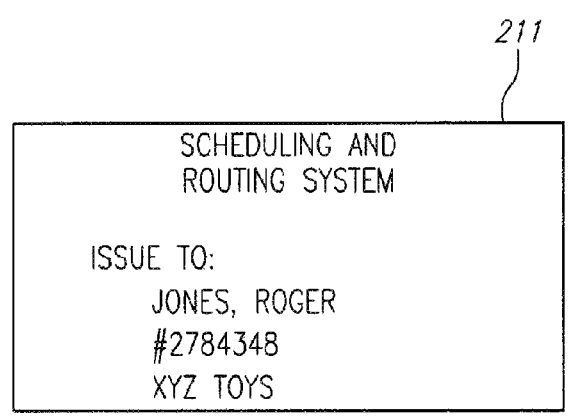
FIG. 15 is an exemplary format of an identification card issued by the scheduling and routing system.

Different selling and buying companies may be registered with the central traffic control system TIS. At registration, central traffic control system TIS may issue an identification card with a check digit for qualification to each representative of the selling or buying company (FIG. 15). An exemplary identification card (embodied for display) is indicated at 211. For example, assume that XYZ company has four vendor representatives, all located at vendor location L1 equipped with analog capabilities only. Further assume that the telephone number for that location is (212) 555-5555. Accordingly, the traffic control system TIS may assign a identification number and store the following information under that identification number in memory: Jones, Roger, XYZ Toy Company, Analog System, Telephone number (212) 555-5555, Registered to interact with EFG Company (central station number—(310) 666-6666), no priority, IJK Company (central station number—(414) 777-7777), priority with buyer no. 3, Thursday appointments may be offered to vendors with priority status. At registration, each vendor and buyer fills out a subscription form or otherwise provides the central traffic control system with specific information, such as the nature of the merchandise they are designated to sell or buy. This information may be provided with reference to an established list of merchandise codes. The designated merchandise codes assist the selectivity logic 47' in making routing determinations to avoid information overload. Similarly, vendors and buyers seeking appointments are qualified on the basis of these merchandise codes and limited to making appointments only with authorized persons.

To make an appointment, a special offering or a proposal in response to a buyer request, the vendor may initiate dial-up operations with the central traffic control system TIS. For such calls, the ARU 36' may provide voice cues to the vendor and prompt touch tone input of responses as described above. A single ARU may be used for different organizations, alternatively, different ARU's may be used for different large organizations. The ARU's may include voice-mail capabilities for individual buyers. After recording all the information pertaining to a special offering or proposal, the central traffic control system provides reservation or identification numbers. For example, callers may be queried via the ARU if calling to cancel an appointment or supplement a special offering or proposal. If a call is merely to cancel an appointment, the vendor would only need to enter the appointment number. Likewise, if the call is simply to report that a sale for a special offering has been consummated, the vendor may only need to enter an identification number.

Note that live operators also may take information from vendors and access the traffic control computer TIS to enter appropriate request data processed similar to the automatic features of the system in the event vendors are calling from a rotary telephone or for other reasons. Additionally, the live operators may transfer calls to an ARU to enable vendors to leave voice-mail messages.

The traffic control system TIS may provide schedule or other data to individual buyers via facsimile, either automatically or upon request. Alternatively, schedule or other data may be provided to individual buyers by downloading data onto a computer at the buyer's location typically in batch mode overnight. Recent changes to appointments or special offerings and proposals may be displayed on the buyer's terminal (real-time) or forwarded by electronic-mail.

At the central traffic control site, which may service numerous business entities, several audio response units (ARU) may be used in conjunction with several groups of live operators. To accommodate large numbers of calls, automatic call distributors (ACD) may be utilized to route calls where the different business entities are identified by DNIS.

It should be recognized that video recordings on specific merchandise may be stored at the video file server 37' for viewing by buyers and sales may be consummated without any visual conferences between vendors and buyers.

Also, it should be recognized that the buyer terminals disclosed herein may be used by retailers to sell products directly to the persons having units similar to the vendor units described herein in their homes. In such a scenario, ANI may be used to identify a particular household calling, and DNIS may be used to identify a particular product of interest.

Figure 16:
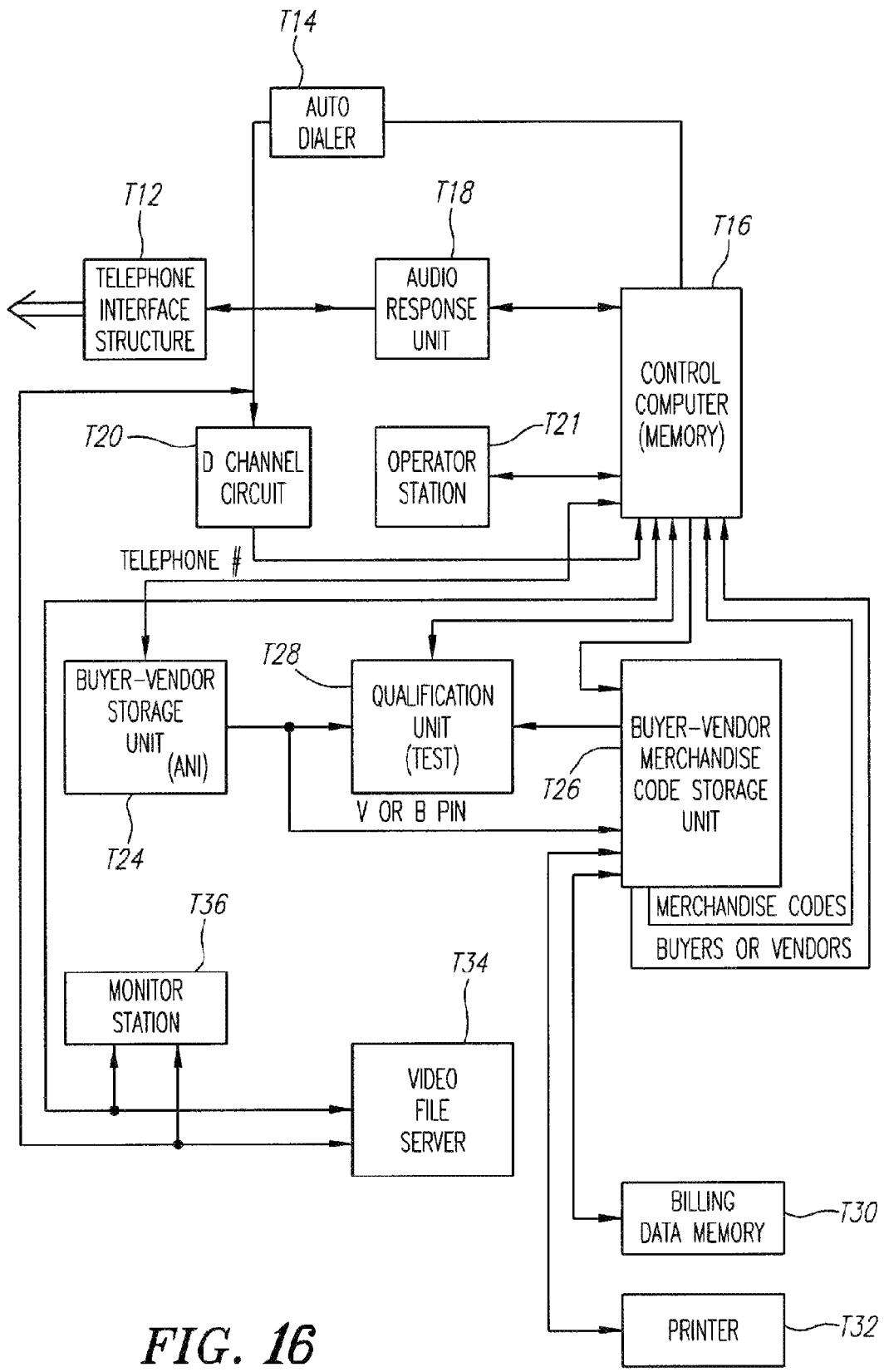
FIG. 16 is a more detailed block diagram illustrating the central traffic control system of the scheduling and routing system of FIG. 13.

As indicated above, the traffic control system TIS incorporates structure for a wide variety of communications through the dial-up telephone system TS. FIG. 16 illustrates a more specific exemplary form of the system TIS. A telephone interface T12 (upper left) accommodates a multitude of line connections to the dial-up public telephone system TS (FIGS. 12 and 13) accommodating two-way communication with various capabilities as treated above.

The interface structure T12 (FIG. 15) accommodates the placement of outgoing calls by an auto dialer T14 controlled by a computer T16 incorporating substantial memory. Auto dialers are well known in the telephone arts functioning to place calls in response to digital instructions. As the source of such digital instructions, along with others, the control computer T16 comprises a substantial computing capability, functioning to control telephonic traffic in various communication forms through the telephone interface structure T12. Traffic is controlled, both for servicing and interconnecting remote terminals at both vendor and buyer locations, e.g., buyer locations BS1-BSn (FIG. 12) and vendor terminals, e.g., terminals L1-Ln.

The control computer T16 also is connected to an audio response unit T18 for vocally cuing and otherwise interfacing remote stations through the telephone interface structure T12. Again, various forms of audio response units are well known in the telephonic arts for verbalizing cues, receiving digital signals and performing some processing. In that regard, the audio response unit T18 may incorporate some dictionary capability or may rely on the control computer T16 for an extended dictionary of words to be vocalized.

The control computer T16 also is connected to receive signals from the telephone interface structure T12 through a "D" channel circuit T20. For example, the "D" channel circuit receives ANI and DNIS signals indicative of calling and called station numbers as explained above. Essentially, the "D" channel circuit T20 provides call related information to the control computer T16 in accordance with well known techniques of the telephonic arts.

Recapitulating to some extent, it may be seen that the control computer T16, along with the above-mentioned structures, has substantial capability to interface with remote terminals. However, under certain conditions, manual communication also may be desired. Accordingly, as explained above, an operator station T21 is coupled to the computer T16 to accommodate a human interface. The operator station T21 may take the form of a CRT terminal with graphics display capability and various controls (FIG. 16) implemented through the control computer T16.

As indicated above, to accomplish the traffic control function, the computer T16 has substantial computing capability, specifically, for purposes of control, storage management, delivery, scheduling and interconnecting remote stations. For convenience of explanation, in FIG. 16, several operating components that could be integrated in the computer T16 are separately illustrated. Such separate illustration also facilitates the operating explanations. Specifically, separate storage capacity is illustrated in the form of a buyer-vendor storage unit T24 and a buyer-vendor/merchandise code storage unit T2. The storage units T24 and T26 are addressed by the control computer T16 to provide data that is processed along with other data to control and facilitate on-line and off-line communications between buyer and vendor terminals.

As suggested above, communication between the various vendors and buyers involves substantial control and regulation along with limitations, thus, the term traffic control is deemed appropriate. In that regard, a qualification unit T28 is coupled both to the control computer T16 and the storage units T24 and T26. Essentially, the qualification unit T28 receives identification and limitation data to qualify buyers and vendors for select individual communications. The storage unit T26 is coupled directly to the computer T16, along with a billing data memory T30 and a printer T32 for operation as mentioned above.

Summarizing the extensive treatment above, the present system variously implements both online and offline communication as between vendors and buyers. The communication is considerably enhanced by video displays. Accordingly, a video file server T34 is coupled directly to the telephone interface structure T12 and to the control computer T16. A monitor station T36 is similarly coupled, as for select time or call monitoring.

In view of the preliminary description of the structure (FIG. 16) a comprehensive explanation of the system now may be expressed by assuming particular situations and describing typical operating sequences. Accordingly, assume the structure of FIG. 16 is coupled as the traffic control system TIS in the system of FIG. 13 for controlling and regulating select communications between vendor and buyer terminals. In that regard, a system of merchandise classification is used to enhance the selectivity of communication to prevent information overload. Generally, merchandise is classified in accordance with a decimal system, somewhat equated to the channels of commerce for various goods. For example, a component of such a classification is as follows.

CHART A

| Merchandise | Decimal Code |
| --- | --- |
| Body Treatment | 470000 |
| Skin | 471000 |
| Sun Cream | 47260 |
| Prevent & Protect | 471230 |

CHART A-continued

| Merchandise | Decimal Code |
| --- | --- |
| Water Resist | 471234 |
| Tanning | 471235 |
| Cream | 471300 |
| Moisture | 471310 |
| Cleansing | 471320 |
| Hair | 472000 |

In accordance with the exemplary classification, "body-treatment" merchandise carries the code "470000". More explicit classifications of such merchandise carry additional decimal indicators. For example, as indicated above, water-resistant, sun protection treatment would be identified by the code "471234". Accordingly, entire ranges of merchandise are classified and coded to control and regulate communication traffic in accordance herewith.

Generally, preliminary inquiries, offers for sale and requests for proposals all carry merchandise codes for selectively identifying potentially interested vendors or buyers. As a further element of classification, buyers or vendors also may be assigned specific codes, for example, designating a business primarily as, supermarkets, department stores, drug stores and so on.

As detailed below, the operation of the system will be treated as it regulates and controls video communication, for example, selectively between vendors and buyers, to expedite traditionally complex purchasing operations. In that regard, the embodiment treats six types of telephone calls.

Specifically, primary calls are classified in accordance with the following chart.

CHART B

| Type Call | Nature |
| --- | --- |
| "A" | Vendor with special offering |
| "B" | Buyer responding to special offering |
| "C" | Buyer with Request for Proposal (RFP) |
| "D" | Vendor responding to RFP |
| "E" | Vendor seeking appointment |
| "F" | Buyer seeking appointment |

Typically, calls of the various types involve some form of qualification or approval. For example, access to the system typically will be limited to qualified or registered entities. Also, certain limitations will be imposed on such entities. For example, calls that would reveal one vendor's proposal to another vendor are inhibited. Also, it may be desirable to limit calls from buyers accessing information related to another buyer. Of course, specific forms of limitations and qualifications may be implemented depending upon specific applications. However, in accordance with the disclosed embodiment, the types of calls set out above, all involve some form of qualification. The qualifications are generally performed by the qualification unit T28 (FIG. 16) utilizing information derived from a call correlated with reference data from the storage units T24 and T26. In that regard, the logic for the qualification unit T28 may be implemented in accordance with the flow diagram of FIG. 17 as will now be considered.

In the disclosed embodiment, the qualifications for buyers and vendors are somewhat similar. Specifically, the tests for a calling vendor are:

Is the calling station registered as a vendor (or buyer)?

Can the caller give a proper PIN number (Identification Number)?

Is the vendor qualified for the designated merchandise?

Is the vendor approved for an identified buyer or buyers?

Figure 17:
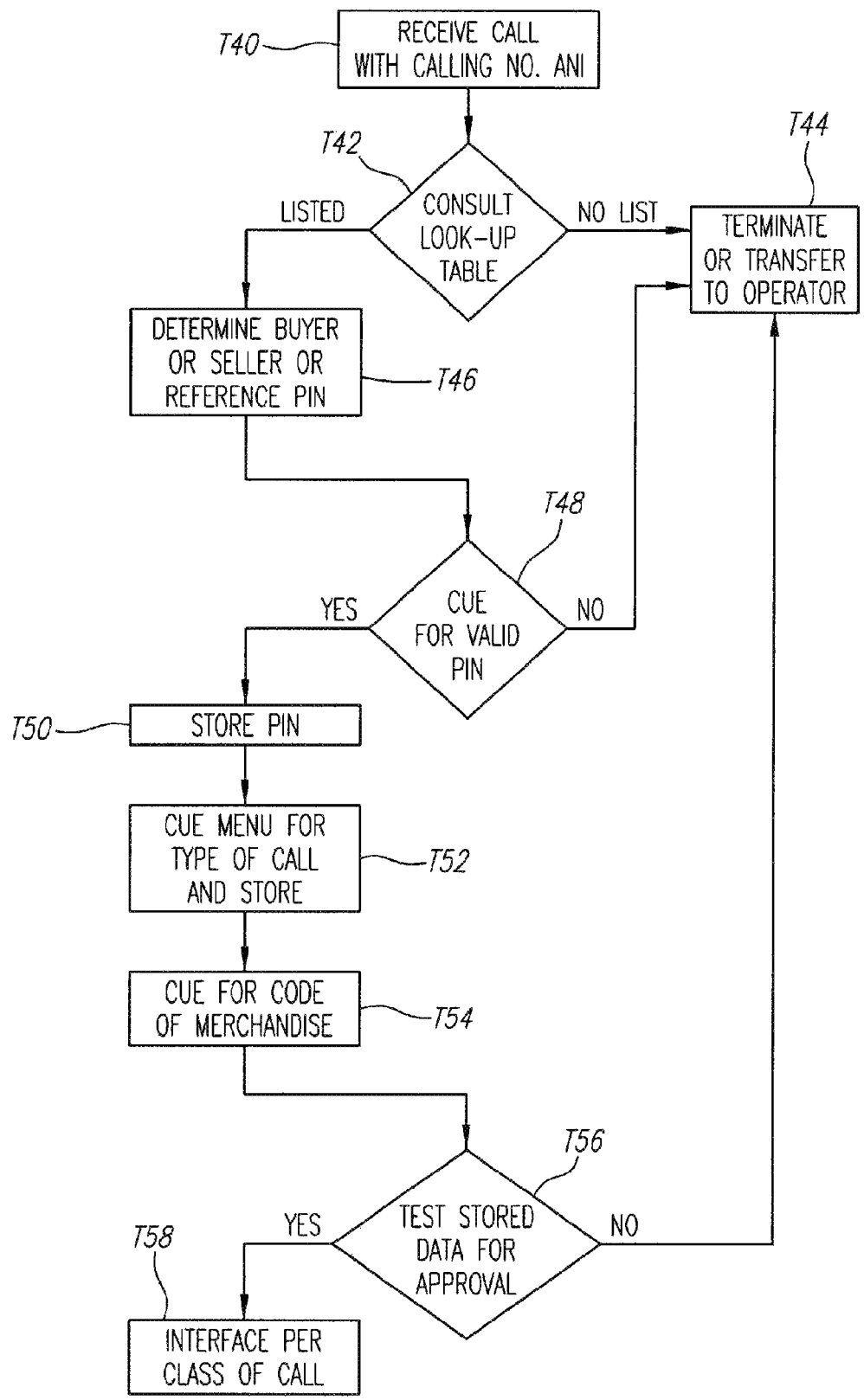
FIG. 17 is a logic flow diagram illustrating an exemplary operation format of the system of FIG. 16 for automated qualification of callers, such as vendors or buyers.

The tests for calling a buyer are quite similar. To consider the logic embodied in the qualification unit T28 (FIG. 16), reference will now be made somewhat concurrently to FIGS. 16 and 17. With the occurrence of an incoming call through the telephone interface structure T12 (FIG. 16), "D" channel signals are supplied through the circuit T20 to the control computer T16. As a result, the computer T16 addresses the buyer-vendor storage unit T24, using the call number of the originating terminal (ANI). Of course, in other applications DNIS signals may be similarly employed. The operation is illustrated by a block T40 (FIG. 17). Addressed by the calling number, the storage unit T24 (FIG. 16) supplies representative signals indicating: first, that the calling terminal does belong to a registered buyer or seller, whether the entity is a buyer or a seller, and the identification number (PIN) for the entity. The operation of consulting the storage unit T24 or look-up table is illustrated by a query block T42 in FIG. 17.

If the calling terminal number is not located, indicating an unregistered caller, the qualification unit T28 (FIG. 16) actuates the computer T16 for appropriate control. Specifically, the audio response unit T18 may be prompted to provide a termination message or the operator station T21 may be actuated for a human interface. Such alternatives are represented in FIG. 17 by the block T44.

For calls originating from a registered terminal, the qualification unit T28 (FIG. 16) stores the pertinent data, i.e., buyer or seller and reference PIN. The operation is illustrated in FIG. 17 by the block T46.

With the determination of a properly registered calling terminal, the computer T16 actuates the audio response unit T18 providing a verbal cue for an identification number (PIN). The operation is illustrated in FIG. 17 by the query block T48. If the caller enters keypad digital information indicating an invalid PIN, or makes no entry at all, the operation again proceeds to the block T44 for termination or transfer of the call as explained above. With the entry of a valid PIN, the operation proceeds to store the personal identification number as indicated by a block T50.

The qualification unit T28 (FIG. 16) next functions in cooperation with the computer T16 driving the audio response unit T18 to cue the caller for the type of call and the merchandise code, see blocks T52 and T54 (FIG. 17) representing such operations. Although such operations are not detailed in FIG. 17, it is to be understood that improper responses or the lack of a response will transfer the process to the function of block T44, as illustrated, to terminate or transfer the call. On the contrary, if appropriate information is received, the qualification unit T28 (FIG. 16) receives and stores the requested information. Consequently, the unit T28 contains: the caller's PIN number, the call type and the merchandise code. That data is then tested within the qualification unit T28, against reference data, in a process step as illustrated by the query block T56 in FIG. 17. The details of the test are treated in somewhat greater detail below; however, as illustrated in FIG. 17, if the tests are not successful, the process again proceeds to the termination block T44; otherwise, the process proceeds to a block T58 to implement the substantive communication of the call.

The final test of the call involves operation of the qualification unit T28 (FIG. 16) in conjunction with the storage unit T26. That is, for each buyer and vendor, the unit T26 stores merchandise codes and, in some instances, other special information. For example, typically, vendors may be denied access to certain information. For example, a vendor would not have access to the type calls: "A" (a special offering of another vendor), "D" (another vendor responding to an RFP)

and so on. However, exceptions are possible and in that regard it is simply important to appreciate that special situations may be stored in the unit T26.

Returning to the routine situation, as indicated above, each buyer and vendor is associated with specific merchandise codes. In that regard, merchandise codes not only facilitate and expedite communication but additionally, charges and billing data (for storage in the memory T30) may be based on active merchandise codes for a subscriber.

Pursuing a specific example, assume a caller, identified as a vendor and otherwise qualified is pursuing the presentation of a special offering. Further assume that the calling vendor is associated only with hair products (Chart A, code 472000). However, assume that the caller identifies the "merchandise of interest" to be a water resistant sun skin product, code 471234. Thus, the identified merchandise code does not coincide with the caller's registered merchandise code. In such a case, the processing is halted with the consequence that the call is either terminated or transferred to an operator. At this stage, likely operation would involve referring the call to an operator. Thus, the qualification unit T28 concludes the test by assuring that the entity being represented by a call is authorized for access with respect to the identified codes.

Once a caller has been identified, the control computer T16 (FIG. 16) functions primarily in conjunction with the video file server T34 to implement the communication. Of course, in instances where an appointment is sought, as described in detail above, the function of the video file server T34 may be relatively nominal. Note with regard to appointments, that a caller may simply request an appointment immediately within call types "E" and "F". That is, within the concept of obtaining an appointment, a caller may simply seek to speak with a particular vendor or buyer representative immediately.

To consider the specific operations, assume that the exemplary caller is a vendor with a special offering, i.e., call type "A". As a specific example, the caller may represent a vendor entity dealing in distressed merchandise holding a considerable volume of hair shampoo packaged for women, i.e., merchandise code "472147". With the merchandise codes stored, the control computer T16 actuates the video file server T34 along with the audio response unit T18 to receive a video presentation of the merchandise, that is, the hair shampoo. Typically, the vendor will have organized the presentation prior to making the telephone call so that the merchandise can be variously demonstrated and various information including pricing etc. expressed in the video presentation. Thus, an effective record of the video presentation is stored in the file server T34 essentially in the form of a sales presentation for the hair shampoo, that is, product code "472147".

With the completion of the video record, the control computer T16 actuates the storage unit T26 to isolate all buyers associated with the product code "472147" identifying hair shampoo. With the list of buyers identified and a video presentation recorded, the subsequent operations involve communicating the video presentation to the select group of buyers. In accordance with the disclosed embodiment, the identified buyer group is notified of the availability of the demonstration. Thereafter, qualified buyers may establish communication (call "B") through the telephone interface structure T12 (FIG. 16) to receive the stored video presentation from the file server T34. Various specific arrangements may be involved. The central traffic system may maintain a record or log of all the buyers accessing the video file server, which may be provided to the vendor, upon request. A record of the time (provided by the clock) spent by each buyer in viewing a video presentation may also be maintained. For example, a specific buyer may terminate the video after viewing it for only a few minutes, while another buyer may view the entire video presentation. The vendor may request such information to determine buyers' reactions to the special offering, for marketing or other reasons.

In some situations, it may be particularly advantageous for buyers to receive early notice of a special offering by a vendor. Accordingly, it may be desirable to implement a rotational order scheme or a random operation for determining the sequence in notifying buyers. Specifically, a random number generator may be incorporated in the control computer T16 for ordering the list of buyers for notification.

Notices to buyers or vendors also may vary considerably, depending upon individual programming considerations. In some situations, vendors may provide a special list of buyers or alternatively, exclude specific buyers. All buyers and vendors are provided with a list of participating members of the network, at registration. Periodic updates of new members may be circulated from time to time.

In accordance with the disclosed embodiment, the control computer T16 simply actuates the auto dialer T14 to establish telephonic communication with buyers after which the audio response unit T18 notifies the buyer. Alternatives involve the utilization of facsimile or the like capability or various forms of electronic mail may be incorporated for utilization. In any event, the select group of buyers is notified that the presentation on a hair shampoo packaged for women is accessible by interfacing through the telephone structure T12. Responding buyers (call type "B") are qualified as described above, then coupled to the video file server T34 to receive the video presentation. Thereafter, interested buyers may directly contact the vendor, typically for further video communication. Thus, the foundation for a transaction is completed rapidly and effectively with substantial communication of the goods involved and related considerations.

Another possibility involves type "C" calls, whereby a buyer distributes a request for proposal. Again, various communications may be accomplished to a select group or subgroup of vendors based on merchandise codes. To consider a specific form of communication in accordance herewith, after qualification, a buyer might use video communication to notify vendors with a graphic such as one illustrated in FIG. 20. FIG. 20 illustrates an exemplary buyer request form providing specific information of the merchandise. Blank forms may be stored in a forms directory (e.g., menu-driven) or the like on each buyers terminal. Thus, when making a request for proposals, a buyer may simply access a blank form and enter the specific information. Essentially, a merchandise code number "472361" is supplied, indicating the specific product as also identified in the graphic. After the notice has been sent to vendors, a message as represented in FIG. 21 may be transmitted to the buyer from the central traffic control system TIS. Note that a check digit may be supplied. Likewise, vendors may access blank forms, similar to the exemplary buyer request forms, to indicate special offerings.

Following receipt of a request for proposal, interested vendors may submit a video presentation as described above. Alternatively, vendors may be invited to call for an appointment or otherwise communicate their proposals to buyers. Thus, the system affords considerable flexibility in selectively communicating product information between buyers and sellers using video formats.

In view of the above description, it will be apparent that numerous operating formats, programs and layouts may be accomplished using a wide variety of videophone equipment in cooperation with computing and telephone apparatus. As indicated above, the disclosed embodiments afford some arrangements; however, the scope hereof should not so confined, rather the scope hereof should be in accordance with the claims as set forth below.

What is claimed is:

1. A method for controlling a remotely located device comprising:
   receiving, from a first electronic device located at a first location and having at least video display capability and data input capability from at least a personal computer keyboard, one or more commands at a control computer, such commands directing the control computer to establish communications with a select one of a plurality of second electronic devices each located at remote locations to the first electronic device and having at least video display and data communication capability,
   addressing a memory associated with the control computer to fetch identifying information for the select second electronic device,
   utilizing at least certain of the identifying information to establish a communications link between a communication device associated with the control computer and the select second electronic device,
   using the communications link to send one or more commands from the first electronic device to the select second electronic device at its remote location to control transmission of information from the select second electronic device at its remote location to the first electronic device,
   receiving, at the communication device, information from the select second electronic device, the information including data facilitating display of one or more images to a human and representing at least certain color video information generated by the select second electronic device at the remote location,
   transmitting data to facilitate display of the color video information on the first electronic device together with text data relating to the select second electronic device, and
   receiving control data from the first electronic device intended for the select second electronic device, the control data responsive to a mouse in communication with the first electronic device and at least certain of the control data causing manipulation of the select second electronic device.

2. The method of claim 1, wherein the communications device communicates via a single communication line facility for at least a portion of the communications link.

3. The method of claim 1, wherein the information received from the select second electronic device also includes audio information.

4. The method of claim 3, further comprising facilitating audibly playing the audio information.

5. The method of claim 1, wherein at least certain of the information received from the select second electronic device indicates a status at the remote location.

6. The method of claim 1, wherein the information from the select second electronic device identifies the remote location of the select second electronic device.

7. The method of claim 1, wherein the information received from the select second electronic device is identifying data identifying the select second electronic device that produced data facilitating display of one or more images.

8. The method of claim 7, further comprising providing stored graphic information in accordance with the identifying data identifying the select second electronic device that provided the data facilitating display of one or more images.

9. The method of claim 7, wherein the identifying data is a number associated with the select second electronic device.

10. The method of claim 1, wherein the control data controls at least one of pan, zoom, view, tilt, freeze frame, and field of vision change of the select second electronic device.

11. The method of claim 1, further comprising providing stored graphic information in accordance with the select second electronic device providing the received information, generating a graphic signal corresponding to the stored graphic information, and displaying the received information and the generated graphic signal.

12. The method of claim 11, wherein the stored graphic information is provided in accordance with the received information.

13. The method of claim 11, wherein at least part of the graphic signal is a representation of the remote location of the select second electronic device.

14. The method of claim 11, wherein the graphic signal includes text relating to the remote location of the select second electronic device.

15. The method of claim 14, wherein the text represents at least one of a telephone number of the remote location of the select second electronic device, a name of the remote location of the select second electronic device, an address of the remote location of the select second electronic device, and a name of a person at the remote location of the select second electronic device.

16. The method of claim 14, wherein the text represents a nature of the status at the remote location of the select second electronic device.

17. The method of claim 11, further comprising combining the received information from the select second electronic device and the generated graphic signal to produce a composite signal for facilitating display of one or more images to a human.

18. The method of claim 1, wherein the information received from the select second electronic device is in accordance with a predetermined sequence.

19. The method of claim 1, wherein the information received from the select second electronic device is in accordance with a random sequence.

20. The method of claim 1, wherein the information received from the select second electronic device is in accordance with a demand from an operator.

21. The method of claim 20, wherein the demand from the operator is in response to awareness of events at the remote location of the select second electronic device.

22. The method of claim 1, wherein the information received from the select second electronic device is in accordance with a risk assessment at the remote location of the select second electronic device.

23. The method of claim 1, wherein the information received from the select second electronic device is in accordance with an operating schedule at the remote location of the select second electronic device.

24. The method of claim 1, wherein the information received from the select second electronic device is in accordance with a monitoring command signal from the remote location of the select second electronic device.

25. The method of claim 1, wherein the information received from the select second electronic device also specifies a time interval for the information.

26. The method of claim 1, wherein the information received from the select second electronic device is in accordance with a comparison between images at the remote location of the select second electronic device captured at different times.

27. The method of claim 26, wherein the images are digitized video.

28. The method of claim 26, wherein the at least one of the images is recorded.

29. The method of claim 1, wherein certain of the information received from the select second electronic device is responsive to a special situation identified at the remote location of the select second electronic device.

30. The method of claim 29, wherein the remote location of the select second electronic device includes at least one manually operated input control for indicating the special situation.

31. The method of claim 30, wherein the remote location of the select second electronic device includes a plurality of switches for indicating different types of special situations.

32. The method of claim 29, wherein the select second electronic device senses a special situation.

33. The method of claim 29, wherein the special situation is indicated by entry, via a keypad, of an identification number at the remote location.

34. The method of claim 29, wherein the special situation is indicated by a change exceeding a predetermined threshold between images of a location captured at different times.

35. The method of claim 34, wherein the images are digitized video.

36. The method of claim 34, wherein the at least one of the images is recorded.

37. The method of claim 1, wherein the information received from the select second electronic device includes data facilitating display of full motion video signal generated by the video signal generator at the remote location of the select second electronic device.

38. The method of claim 1, wherein the communications link uses a dial-up connection.

39. The method of claim 1, wherein the select second electronic device includes a dedicated line for supporting the communications link.

40. The method of claim 1, wherein the select second electronic device includes a facility for supporting the communications link.

41. The method of claim 1, wherein the communications link is provided, at least in part, via a connection.

42. The method of claim 1, wherein the communications link uses a public communications network.

43. The method of claim 42, wherein the public communications network is a public switched telephone network.

44. The method of claim 42, wherein the public communications network is a digital network.

45. The method of claim 44, wherein the digital network is according to the ISDN standard.

46. The method of claim 1, wherein the information received includes data facilitating display of a full motion video signal.

47. The method of claim 1, wherein the data facilitating display of one or more images to a human represents television quality pictures.

48. The method of claim 1, wherein facilitating display includes providing image enhancement of the information received from the select second electronic device.

49. The method of claim 1, wherein facilitating display includes presenting the one or more images to one operator at a time at the first location.

50. The method of claim 1, wherein facilitating display includes presenting the one or more images to multiple operators at the same time at the first location.

51. The method of claim 1, wherein facilitating display includes utilizing multiple screen units.

52. The method of claim 1, wherein the select second electronic device has a video display for displaying video from the first location.

53. The method of claim 1, wherein the select second electronic device has a recording device for recording video.

54. The method of claim 1, further comprising sending a generated signal to the select second electronic device based, at least in part, on the information received from the select second electronic device.

55. The method of claim 54, wherein the generated signal is for controlling operation of one of the plurality of second electronic devices.

56. The method of claim 55, wherein the generated signal controls at least one of pan, zoom, view, tilt, freeze frame, and field of vision change of the select second electronic device.

57. The method of claim 54, wherein the generated signal represents instructions for personnel at the remote location of the select second electronic device.

58. The method of claim 54, wherein the generated signal represents a prerecorded audio message.

59. The method of claim 54, wherein the generated signal represents a synthesized audio message.

60. The method of claim 54, wherein the generated signal represents a spoken audio message.

61. The method of claim 54, wherein the select second electronic device has a speaker for audibly delivering the generated signal.

62. The method of claim 1, further comprising recording the information received from the select second electronic device.

63. The method of claim 1, wherein the information received from the select second electronic device is provided from a video recorder at the remote location of the select second electronic device.

64. The method of claim 63, wherein the video recorder is set to record intermittently.

65. The method of claim 63, wherein the video recorder is set to record continuously.

66. The method of claim 63, wherein the video recorder is set to record a selected frame of video.

67. The method of claim 63, wherein the video recorder is set to record for a specified time interval.

68. The method of claim 1, wherein the information received from the select second electronic device is also recorded at the remote location of the select second electronic device.

69. The method of claim 1, wherein the information received from the select second electronic device is also printed at the remote location of the select second electronic device.

70. The method of claim 1, wherein the information received from the select second electronic device is provided from a switching device at the remote location that sequences information from the plurality of second electronic devices.

71. The method of claim 1, wherein the communications link uses a primary communication facility, and further comprising providing a backup communication facility when the primary communication facility is malfunctioning.

72. The method of claim 1, further comprising distributing the information received from the select second electronic device to one of multiple operators.

73. The method of claim 72, wherein the distributing is in accordance with availability of the multiple operators.

74. The method of claim 72, wherein the distributing is in accordance with priority status of the information.

75. The method of claim 72, wherein the distributing is in accordance with a situation status of the information and abilities of the multiple operators to handle different types of situations.

76. The method of claim 1, wherein at least one of the remote locations is a bank, a supermarket, a parking structure and a quality control facility.

77. The method of claim 1, further comprising providing a control panel including at least one of an outgoing audio control, an incoming audio control, an outgoing video control, an incoming video control, an operations control for a select one of the plurality of second electronic devices at the remote location, a display sequence control, a display resolution control, an indicator for indicating that one of the second electronic devices has become inoperative, a keypad for selecting control commands, and an activator for establishing a communications connection to a police station.

78. The method of claim 77, wherein the control panel includes the personal computer keyboard.

79. The method of claim 1, further comprising recording transactions based on the information received from the select second electronic device.

80. The method of claim 1, further comprising entering an operator's observations, and a memory for storing the entered observations.

81. The method of claim 1, wherein the first electronic device has a battery of providing backup power.

82. The method of claim 1, wherein the select second electronic device has a battery for providing backup power.

83. The method of claim 1, wherein the plurality of second electronic devices are associated with different business entities.

84. The method of claim 1, wherein at least one of the remote locations includes a plurality of second electronic devices.

85. The method of claim 1 further comprising:
facilitating interactive data sharing by concurrently sharing information between the first electronic device at the first location and the select second electronic device at the remote location.

86. The method of claim 1 wherein the color video information generated by the select second electronic device is an image associated with the remote location.

87. The method according to claim 86 further comprising:
comparing an image at the remote location at a first time with an image at the remote location at a second time and transmitting data to the first electronic device based on the difference between the images.

88. The method of claim 1 wherein the control data facilitates sharing at least certain data between the first electronic device and the select second electronic device.

89. The method of claim 88 wherein at least certain of the control data to facilitate sharing at least certain data between the first electronic device and the second electronic device is input with the mouse in communication with the first electronic device.

90. The method of claim 1 wherein at least certain of the control data is input through a control panel.

91. The method according to claim 90 wherein the control panel includes the personal computer keyboard.

92. The method of claim 1 wherein at least certain of the control data causes manipulation of the select second electronic device to zoom in on a portion of the one or more images.

93. The method of claim 1 wherein each of the electronic devices has video codec capabilities via which the data facilitating display of one or more images to a human is communicated.

94. The method of claim 1 wherein an initiation of communication from the first electronic device to the select second electronic device is facilitated by electronic mail capability.

95. The method of claim 1 wherein communication from the first electronic device to the select second electronic device is via an online service.

96. The method of claim 1, wherein each of the electronic devices has multiple video codec capabilities.

97. A method for controlling a remotely located device comprising:
facilitating transmission of one or more commands to a control computer from a first electronic device located at a first location and having at least video display capability and data input capability from at least a personal computer keyboard, such commands directing the control computer to establish communications with a select one of a plurality of second electronic devices each located at a remote location to the first electronic device and having at least video display and data communication capability, wherein establishing communications includes:
addressing a memory associated with the control computer to fetch identifying information for the select second electronic device, and
utilizing at least certain of the identifying information to establish a communications link associated with the control computer, which facilitates communications with the select second electronic device,
utilizing the communications link to facilitate sending one or more commands from the first electronic device to the select second electronic device at its remote location to control transmission of information from the select second electronic device at its remote location to the first electronic device,
facilitating transmission of information from the select second electronic device to the first electronic device, the information including data facilitating display of one or more images to a human and representing at least certain color video information generated by the select second electronic device at the remote location,
facilitating display of the color video information on the first electronic device together with text data relating to the select second electronic device, and
facilitating transmission of control data from the first electronic device to the select second electronic device, the control data responsive to a mouse in communication with the first electronic device and at least certain of the control data causing manipulation of the select second electronic device.

98. The method of claim 97, wherein the communications device communicates via a single communication line facility for at least a portion of the communications link.

99. The method of claim 97, wherein the information received from the select second electronic device also includes audio information.

100. The method of claim 99, further comprising facilitating audibly playing the audio information.

101. The method of claim 97, wherein at least certain of the information received from the select second electronic device indicates a status at the remote location.

102. The method of claim 97, wherein the information from the select second electronic device identifies the remote location of the select second electronic device.

103. The method of claim 97, wherein the information received from the select second electronic device is identifying data identifying the select second electronic device that produced data facilitating display of one or more images.

104. The method of claim 103, further comprising providing stored graphic information in accordance with the identifying data identifying the select second electronic device that provided the data facilitating display of one or more images.

105. The method of claim 103, wherein the identifying data is a number associated with the select second electronic device.

106. The method of claim 97, wherein the control data controls at least one of pan, zoom, view, tilt, freeze frame, and field of vision change of the select second electronic device.

107. The method of claim 97, further comprising providing stored graphic information in accordance with the select second electronic device providing the received information, generating a graphic signal corresponding to the stored graphic information, and displaying the received information and the generated graphic signal.

108. The method of claim 107, wherein the stored graphic information is provided in accordance with the received information.

109. The method of claim 107, wherein at least part of the graphic signal is a representation of the remote location of the select second electronic device.

110. The method of claim 107, wherein the graphic signal includes text relating to the remote location of the select second electronic device.

111. The method of claim 110, wherein the text represents at least one of a telephone number of the remote location of the select second electronic device, a name of the remote location of the select second electronic device, an address of the remote location of the select second electronic device, and a name of a person at the remote location of the select second electronic device.

112. The method of claim 110, wherein the text represents a nature of the status at the remote location of the select second electronic device.

113. The method of claim 107, further comprising combining the received information from the select second electronic device and the generated graphic signal to produce a composite signal for facilitating display of one or more images to a human.

114. The method of claim 97, wherein the information received from the select second electronic device is in accordance with a predetermined sequence.

115. The method of claim 97, wherein the information received from the select second electronic device is in accordance with a random sequence.

116. The method of claim 97, wherein the information received from the select second electronic device is in accordance with a demand from an operator.

117. The method of claim 116, wherein the demand from the operator is in response to awareness of events at the remote location of the select second electronic device.

118. The method of claim 97, wherein the information received from the select second electronic device is in accordance with a risk assessment at the remote location of the select second electronic device.

119. The method of claim 97, wherein the information received from the select second electronic device is in accordance with an operating schedule at the remote location of the select second electronic device.

120. The method of claim 97, wherein the information received from the select second electronic device is in accordance with a monitoring command signal from the remote location of the select second electronic device.

121. The method of claim 97, wherein the information received from the select second electronic device also specifies a time interval for the information.

122. The method of claim 97, wherein the information received from the select second electronic device is in accordance with a comparison between images at the remote location of the select second electronic device captured at different times.

123. The method of claim 122, wherein the images are digitized video.

124. The method of claim 122, wherein the at least one of the images is recorded.

125. The method of claim 97, wherein certain of the information received from the select second electronic device is responsive to a special situation identified at the remote location of the select second electronic device.

126. The method of claim 125, wherein the remote location of the select second electronic device includes at least one manually operated input control for indicating the special situation.

127. The method of claim 126, wherein the remote location of the select second electronic device includes a plurality of switches for indicating different types of special situations.

128. The method of claim 125, wherein the select second electronic device senses a special situation.

129. The method of claim 125, wherein the special situation is indicated by entry, via a keypad, of an identification number at the remote location.

130. The method of claim 125, wherein the special situation is indicated by a change exceeding a predetermined threshold between images of a location captured at different times.

131. The method of claim 130, wherein the images are digitized video.

132. The method of claim 130, wherein the at least one of the images is recorded.

133. The method of claim 97, wherein the information received from the select second electronic device includes data facilitating display of full motion video signal generated by the video signal generator at the remote location of the select second electronic device.

134. The method of claim 97, wherein the communications link uses a dial-up connection.

135. The method of claim 97, wherein the select second electronic device includes a dedicated line for supporting the communications link.

136. The method of claim 97, wherein the select second electronic device includes a facility for supporting the communications link.

137. The method of claim 97, wherein the communications link is provided, at least in part, via a connection.

138. The method of claim 97, wherein the communications link uses a public communications network.

139. The method of claim 138, wherein the public communications network is a public switched telephone network.

140. The method of claim 138, wherein the public communications network is a digital network.

141. The method of claim 140, wherein the digital network is according to the ISDN standard.

142. The method of claim 97, wherein the information received includes data facilitating display of a full motion video signal.

143. The method of claim 97, wherein the data facilitating display of one or more images to a human represents television quality pictures.

144. The method of claim 97, wherein facilitating display includes providing image enhancement of the information received from the select second electronic device.

145. The method of claim 97, wherein facilitating display includes presenting the one or more images to one operator at a time at the first location.

146. The method of claim 97, wherein facilitating display includes presenting the one or more images to multiple operators at the same time at the first location.

147. The method of claim 97, wherein facilitating display includes utilizing multiple screen units.

148. The method of claim 97, wherein the select second electronic device has a video display for displaying video from the first location.

149. The method of claim 97, wherein the select second electronic device has a recording device for recording video.

150. The method of claim 97, further comprising sending a generated signal to the select second electronic device based, at least in part, on the information received from the select second electronic device.

151. The method of claim 150, wherein the generated signal is for controlling operation of one of the plurality of second electronic devices.

152. The method of claim 151, wherein the generated signal controls at least one of pan, zoom, view, tilt, freeze frame, and field of vision change of the select second electronic device.

153. The method of claim 150, wherein the generated signal represents instructions for personnel at the remote location of the select second electronic device.

154. The method of claim 150, wherein the generated signal represents a prerecorded audio message.

155. The method of claim 150, wherein the generated signal represents a synthesized audio message.

156. The method of claim 150, wherein the generated signal represents a spoken audio message.

157. The method of claim 150, wherein the select second electronic device has a speaker for audibly delivering the generated signal.

158. The method of claim 97, further comprising recording the information received from the select second electronic device.

159. The method of claim 97, wherein the information received from the select second electronic device is provided from a video recorder at the remote location of the select second electronic device.

160. The method of claim 159, wherein the video recorder is set to record intermittently.

161. The method of claim 159, wherein the video recorder is set to record continuously.

162. The method of claim 159, wherein the video recorder is set to record a selected frame of video.

163. The method of claim 159, wherein the video recorder is set to record for a specified time interval.

164. The method of claim 97, wherein the information received from the select second electronic device is also recorded at the remote location of the select second electronic device.

165. The method of claim 97, wherein the information received from the select second electronic device is also printed at the remote location of the select second electronic device.

166. The method of claim 97, wherein the information received from the select second electronic device is provided from a switching device at the remote location that sequences information from the plurality of second electronic devices.

167. The method of claim 97, wherein the communications link uses a primary communication facility, and further comprising providing a backup communication facility when the primary communication facility is malfunctioning.

168. The method of claim 97, further comprising distributing the information received from the select second electronic device to one of multiple operators.

169. The method of claim 138, wherein the distributing is in accordance with availability of the multiple operators.

170. The method of claim 138, wherein the distributing is in accordance with priority status of the information.

171. The method of claim 138, wherein the distributing is in accordance with a situation status of the information and abilities of the multiple operators to handle different types of situations.

172. The method of claim 97, wherein at least one of the remote locations is a bank, a supermarket, a parking structure and a quality control facility.

173. The method of claim 97, further comprising providing a control panel including at least one of an outgoing audio control, an incoming audio control, an outgoing video control, an incoming video control, an operations control for a select one of the plurality of second electronic devices at the remote location, a display sequence control, a display resolution control, an indicator for indicating that one of the second electronic devices has become inoperative, a keypad for selecting control commands, and an activator for establishing a communications connection to a police station.

174. The method of claim 173, wherein the control panel includes the personal computer keyboard.

175. The method of claim 97, further comprising recording transactions based on the information received from the select second electronic device.

176. The method of claim 97, further comprising entering an operator's observations, and a memory for storing the entered observations.

177. The method of claim 97, wherein the first electronic device has a battery of providing backup power.

178. The method of claim 97, wherein the select second electronic device has a battery for providing backup power.

179. The method of claim 97, wherein the plurality of second electronic devices are associated with different business entities.

180. The method of claim 97, wherein at least one of the remote locations includes a plurality of second electronic devices.

181. The method of claim 97 further comprising:
facilitating interactive data sharing by concurrently sharing information between the first electronic device at the first location and the select second electronic device at the remote location.

182. The method of claim 97 wherein the color video information generated by the select second electronic device is an image associated with the remote location.

183. The method according to claim 182 further comprising:
comparing an image at the remote location at a first time with an image at the remote location at a second time and transmitting data to the first electronic device based on the difference between the images.

184. The method of claim 97 wherein the control data facilitates sharing at least certain data between the first electronic device and the select second electronic device.

185. The method of claim 184 wherein at least certain of the control data to facilitate sharing at least certain data between the first electronic device and the second electronic device is input with the mouse in communication with the first electronic device.

186. The method of claim 97 wherein at least certain of the control data is input through a control panel.

187. The method according to claim 186 wherein the control panel includes the personal computer keyboard.

188. The method of claim 97 wherein at least certain of the control data causes manipulation of the select second electronic device to zoom in on a portion of the one or more images.

189. The method of claim 97 wherein each of the electronic devices has video codec capabilities via which the data facilitating display of one or more images to a human is communicated.

190. The method of claim 97 wherein an initiation of communication from the first electronic device to the select second electronic device is facilitated by electronic mail capability.

191. The method of claim 97 wherein communication from the first electronic device to the select second electronic device is via an online service.

192. The method of claim 97, wherein each of the electronic devices has multiple video codec capabilities.

* * * * *

Disclaimer

8,842,151 B2 — Ronald A. Katz, Los Angeles, CA (US). SECURITY MONITORING SYSTEM WITH FLEXIBLE MONITORING SEQUENCE. Patent dated September 23, 2014. Disclaimer filed January 28, 2016, by the assignee, Telebuyer, LLC.

Hereby disclaim complete claims 1-192 of said patent.

*(Official Gazette, April 5, 2016)*